US011002936B2

(12) United States Patent
Geens et al.

(10) Patent No.: US 11,002,936 B2
(45) Date of Patent: *May 11, 2021

(54) OPTICAL FIBER DISTRIBUTION SYSTEM

(71) Applicants: CommScope Connectivity Belgium BVBA, Kessel-Lo (BE); ADC Czech Republic s.r.o., Brno (CZ)

(72) Inventors: Johan Geens, Bunsbeek (BE); Pieter Vermeulen, Westerlo (BE); Eric Keustermans, Houwaart (BE); Matthias Alderweireldt, Kortessem (BE); Tomas Fucsek, Topolniky (BE)

(73) Assignees: CommScope Connectivity Belgium BVBA, Kessel-Lo (BE); ADC Czech Republic s.r.o., Brno (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,090

(22) Filed: Aug. 14, 2020

(65) Prior Publication Data

US 2021/0026093 A1    Jan. 28, 2021

Related U.S. Application Data

(63) Continuation of application No. 16/164,121, filed on Oct. 18, 2018, now Pat. No. 10,746,950, which is a
(Continued)

(51) Int. Cl.
*G02B 6/44* (2006.01)
*G02B 6/38* (2006.01)

(52) U.S. Cl.
CPC ......... *G02B 6/4477* (2013.01); *G02B 6/3887* (2013.01); *G02B 6/3897* (2013.01);
(Continued)

(58) Field of Classification Search
CPC .... G02B 6/4477; G02B 6/4452; G02B 6/445; G02B 6/4455
See application file for complete search history.

(56) References Cited

U.S. PATENT DOCUMENTS 2,805,106 A  9/1957 Penkala
2,864,656 A  12/1958 Yorinks
(Continued)

FOREIGN PATENT DOCUMENTS

AU  40995/85  4/1985
AU  55314/86  3/1986
(Continued)

OTHER PUBLICATIONS

International Search Report for International Application No. PCT/EP2014/051714 dated Apr. 29, 2014 (2 pages).
International Search Report and Written Opinion for International Application No. PCT/EP2014/058136 dated Jul. 11, 2014 (9 pages).
(Continued)

*Primary Examiner* — Sung H Pak
(74) *Attorney, Agent, or Firm* — Merchant & Gould P.C.

(57) ABSTRACT

A cable mount for fixing a strength member of a fiber optic cable to a fixture includes a front end, a rear end, and a longitudinal channel therebetween, the channel defined by upper and lower transverse walls and a vertical divider wall. The channel receives a portion of the cable. A strength member pocket receives the strength member of the cable, the pocket located on an opposite side of the divider wall from the longitudinal channel, the pocket communicating with the longitudinal channel through an opening on the divider wall. A strength member clamp fixes the strength member of the cable against axial pull. Cable management structures in the form of spools define at least one notch that communicates with the longitudinal channel for guiding optical fibers extending from a jacket either upwardly or downwardly therethrough. The cable mount also allows
(Continued)

routing of the optical fibers through the longitudinal channel all the way from the rear end to the front end.

9 Claims, 62 Drawing Sheets

Related U.S. Application Data continuation of application No. 15/375,863, filed on Dec. 12, 2016, now Pat. No. 10,107,984, which is a continuation of application No. 14/787,111, filed as application No. PCT/EP2014/058196 on Apr. 23, 2014, now Pat. No. 9,541,726.

(60) Provisional application No. 61/815,525, filed on Apr. 24, 2013, provisional application No. 61/892,579, filed on Oct. 18, 2013.

(52) U.S. Cl.
CPC ......... *G02B 6/4455* (2013.01); *G02B 6/4457* (2013.01); *G02B 6/4452* (2013.01)

(56) References Cited

U.S. PATENT DOCUMENTS

| | | | |
|---|---|---|---|
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Rock et al. |
| 4,359,262 A | 11/1982 | Dolan |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,991,928 A | 2/1991 | Zimmer |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghanderharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,717,810 A | 2/1998 | Wheeler |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,099,224 A | 8/2000 | Uchida et al. |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,263,141 B1 | 7/2001 | Smith |
| 6,269,214 B1 | 7/2001 | Naudin et al. |
| 6,301,424 B1 | 10/2001 | Hwang |
| 6,360,050 B1 | 3/2002 | Moua et al. |
| 6,438,310 B1 | 8/2002 | Lance et al. |
| 6,439,523 B1 | 8/2002 | Chandler et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| 6,612,515 B1 | 9/2003 | Tinucci et al. |
| 6,625,374 B2 | 9/2003 | Holman et al. |
| RE38,311 E | 11/2003 | Burmeister et al. |
| 6,677,520 B1 | 1/2004 | Kim et al. |
| 6,695,491 B1 | 2/2004 | Leeman et al. |
| 6,711,339 B2 | 3/2004 | Puetz et al. |
| 6,715,619 B2 | 4/2004 | Kim et al. |
| 6,748,155 B2 | 6/2004 | Kim et al. |
| 6,768,860 B2 | 7/2004 | Liberty |
| 6,796,437 B2 | 9/2004 | Krampotich et al. |
| 6,804,447 B2 | 10/2004 | Smith et al. |
| 6,809,258 B1 | 10/2004 | Dang et al. |
| 6,810,193 B1 | 10/2004 | Müller |
| 6,819,857 B2 | 11/2004 | Douglas et al. |
| 6,845,208 B2 | 1/2005 | Thibault et al. |
| 6,850,685 B2 | 2/2005 | Tinucci et al. |
| 6,865,331 B2 | 3/2005 | Mertesdorf |
| 6,925,241 B2 | 8/2005 | Bohle et al. |
| 6,934,457 B2 | 8/2005 | Vincent et al. |
| 6,937,807 B2 | 8/2005 | Franklin et al. |
| 6,944,383 B1 | 9/2005 | Herzog et al. |
| 6,945,620 B2 | 9/2005 | Lam et al. |
| 6,968,111 B2 | 11/2005 | Trebesch et al. |
| 6,981,750 B2 | 1/2006 | Krampotich |
| 7,006,748 B2 | 2/2006 | Dagley et al. |
| 7,068,907 B2 | 6/2006 | Schray |
| 7,079,744 B2 | 7/2006 | Douglas et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,231,125 B2 | 6/2007 | Douglas et al. |

(56) References Cited

U.S. PATENT DOCUMENTS

| | | |
|---|---|---|
| 7,274,852 B1 | 9/2007 | Smrha et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,362,942 B2 | 4/2008 | Beck |
| 7,367,823 B2 | 5/2008 | Rapp et al. |
| 7,373,071 B2 | 5/2008 | Douglas et al. |
| 7,397,996 B2 | 7/2008 | Herzog et al. |
| 7,406,240 B2 | 7/2008 | Murano |
| 7,409,137 B2 | 8/2008 | Barnes |
| 7,418,182 B2 | 8/2008 | Krampotich |
| 7,437,049 B2 | 10/2008 | Krampotich |
| 7,454,113 B2 | 11/2008 | Barnes |
| 7,457,504 B2 | 11/2008 | Smrha et al. |
| 7,460,757 B2 | 12/2008 | Hoehne et al. |
| 7,463,811 B2 | 12/2008 | Trebesch et al. |
| 7,480,438 B2 | 1/2009 | Douglas et al. |
| 7,496,268 B2 | 2/2009 | Escoto et al. |
| 7,499,623 B2 | 3/2009 | Barnes et al. |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,599,599 B2 | 10/2009 | Herzog et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,978,957 B2 | 7/2011 | Sano et al. |
| 8,027,558 B2 | 9/2011 | Barnes et al. |
| 8,041,175 B2 | 10/2011 | Krampotich et al. |
| 8,059,932 B2 | 11/2011 | Hill et al. |
| 8,078,030 B2 | 12/2011 | Trebesch et al. |
| 8,179,684 B2 | 5/2012 | Smrha et al. |
| 8,195,022 B2 | 6/2012 | Coburn et al. |
| 8,285,104 B2 | 10/2012 | Davis et al. |
| 8,452,149 B2 | 5/2013 | Krampotich et al. |
| 8,526,774 B2 | 9/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 8,816,222 B2 | 8/2014 | Pimentel |
| 8,885,998 B2 | 11/2014 | Marcouiller et al. |
| 8,903,216 B2 | 12/2014 | Thompson et al. |
| 9,541,726 B2 * | 1/2017 | Geens ................ G02B 6/4457 |
| 10,107,984 B2 | 10/2018 | Geens et al. |
| 2001/0001270 A1 | 5/2001 | Williams Vigliaturo |
| 2002/0181922 A1 | 12/2002 | Xin et al. |
| 2003/0007767 A1 | 1/2003 | Douglas et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0136676 A1 | 7/2004 | Mertesdorf |
| 2004/0175090 A1 | 9/2004 | Vastmans et al. |
| 2004/0258384 A1 | 12/2004 | Trebesch et al. |
| 2005/0025444 A1 | 2/2005 | Barnes et al. |
| 2005/0058421 A1 | 3/2005 | Dagley et al. |
| 2005/0078929 A1 | 4/2005 | Iwanek |
| 2005/0100301 A1 | 5/2005 | Solheid et al. |
| 2005/0123261 A1 | 6/2005 | Bellekens et al. |
| 2006/0275008 A1 | 12/2006 | Xin |
| 2007/0003204 A1 | 1/2007 | Makrides-Saravanos et al. |
| 2007/0031099 A1 | 2/2007 | Herzog et al. |
| 2007/0058918 A1 | 3/2007 | Trebesch et al. |
| 2007/0201806 A1 | 8/2007 | Douglas et al. |
| 2008/0048935 A1 | 2/2008 | Yoshioka et al. |
| 2008/0063350 A1 | 3/2008 | Trebesch et al. |
| 2008/0169116 A1 | 7/2008 | Mullaney et al. |
| 2008/0175550 A1 | 7/2008 | Coburn et al. |
| 2008/0205843 A1 | 8/2008 | Castonguay et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0129033 A1 | 5/2009 | Smrha et al. |
| 2009/0136196 A1 | 5/2009 | Trebesch et al. |
| 2009/0274430 A1 | 11/2009 | Krampotich et al. |
| 2009/0274431 A1 | 11/2009 | Krampotich et al. |
| 2010/0142910 A1 | 6/2010 | Hill et al. |
| 2010/0150518 A1 | 6/2010 | Leon et al. |
| 2010/0158465 A1 | 6/2010 | Smrha |
| 2010/0195968 A1 | 8/2010 | Trebesch et al. |
| 2010/0266253 A1 | 10/2010 | Krampotich et al. |
| 2010/0316346 A1 | 12/2010 | Krampotich et al. |
| 2010/0322578 A1 | 12/2010 | Cooke et al. |
| 2011/0188809 A1 | 8/2011 | LeBlanc et al. |
| 2011/0206336 A1 | 8/2011 | Krampotich et al. |
| 2011/0211799 A1 | 9/2011 | Conner et al. |
| 2011/0217016 A1 | 9/2011 | Mullsteff |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0317974 A1 | 12/2011 | Krampotich et al. |
| 2012/0057838 A1 | 3/2012 | Hill et al. |
| 2012/0093475 A1 | 4/2012 | Trebesch et al. |
| 2012/0230646 A1 | 9/2012 | Thompson et al. |
| 2013/0084050 A1 | 4/2013 | Vastmans et al. |
| 2013/0089292 A1 | 4/2013 | Ott et al. |
| 2013/0089298 A1 | 4/2013 | Holmberg et al. |
| 2013/0183018 A1 | 7/2013 | Holmberg |
| 2013/0287356 A1 | 10/2013 | Solheid et al. |
| 2013/0287357 A1 | 10/2013 | Solheid et al. |
| 2014/0086545 A1 | 3/2014 | Solheid et al. |
| 2014/0133819 A1 | 5/2014 | Trebesch et al. |
| 2014/0241691 A1 | 8/2014 | Solheid et al. |
| 2015/0378106 A1 | 12/2015 | Allen et al. |

FOREIGN PATENT DOCUMENTS

| | | |
|---|---|---|
| DE | 2735106 A1 | 2/1979 |
| DE | 2918309 A1 | 11/1980 |
| DE | 3308682 A1 | 9/1984 |
| DE | 3836273 A1 | 4/1990 |
| DE | 4413136 C1 | 5/1995 |
| DE | 29504191 U1 | 3/1996 |
| EP | 0146478 A2 | 6/1985 |
| EP | 0149250 A2 | 7/1985 |
| EP | 0356942 A2 | 3/1990 |
| EP | 0406151 A2 | 1/1991 |
| EP | 0464570 A1 | 1/1992 |
| EP | 0479226 A1 | 4/1992 |
| EP | 0196102 B1 | 3/1993 |
| EP | 0538164 A1 | 4/1993 |
| EP | 0563995 B1 | 10/1993 |
| FR | 2531576 A1 | 2/1984 |
| FR | 2587127 | 3/1987 |
| FR | 2678076 A1 | 12/1992 |
| JP | 59-74523 A | 4/1984 |
| JP | 60-169811 A | 9/1985 |
| JP | 61-55607 | 3/1986 |
| JP | 61-90104 | 5/1986 |
| KR | 200337929 | 1/2004 |
| KR | 20080033420 A | 4/2008 |
| RU | 45207 U1 | 4/2005 |
| WO | 91/10927 A1 | 7/1991 |
| WO | 95/07480 A1 | 3/1995 |
| WO | 96/10203 A1 | 4/1996 |
| WO | 99/00619 A1 | 1/1999 |
| WO | 03/005095 A | 1/2003 |

(56) References Cited

FOREIGN PATENT DOCUMENTS

WO   2008/048935 A2   4/2008
WO   2014/118227 A1   8/2014

OTHER PUBLICATIONS

Northern Telecom Bulletin #91-004, Issue #2, May 1991.
AT&T Product Bulletin 2987D-DLH-7/89, "High Density Interconnect System (HDIC)," Issue 2 (Copyright 1989).
Preface to the book "Structure, Installation, Connection and Protection of Communication Optical Fiber Cable," in Chinese with English Translation, 14 pages (Mar. 1992).
Complaint relating to Civil Action No. 5:11-cv-02509-JS, *ADC Telecommunications, Inc* v. *Opterna Am, Inc.* filed Apr. 11, 2011 (14 pages).
Complaint relating to Civil Action No. 1:11cv-735 (GBL-IDD), *ADC Telecommunications, Inc* v. *Opterna Am, Inc.* filed Jul. 12, 2011 (5 pages).
Plaintiff's Notice of Dismissal relating to Civil Action No. 5:11-cv-02509-JS, *ADC Telecommunications, Inc* v. *Opterna Am, Inc.* filed Jul. 12, 2011 (1 page).
Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).
International Search Report and Written Opinion for International Application No. PCT/EP2014/058196 dated Jul. 31, 2014 (10 pages).
"ITU Fiber Handbook" with English translation, 14 pages, Mar. 1992.

\* cited by examiner

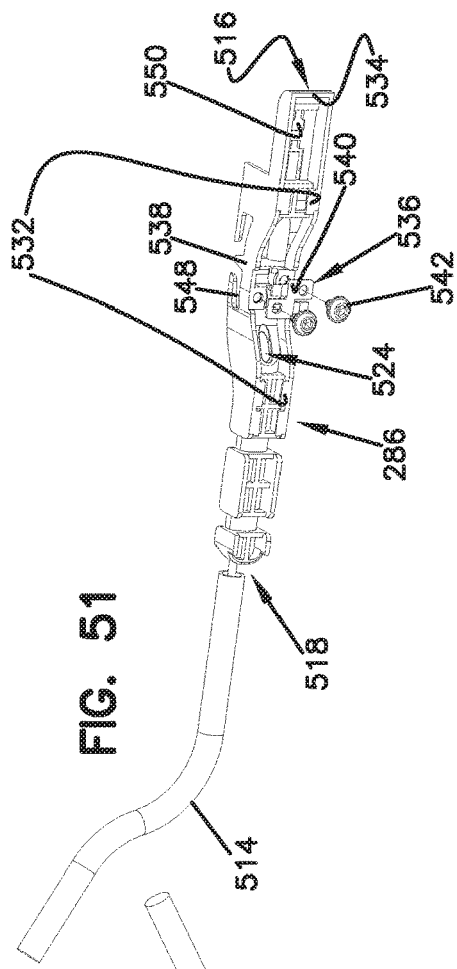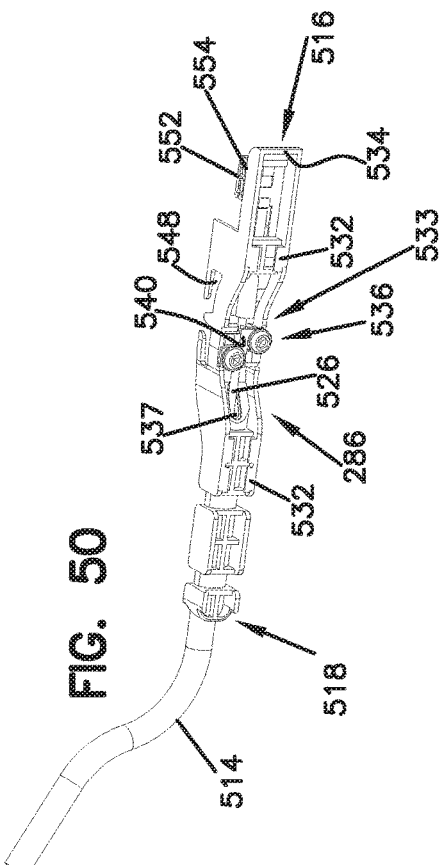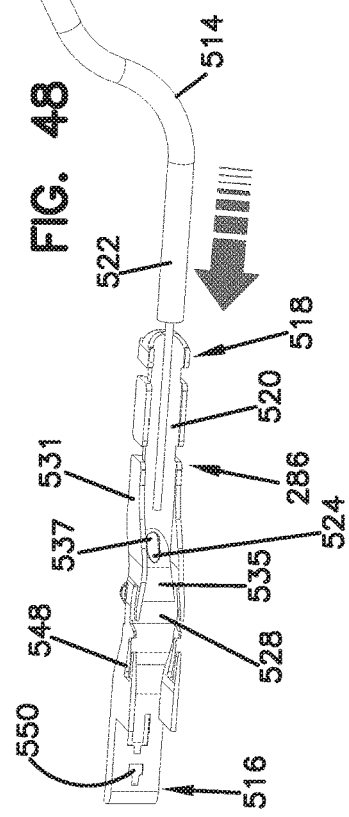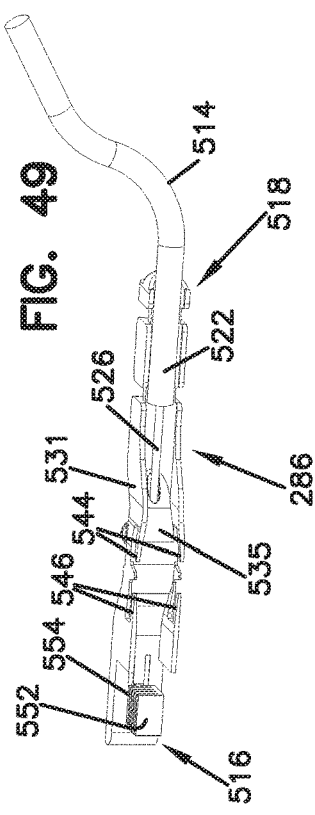

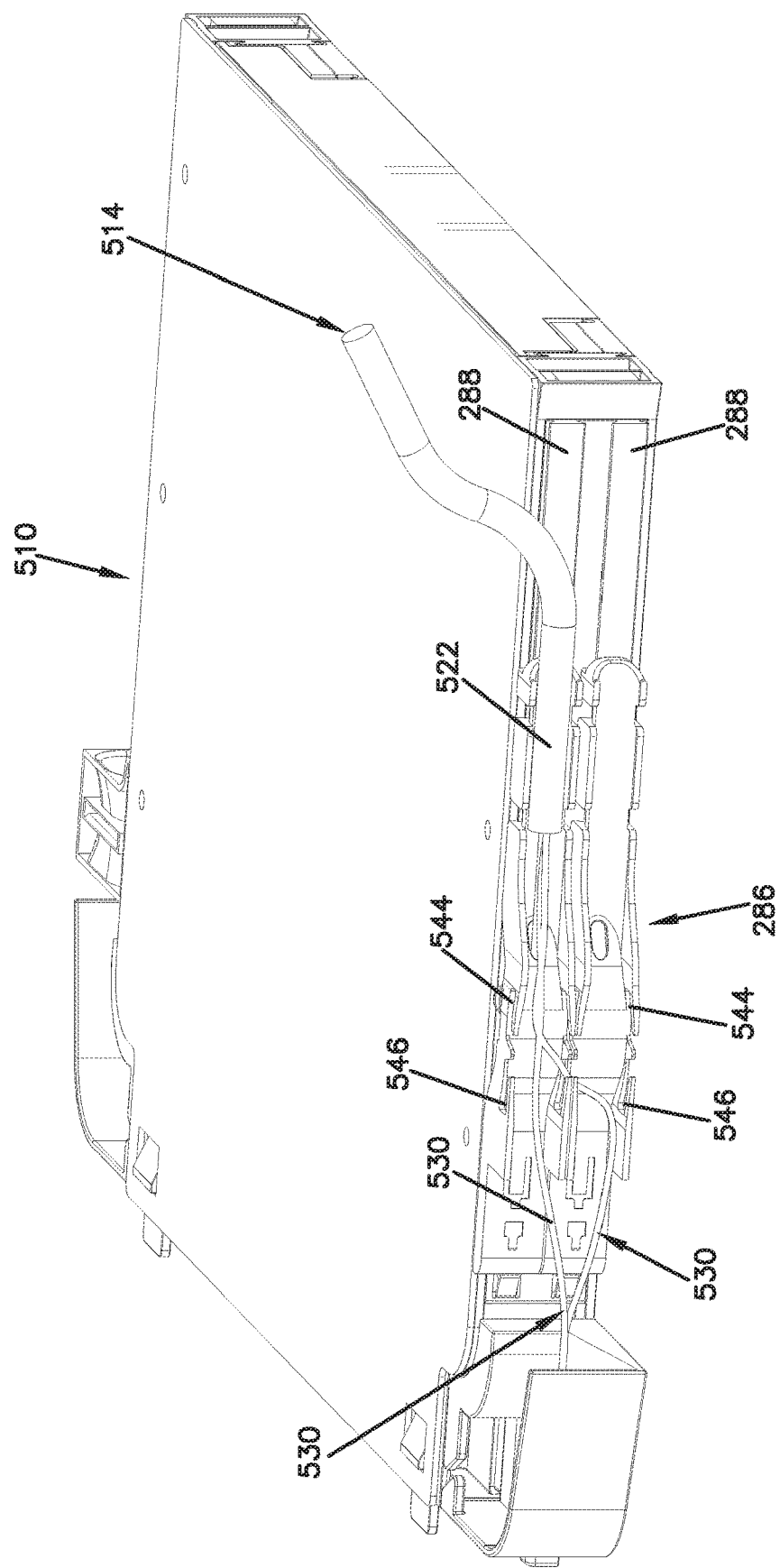

OPTICAL FIBER DISTRIBUTION SYSTEM

CROSS REFERENCE TO RELATED APPLICATIONS

This application is a Continuation of U.S. patent application Ser. No. 16/164,121, filed on 18 Oct. 2018, now U.S. Pat. No. 10,746,950, which is a Continuation of U.S. patent application Ser. No. 15/375,863, filed 12 Dec. 2016, now U.S. Pat. No. 10,107,984, which is a Continuation of U.S. patent application Ser. No. 14/787,111, filed 26 Oct. 2015, now U.S. Pat. No. 9,541,726, which is a National Stage of PCT/EP2014/058196, filed 23 Apr. 2014, which claims priority to U.S. Patent Application Ser. No. 61/815,525 filed on 24 Apr. 2013 and to U.S. Patent Application Ser. No. 61/892,579 filed on 18 Oct. 2013, the disclosures of which are incorporated herein by reference in their entireties. To the extent appropriate a claim of priority is made to each of the above disclosed applications.

FIELD OF THE INVENTION

The present invention relates to an optical fiber distribution system, including a rack, and elements which populate the rack, including fiber terminations, patching, fiber splitters, and fiber splices.

BACKGROUND OF THE INVENTION

Optical fiber distribution systems include fiber terminations and other equipment which is typically rack mounted. Various concerns exist for the optical fiber distribution systems, including density, ease of use, and cable management. There is a continuing need for improvements in the optical fiber distribution area.

SUMMARY OF THE INVENTION

One implementation of a system in accordance with the examples of the disclosure includes a building block element mountable to a rack or other structure. The element includes a chassis, and a moveable tray. The tray is moveably mounted to the chassis with a slide mechanism that allows the tray to slide relative to the chassis. The slide mechanism includes a synchronized movement feature for managing the cables extending to and from the tray, such that cable pull at the entry and exit locations is reduced or eliminated as the tray is moved.

One synchronized movement feature includes gears, including a rack and pinion system. Another synchronized movement feature includes wheels and wires.

The tray preferably includes mounting structures for holding cable terminations, splitters, and/or splices. One mounting structure includes an open shaped frame member for connector access. In one example, two frame members are provided, one positioned over the other. For improved access, the frame members are hingedly mounted to the tray. In a termination arrangement, the adapters are arranged so that the connector axes are horizontal and extend in a perpendicular direction to the direction of travel for the tray.

Each frame member can be populated with adapter blocks. Pathways guide cables to the adapter ports of the adapter blocks for fiber optic cables terminated with connectors to be received therein. The cables follow a general S-shaped pathway from a side of each element to the adapter blocks. The S-shaped pathway includes two levels inside of the tray to segregate cables between the two frame members. Various flanges and radius limiters can be provided to assist with cable management.

The elements can be stacked in a column with each tray mounted horizontally, or used in a group or block mounted vertically. In the case of a column of elements, a selected tray is pulled outward to access the desired tray, and then the frame members on the tray can be pivoted as needed.

One side of each element can be for patch cables, and the opposite side can be for cable termination of an incoming cable, such as a distribution cable or a feeder cable. Because of the synchronized movement feature, cables can be secured along the sides of the elements and still allow for sliding movement of the trays without a need for large amounts or any cable slack.

The tray and the frame members allow for easy top and bottom access to connectors on either side of the adapters. Openings are provided in the tray bottom for hand access if desired.

The cable mounts for the distribution cables or feeder cables can be snap mounted to the elements and/or mounted in a longitudinal slide mount, and include strength member clamps and cable clamps.

Groupings of loose cables can be managed with cable wraps or other cable guides such as flexible troughs.

The elements can be configured as desired and form building blocks for an optical fiber distribution system (ODF).

When the elements are mounted in a column in a rack, the cables can be placed in vertical cable guides to enter and exit the selected element.

The example rack is front accessible, however, the elements can be used in other racks, frames, cabinets or box including in arrangements where rear access is desirable or useful.

According to another aspect, the disclosure is directed to a cable mount configured for fixing a strength member of a fiber optic cable to a fixture. The cable mount comprises a front end, a rear end, and a longitudinal channel extending between the front end and the rear end, the longitudinal channel defined by upper and lower transverse walls and a vertical divider wall, the longitudinal channel for receiving a portion of the fiber optic cable. A strength member pocket is for receiving the strength member of the fiber optic cable, the strength member pocket located on an opposite side of the divider wall from the longitudinal channel, the strength member pocket communicating with the longitudinal channel through an opening provided on the divider wall. A strength member clamp is configured to fix the strength member of the fiber optic cable against axial pull relative to the cable mount.

According to another aspect, the disclosure is directed to a method of fixing a strength member of a fiber optic cable to a fixture. The method comprises inserting a front end of the fiber optic cable through a longitudinal channel of a cable mount that is on the fixture, wherein longitudinal channel is defined by upper and lower transverse walls and a vertical divider wall, inserting the strength member of the fiber optic cable through an opening on the vertical divider wall into a pocket located on an opposite side of the divider wall from the longitudinal channel, and clamping the strength member of the fiber optic cable against axial pull relative to the cable mount.

According to another aspect, the disclosure is directed to a cable mount for fixing a strength member of a fiber optic cable to a fixture. The cable mount includes a front end, a rear end, and a longitudinal channel therebetween, the channel defined by upper and lower transverse walls and a vertical divider wall. The channel receives a portion of the cable. A strength member pocket receives the strength member of the cable, the pocket located on an opposite side of the divider wall from the longitudinal channel, the pocket communicating with the longitudinal channel through an opening on the divider wall. A strength member clamp fixes the strength member of the cable against axial pull. Cable management structures in the form of spools define at least one notch that communicates with the longitudinal channel for guiding optical fibers extending from a jacket either upwardly or downwardly therethrough. The cable mount also allows routing of the optical fibers through the longitudinal channel all the way from the rear end to the front end.

According to another aspect, the disclosure is directed to a method of fixing a strength member of a fiber optic cable to a fixture. The method comprises inserting a front end of the fiber optic cable through a longitudinal channel of a cable mount that is on the fixture, wherein longitudinal channel is defined by upper and lower transverse walls and a vertical divider wall, inserting the strength member of the fiber optic cable through an opening on the vertical divider wall into a pocket located on an opposite side of the divider wall from the longitudinal channel, clamping the strength member of the fiber optic cable against axial pull relative to the cable mount, and guiding optical fibers extending from a jacket of the fiber optic cable either upwardly or downwardly through at least one notch defined between cable management structures in the form of spools or through the longitudinal channel all the way from the rear end to the front end.

BRIEF DESCRIPTION OF THE FIGURES

FIG. 48 shows a right side perspective view of the cable mount of FIGS. 30-33 and 38-39 in isolation;

FIG. 49 shows the cable mount of FIG. 48 with a radius limiter including friction members mounted thereon, the radius limiter also visible in FIGS. 30-33 and 38-39;

FIG. 50 shows a left side perspective view of the cable mount of FIG. 49;

FIG. 51 shows the cable mount of FIGS. 48-50 in an exploded configuration;

FIG. 52 shows a pair of the cable mounts of FIGS. 48-51 attached to a single optical fiber distribution element having features similar to the elements shown in FIGS. 30-47;

DETAILED DESCRIPTION

Figure 1:
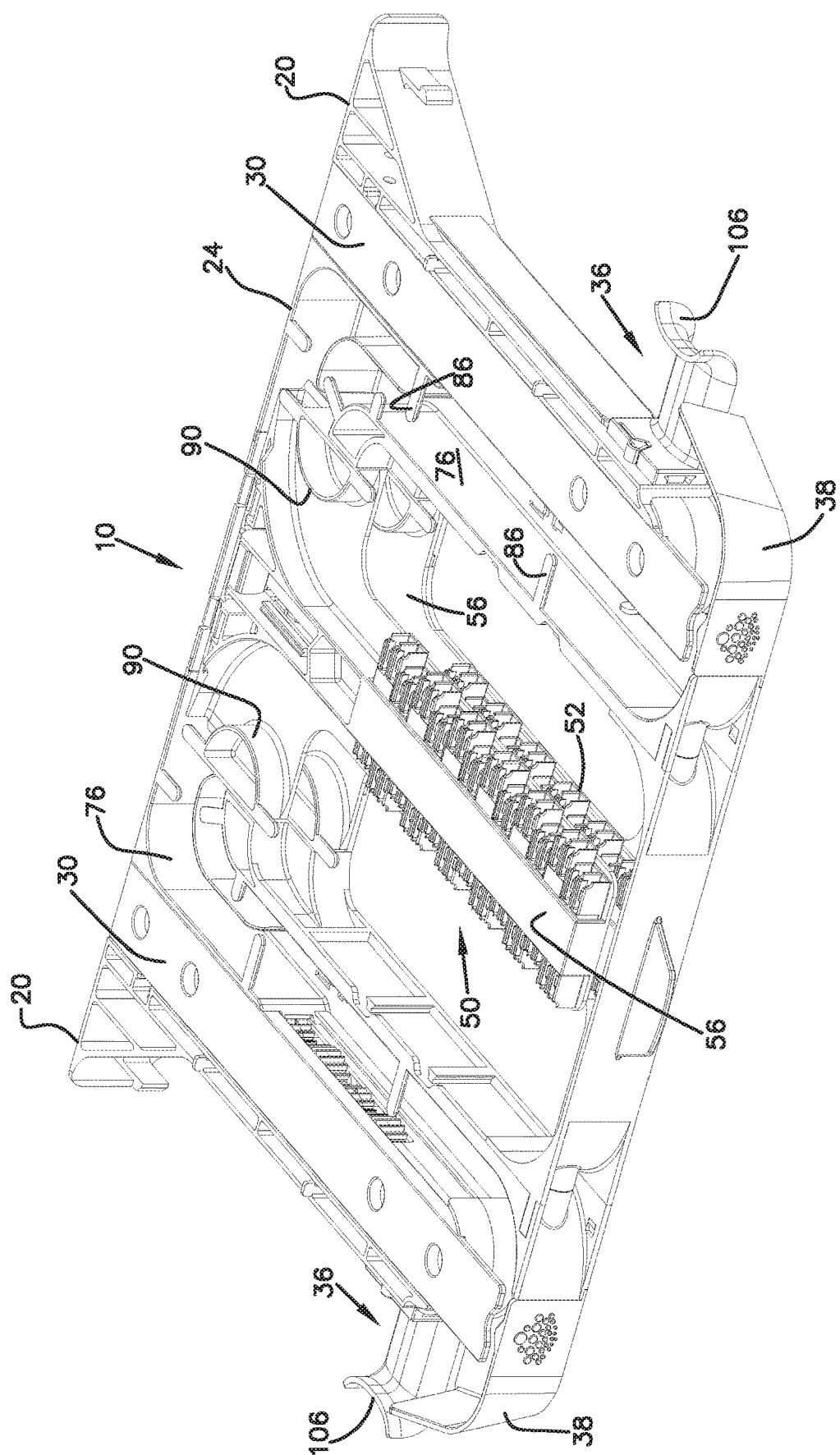
FIG. 1 is a perspective view of a first embodiment of an optical fiber distribution element in accordance of aspects of the present disclosure.
Figure 2:
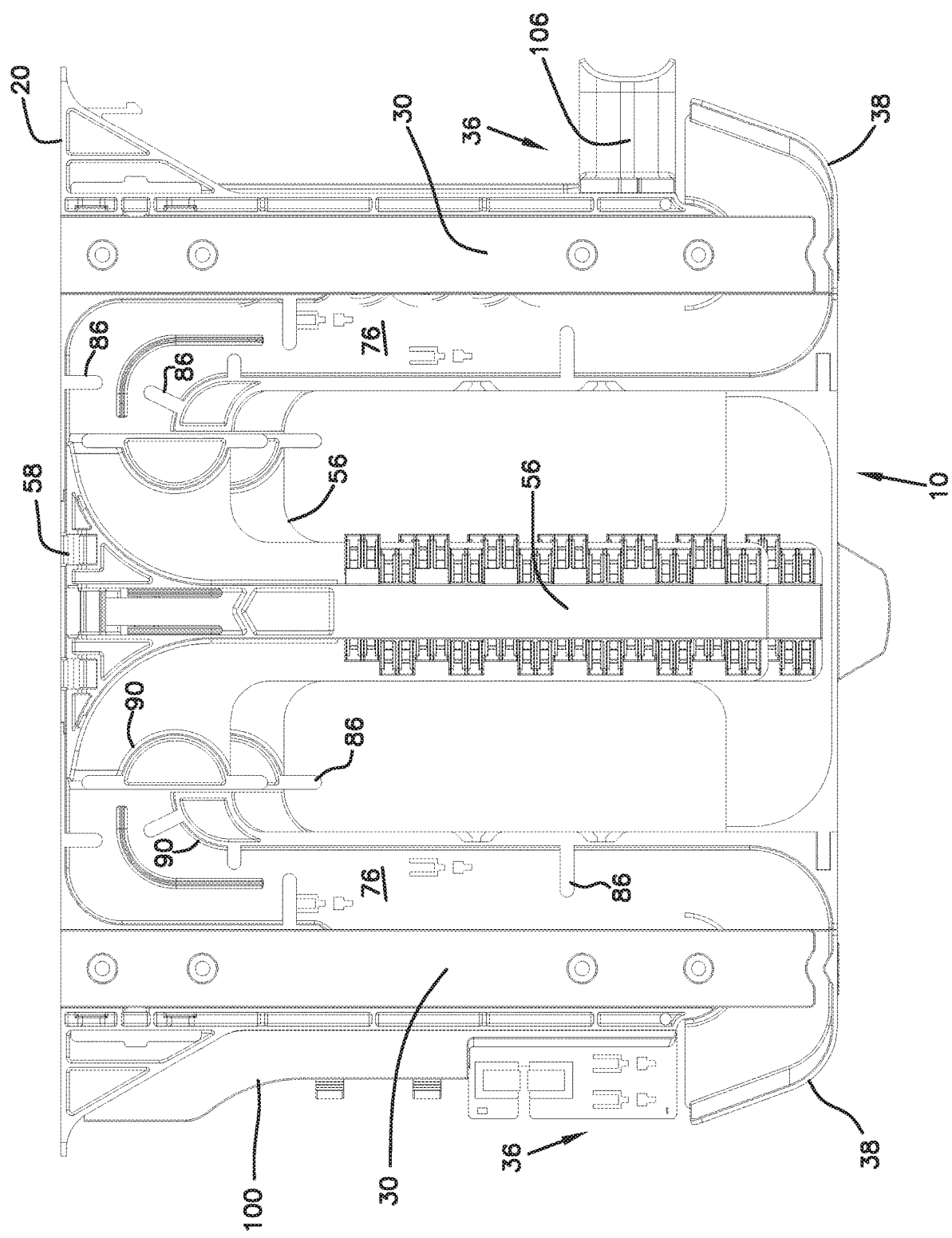
FIG. 2 is a top view of the element of FIG. 1.
Figure 3:
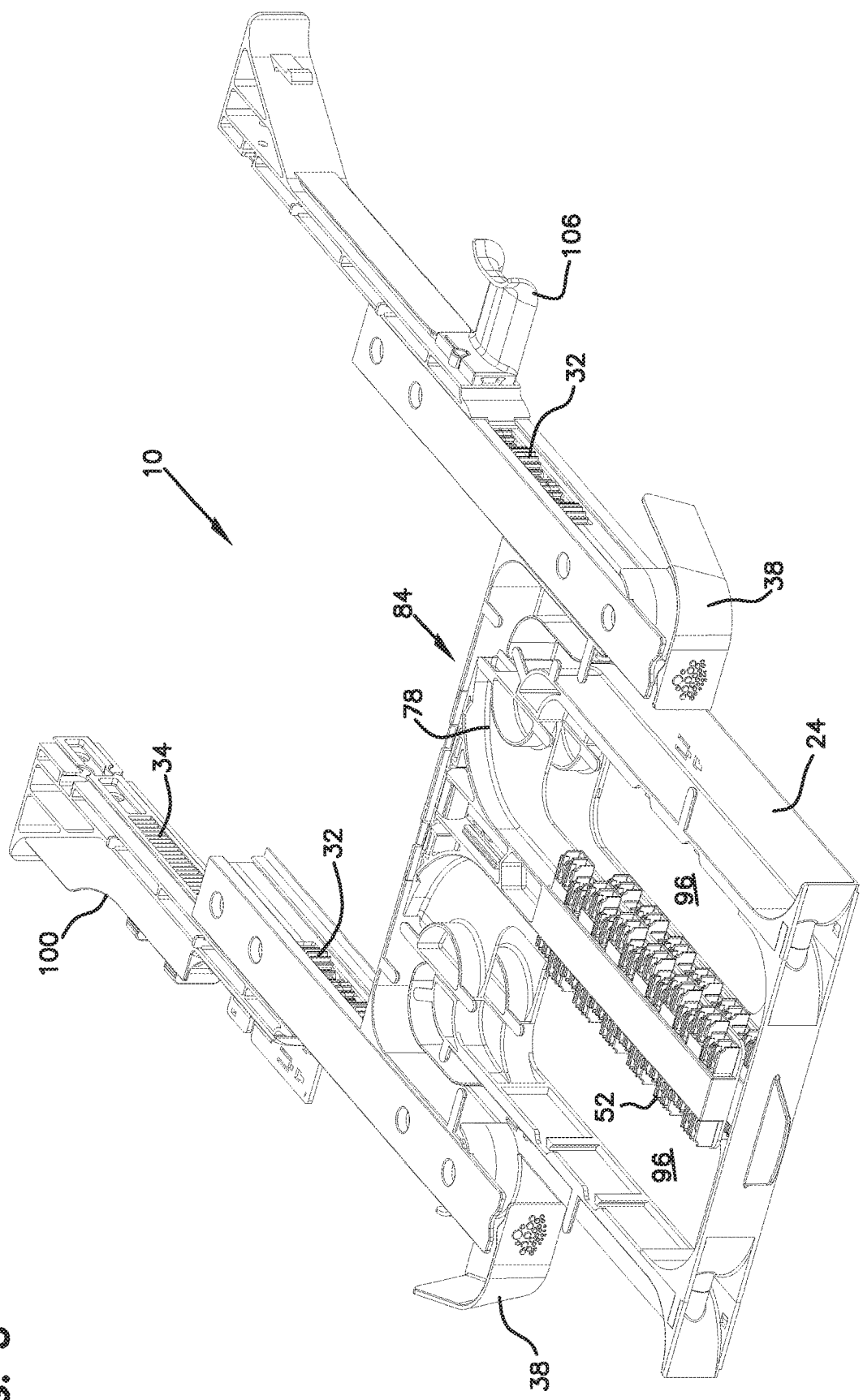
FIG. 3 is a perspective view of the element of FIG. 1 showing the tray pulled forward from the chassis.
Figure 4:
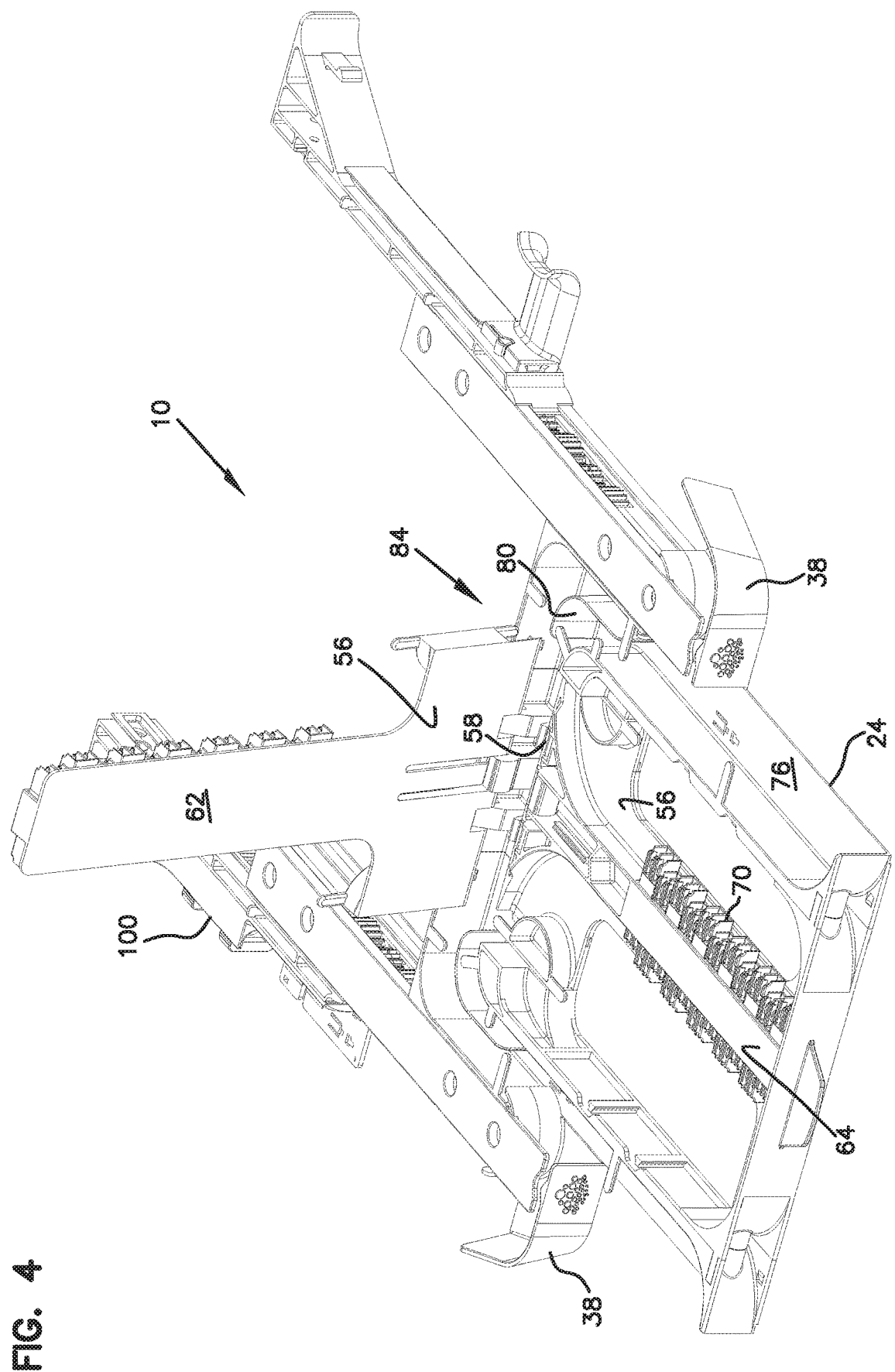
FIG. 4 shows one of the tray frame members pivoted upwardly from the tray.
Figure 5:
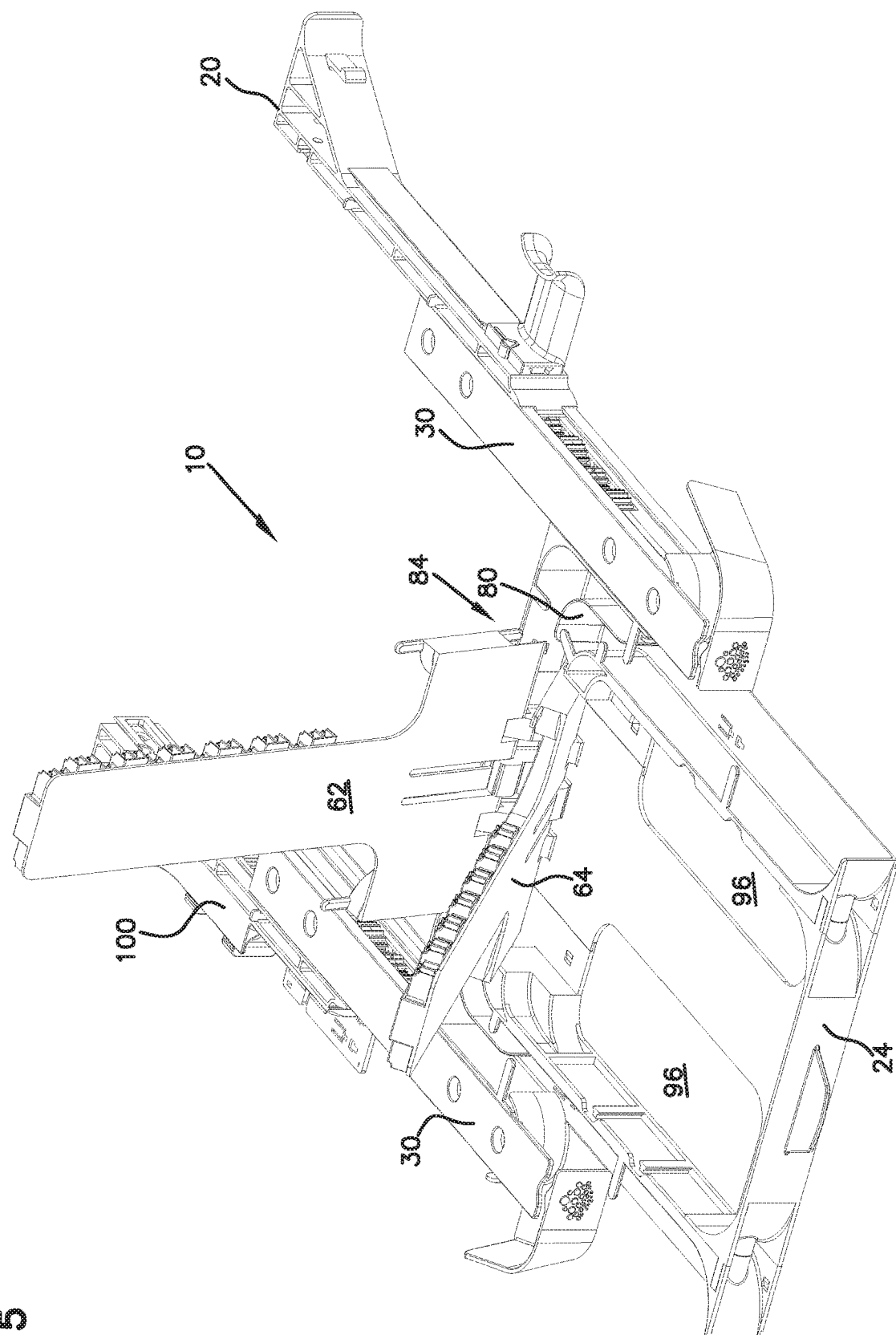
FIG. 5 shows a second frame member pivoted upwardly relative to the tray.
Figure 6:
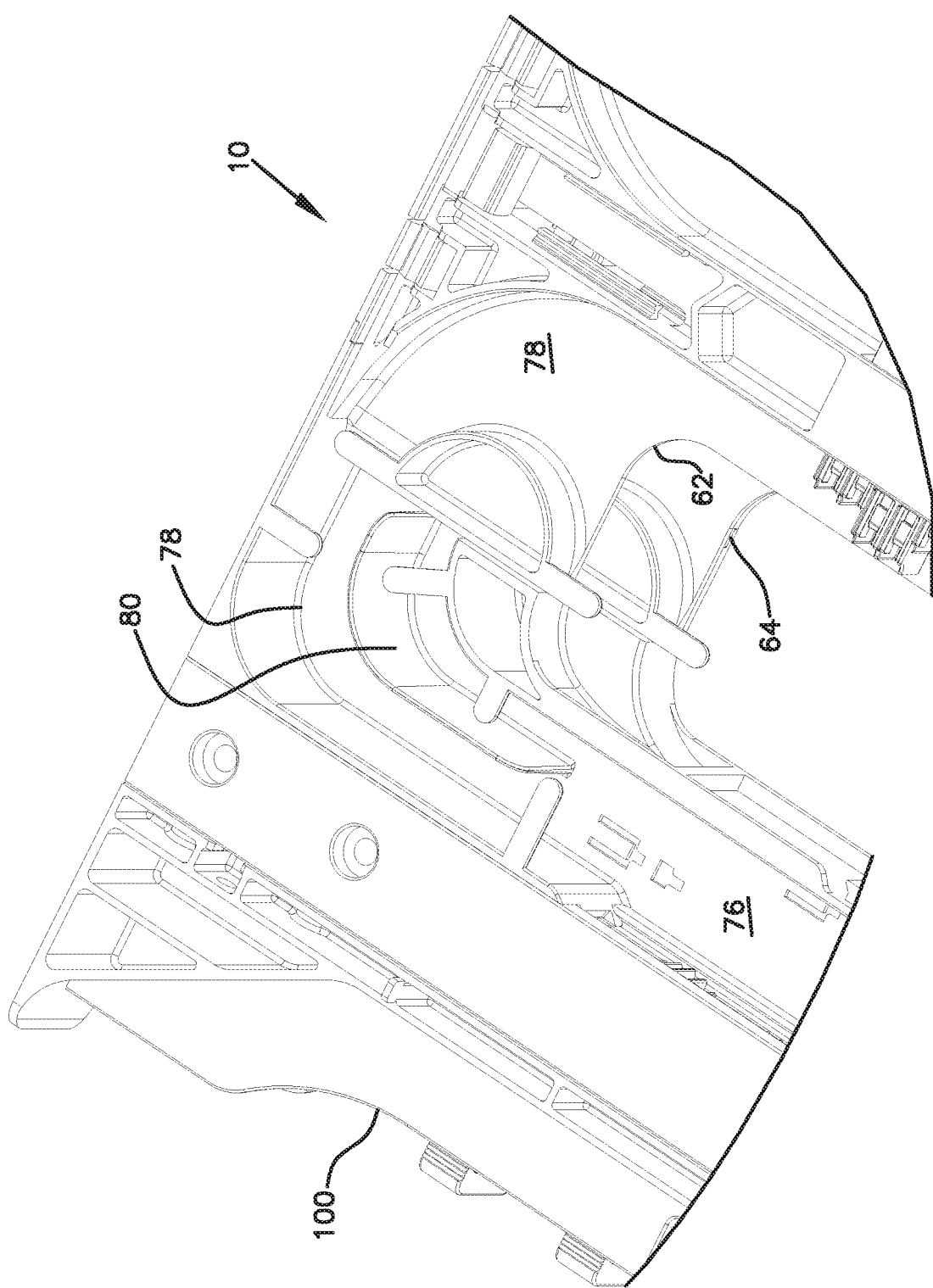
FIG. 6 shows a portion of a cable management area of the element of FIG. 1.
Figure 7:
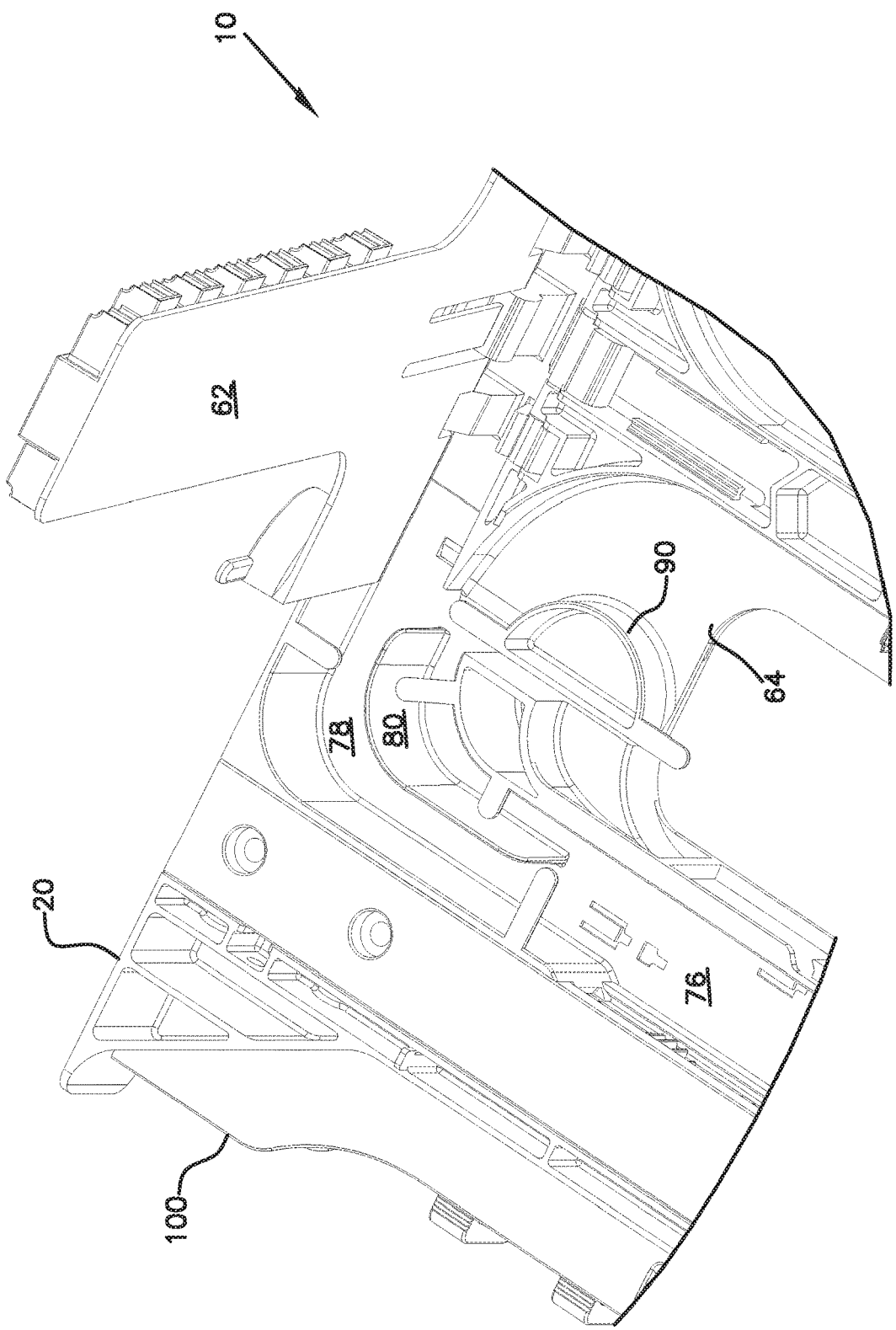
FIG. 7 shows a similar view to FIG. 6, with one of the frame members pivoted upwardly.
Figure 8:
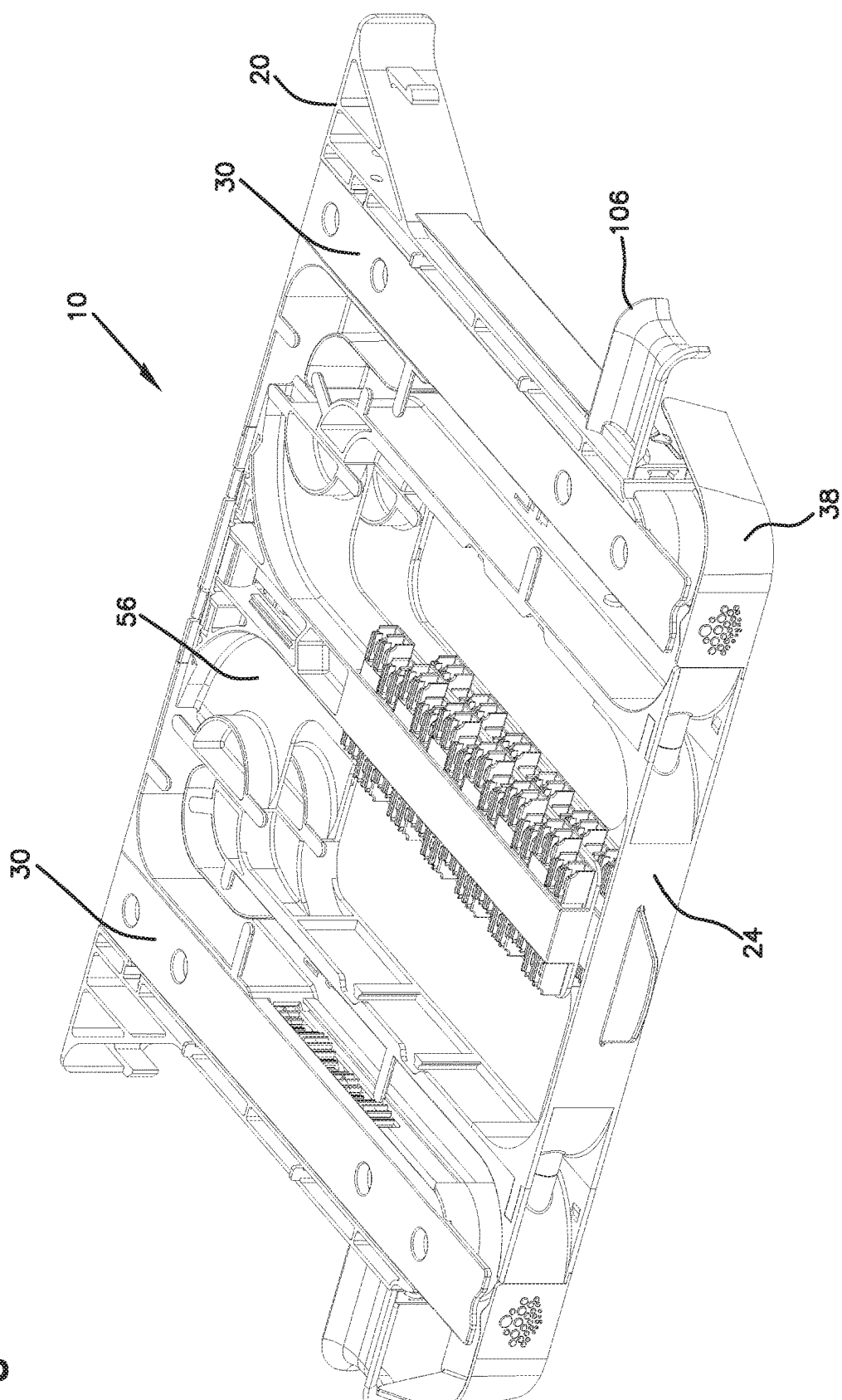
FIG. 8 shows an alternative embodiment of an element with different cable management at the entry points.
Figure 9:
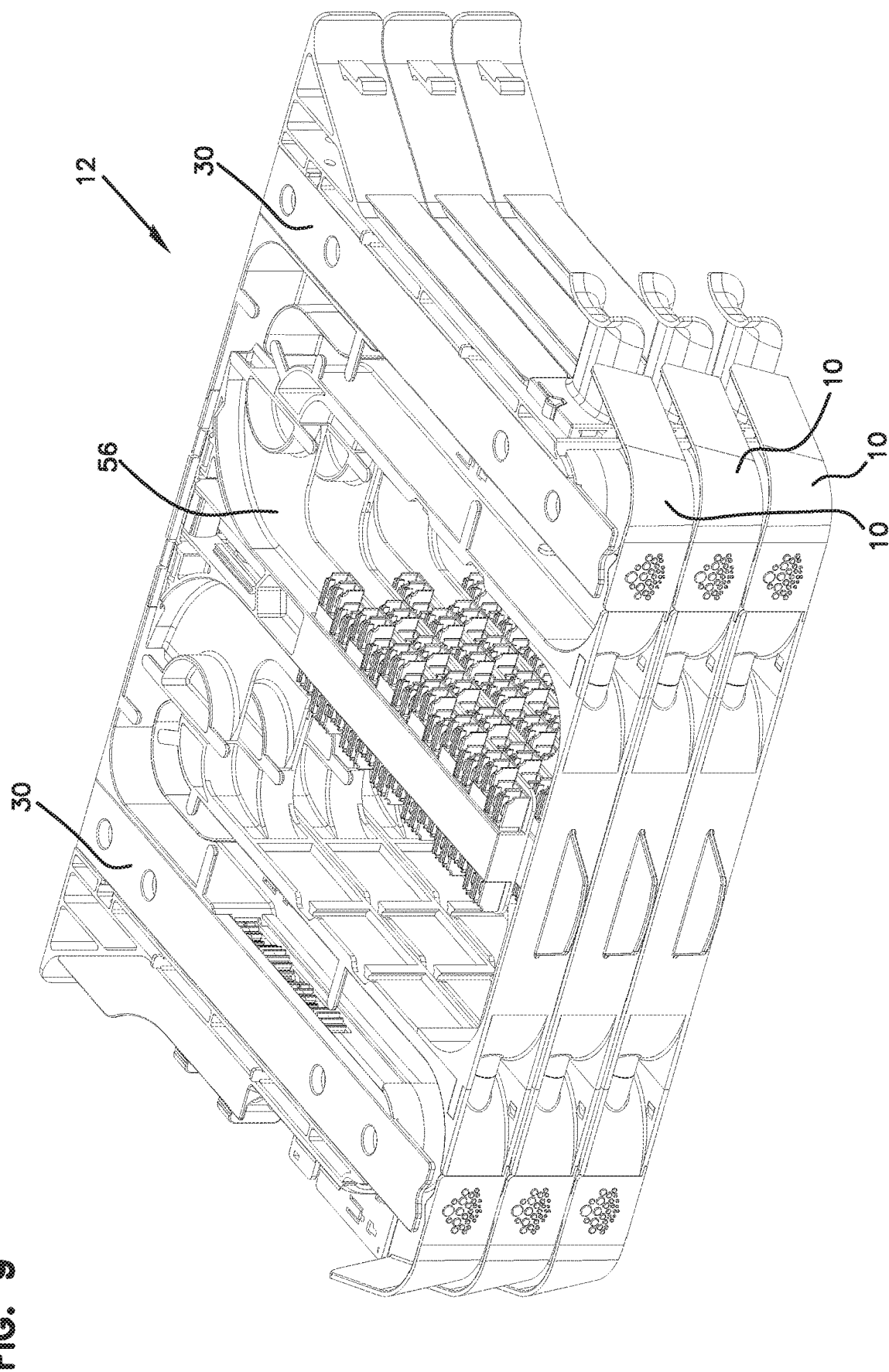
FIG. 9 shows three of the elements of FIG. 8 mounted in a block formation, with cable radius limiters at the entry point mounted in an alternative position.
Figure 10:
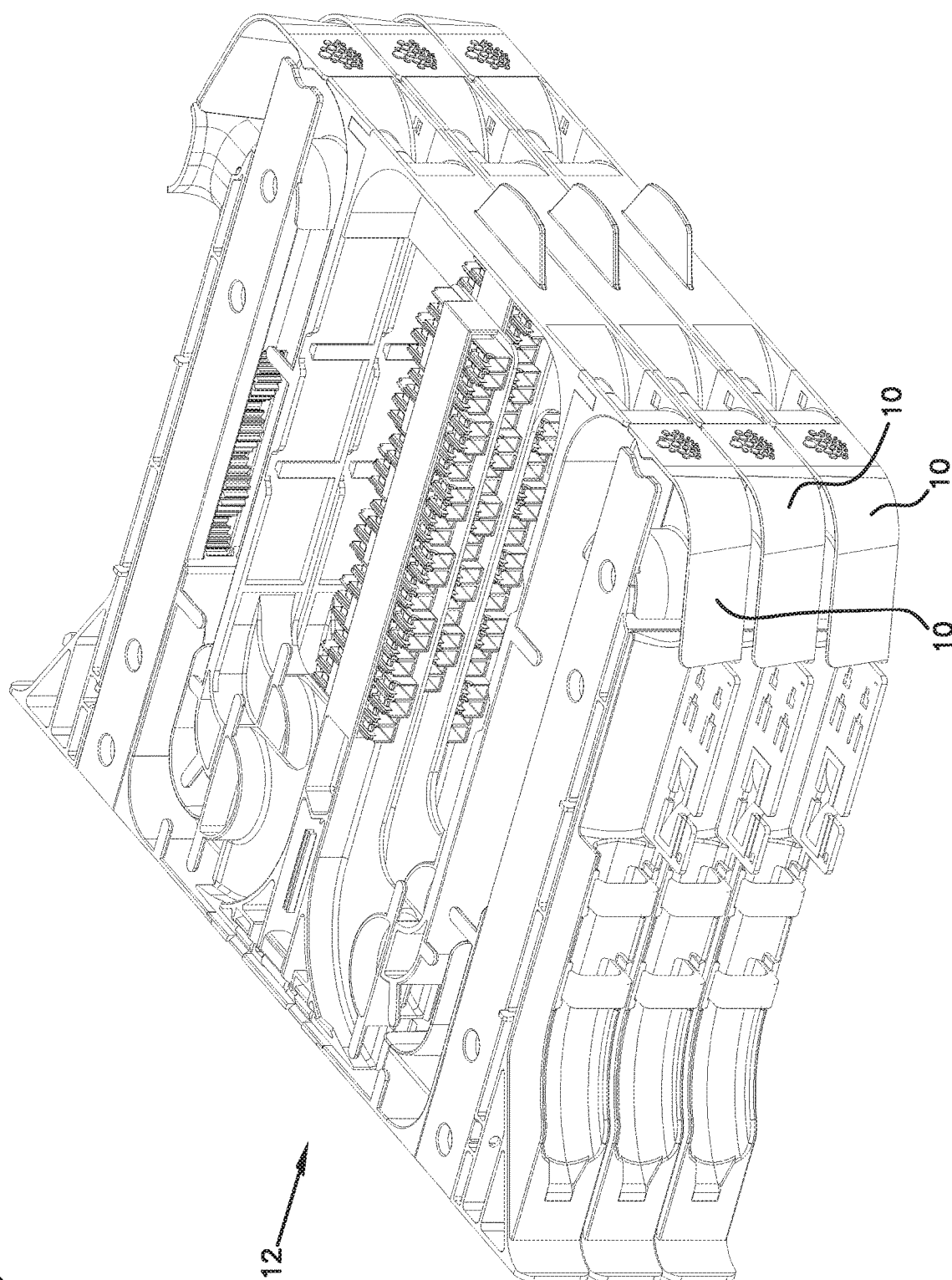
FIG. 10 is a perspective view of the block of FIG. 9.
Figure 11:
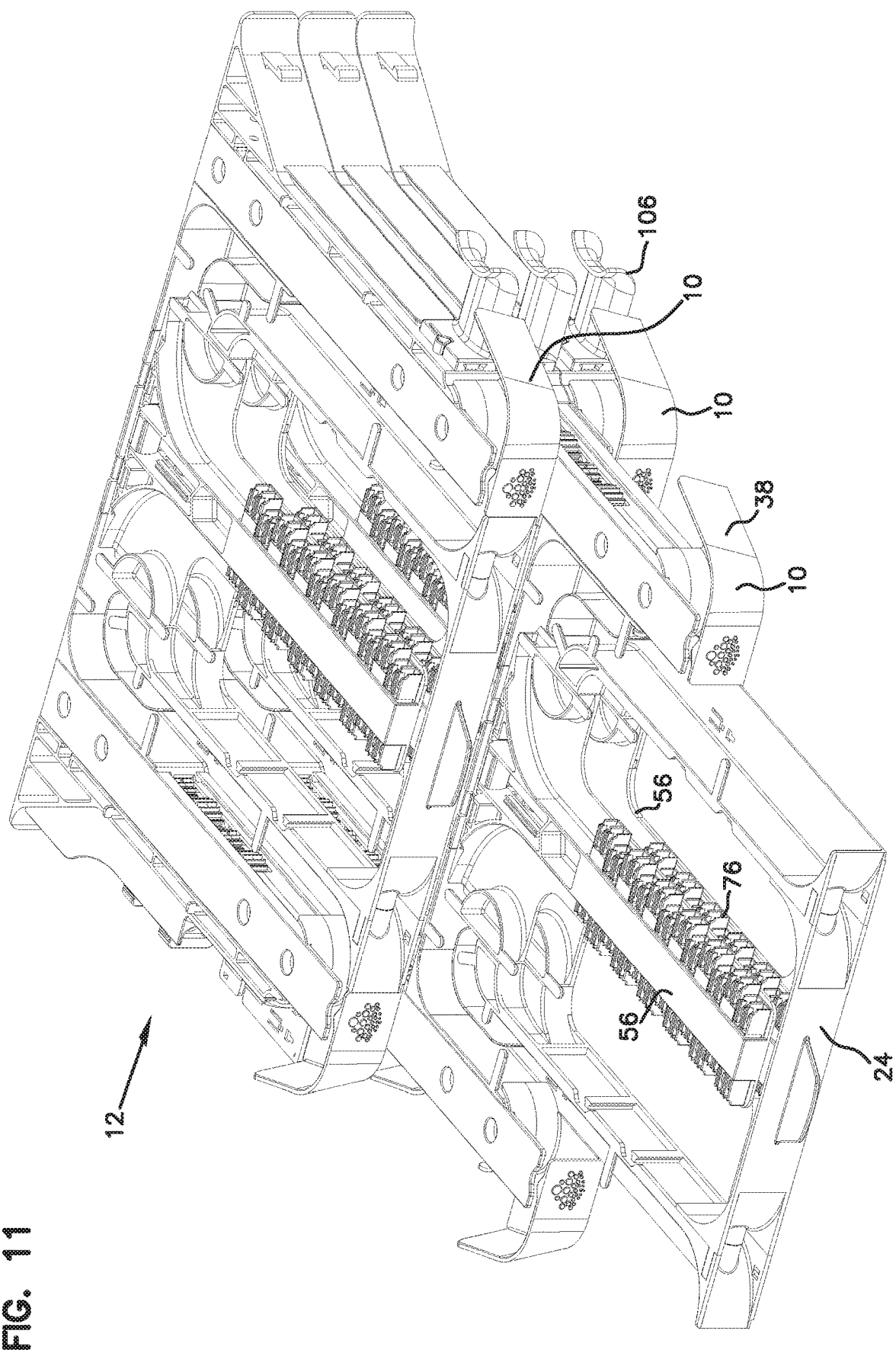
FIG. 11 is a view of the block of FIG. 9, with the tray of the middle element pulled forward for access to the fiber terminations.
Figure 12:
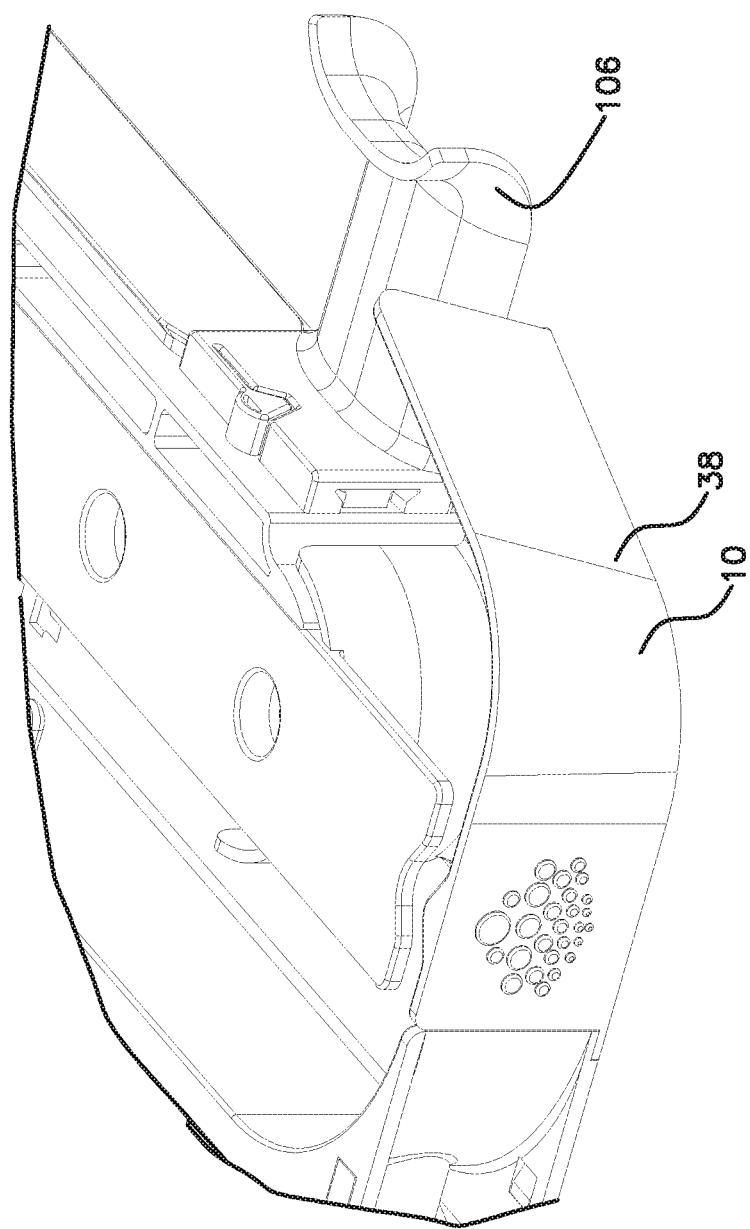
FIG. 12 shows an enlarged portion of an entry point for one of the elements with a cable radius limiter in a first position.
Figure 13:
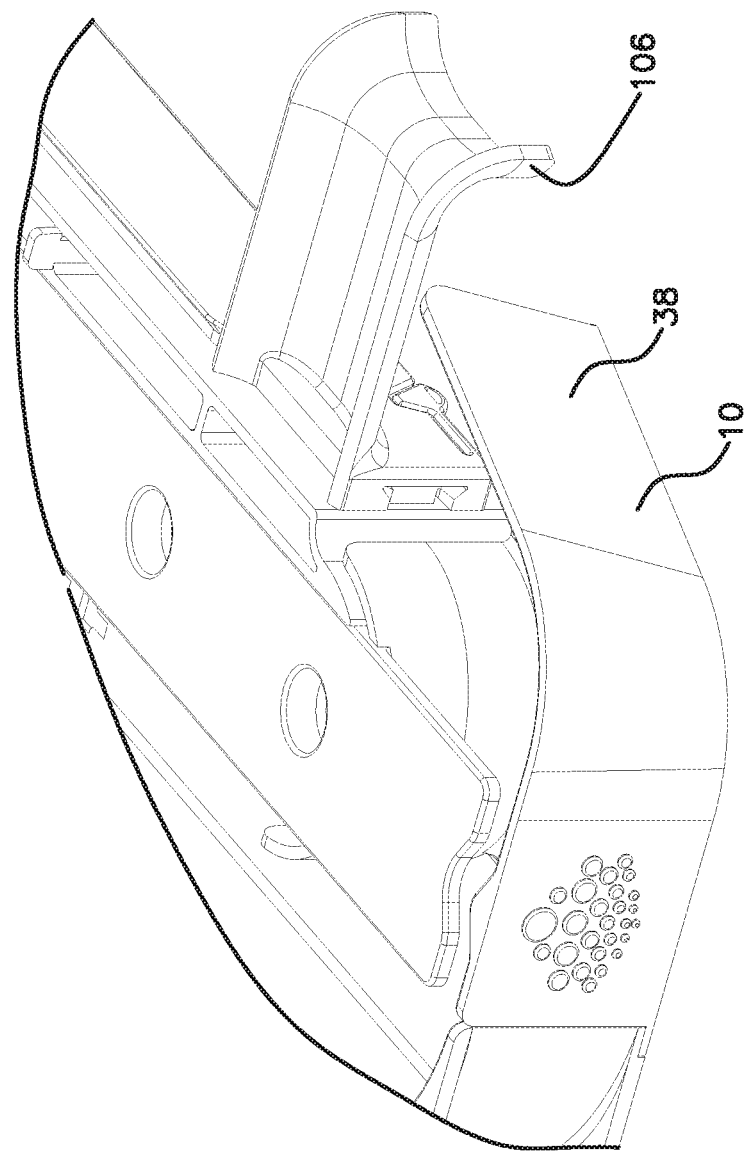
FIG. 13 shows a similar view as in FIG. 12, with the cable radius limiter positioned in an alternate position.
Figure 14:
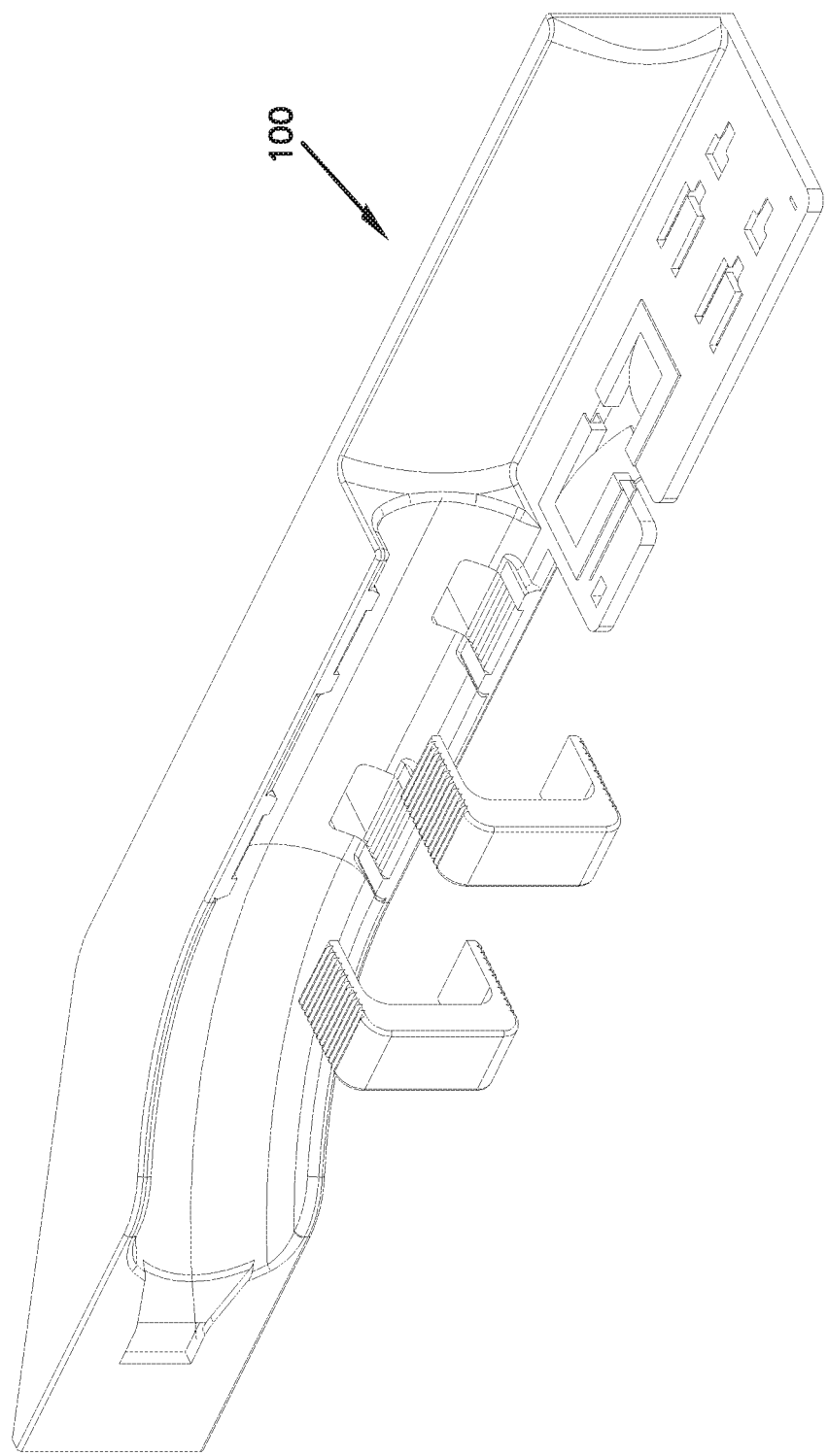
FIG. 14 shows an exploded view of a cable mount.
Figure 15:
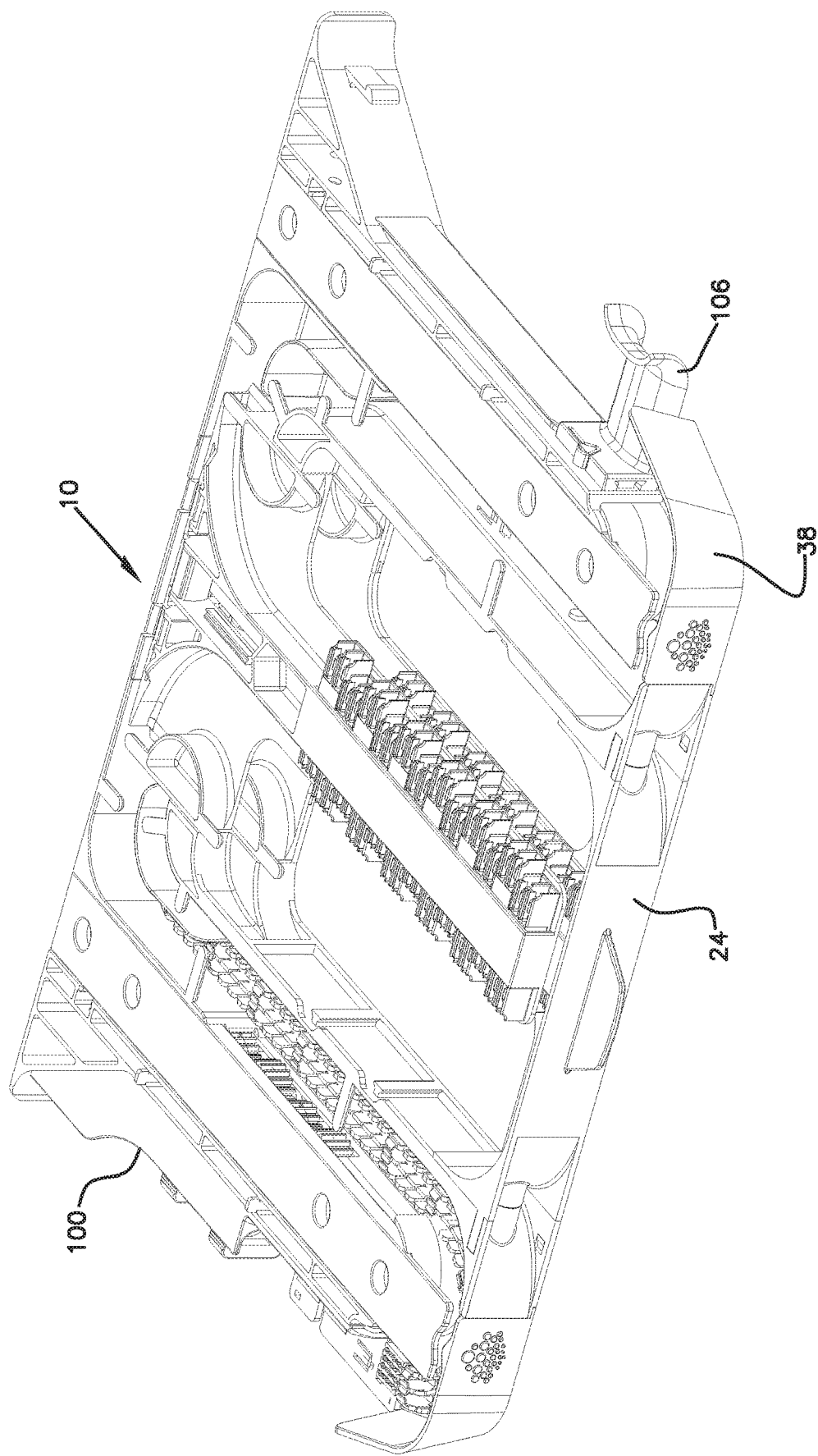
FIG. 15 shows an element with a cable mount on one side, and a cable radius limiter on an opposite side.
Figure 16:
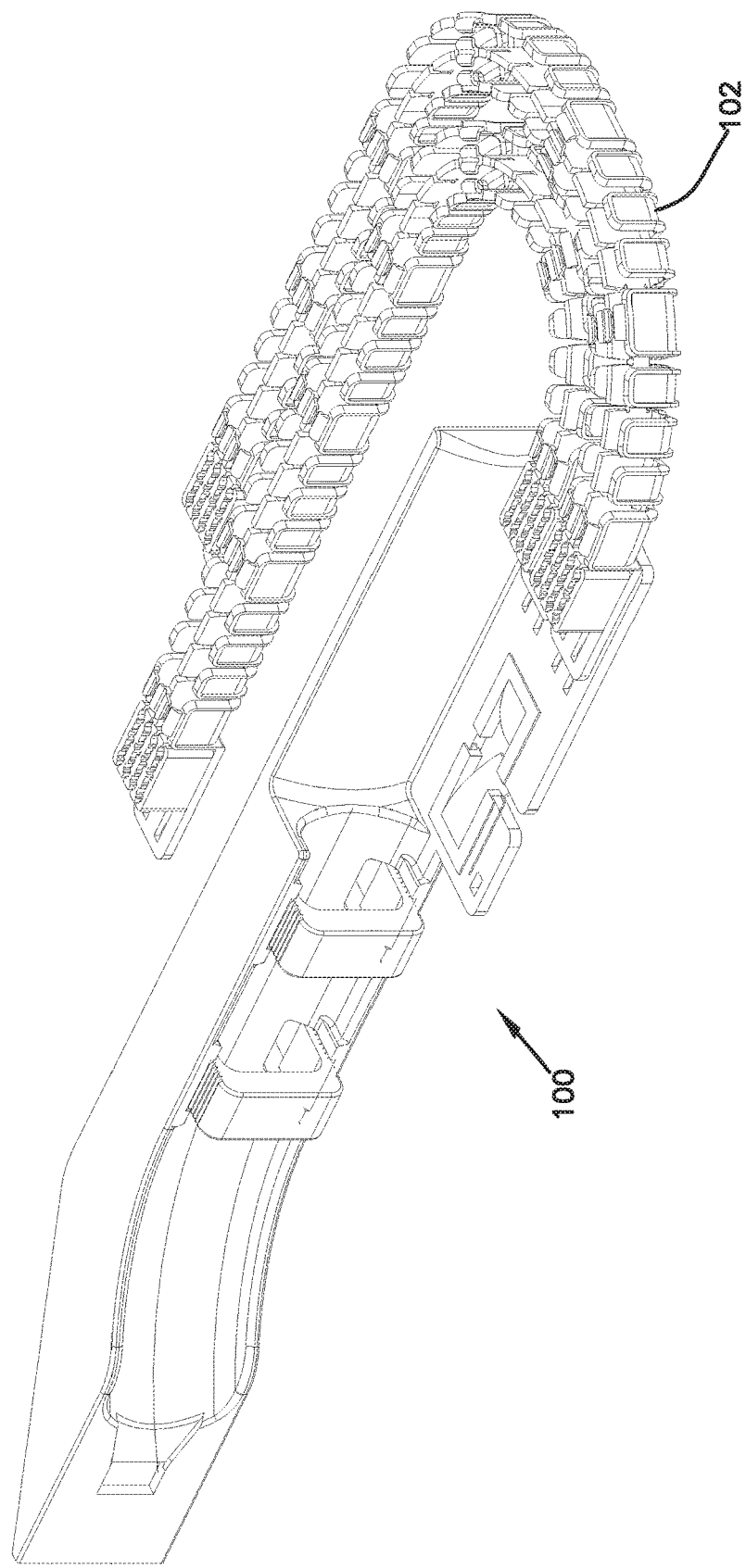
FIG. 16 shows an alternative cable mount.
Figure 17:
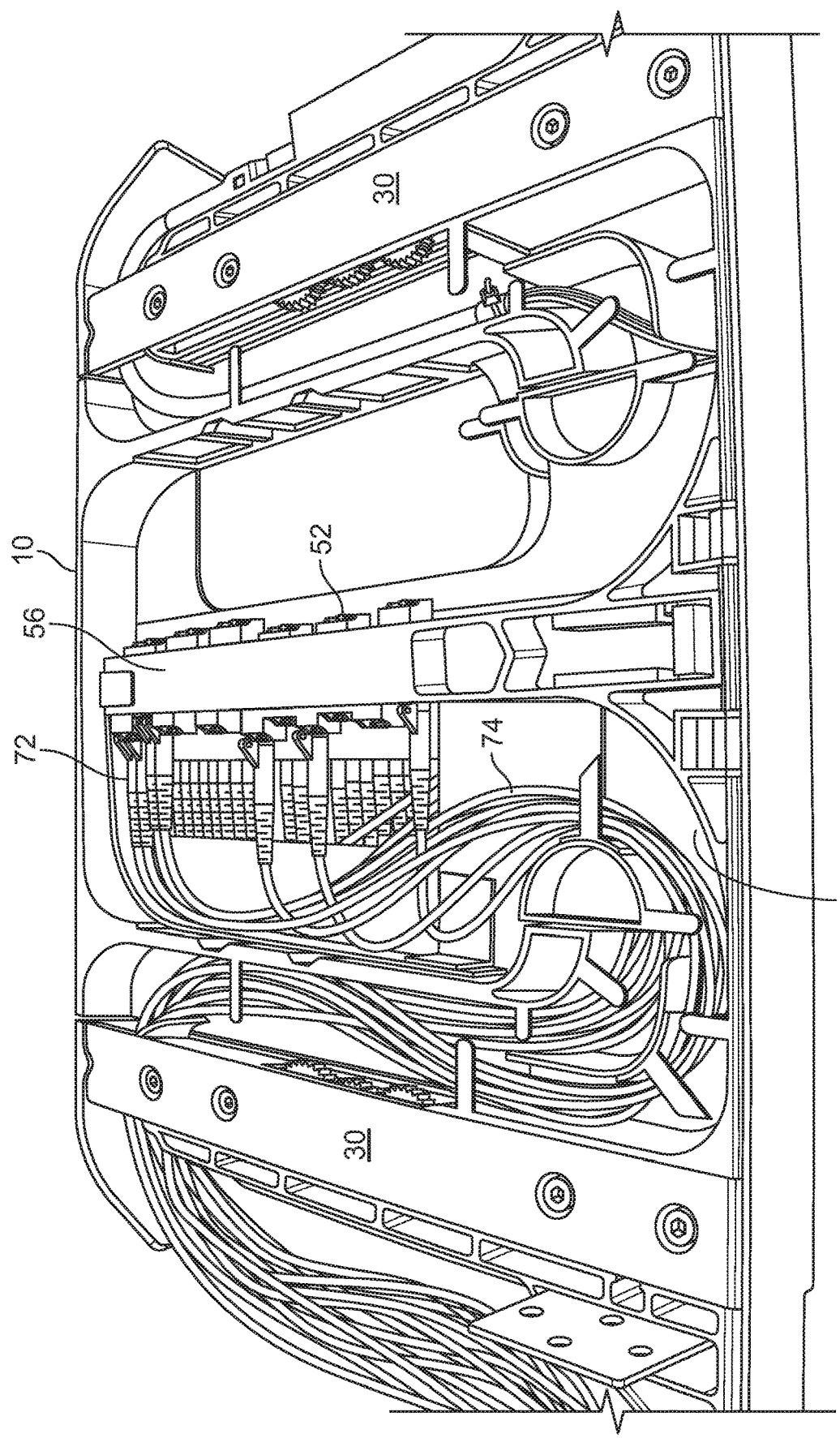
FIGS. 17-29 show various views of the elements shown in FIGS. 1-16 including additional details and cable routings shown for illustration purposes.
Figure 18:
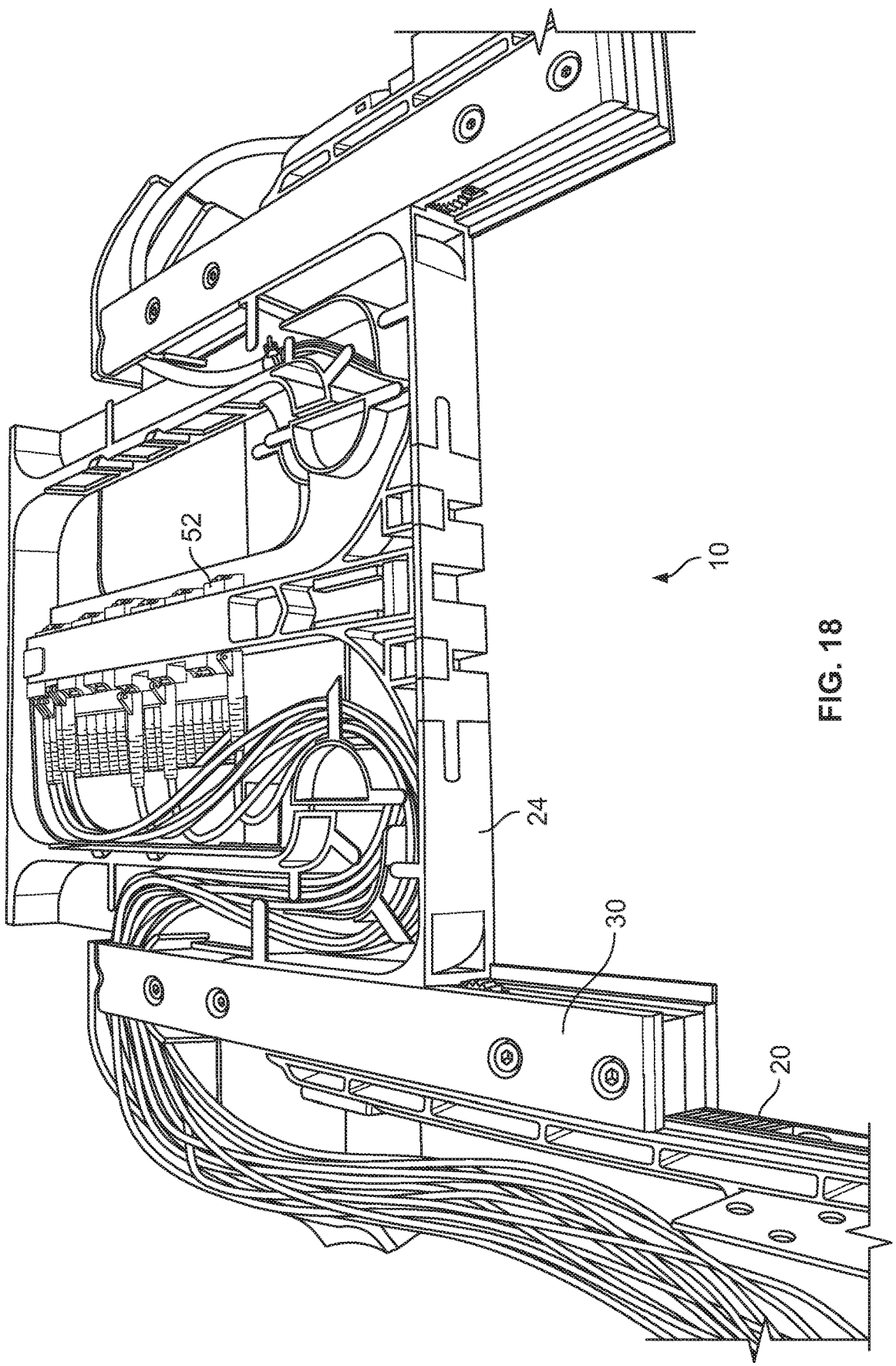
Figure 19:
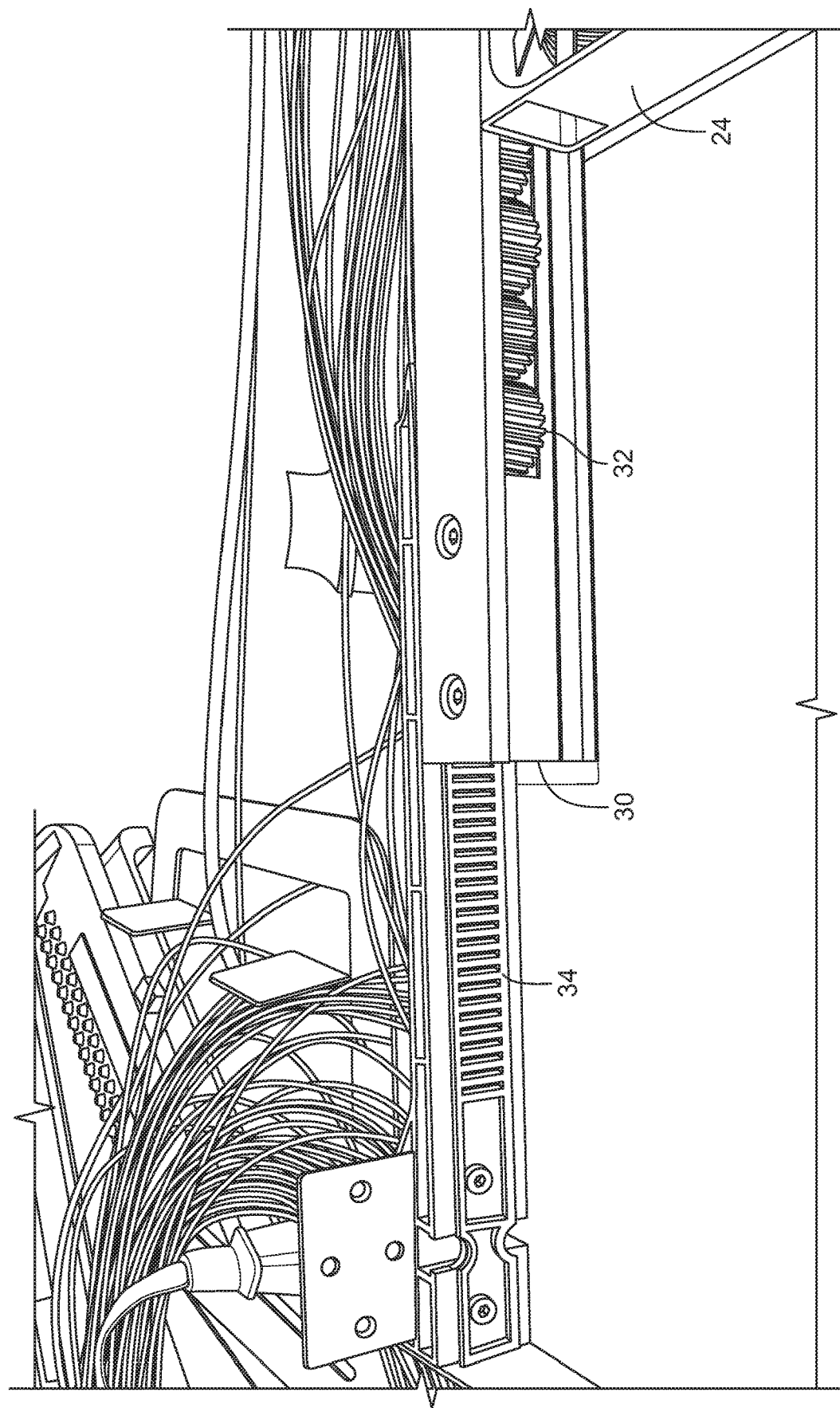
Figure 20:
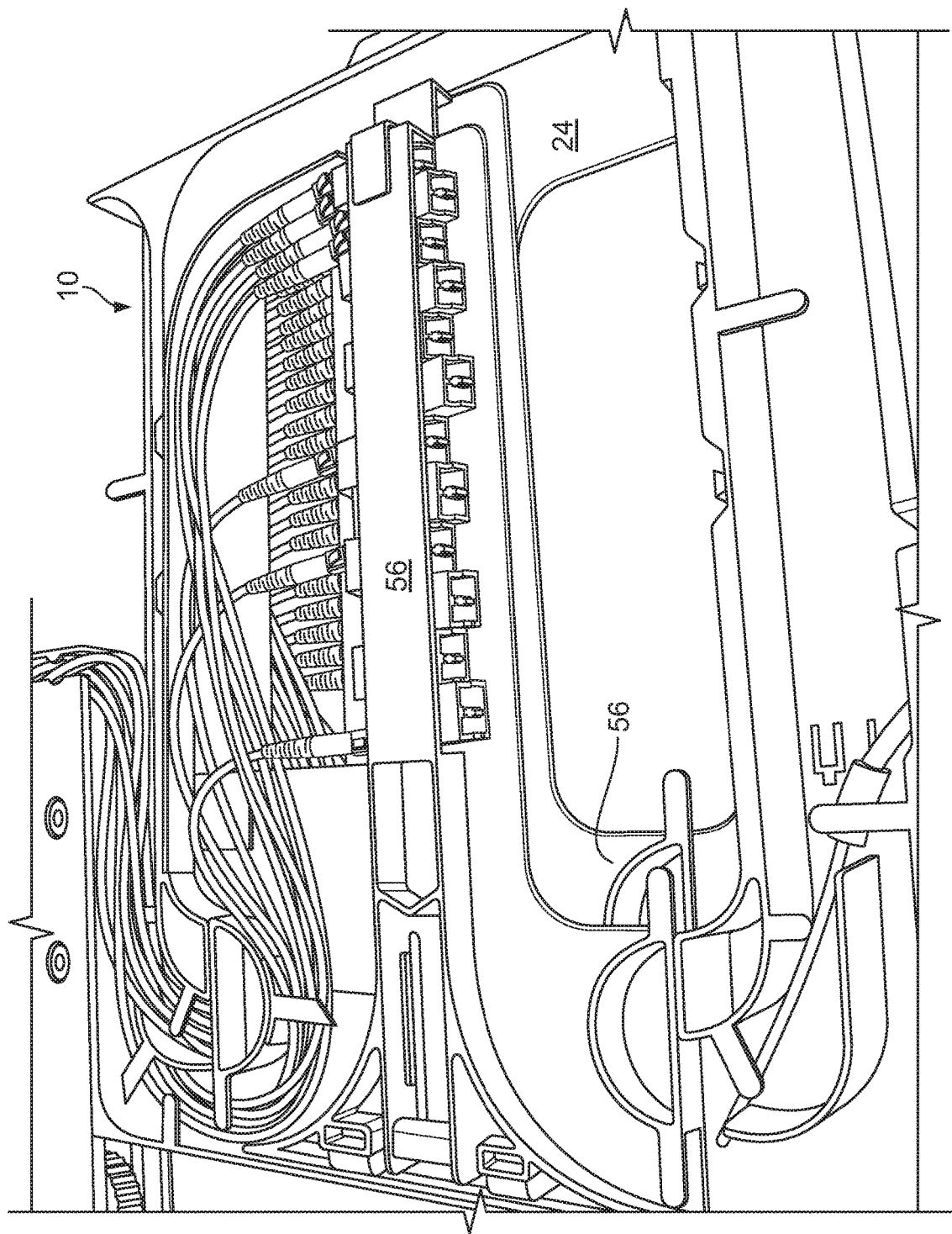
Figure 21:
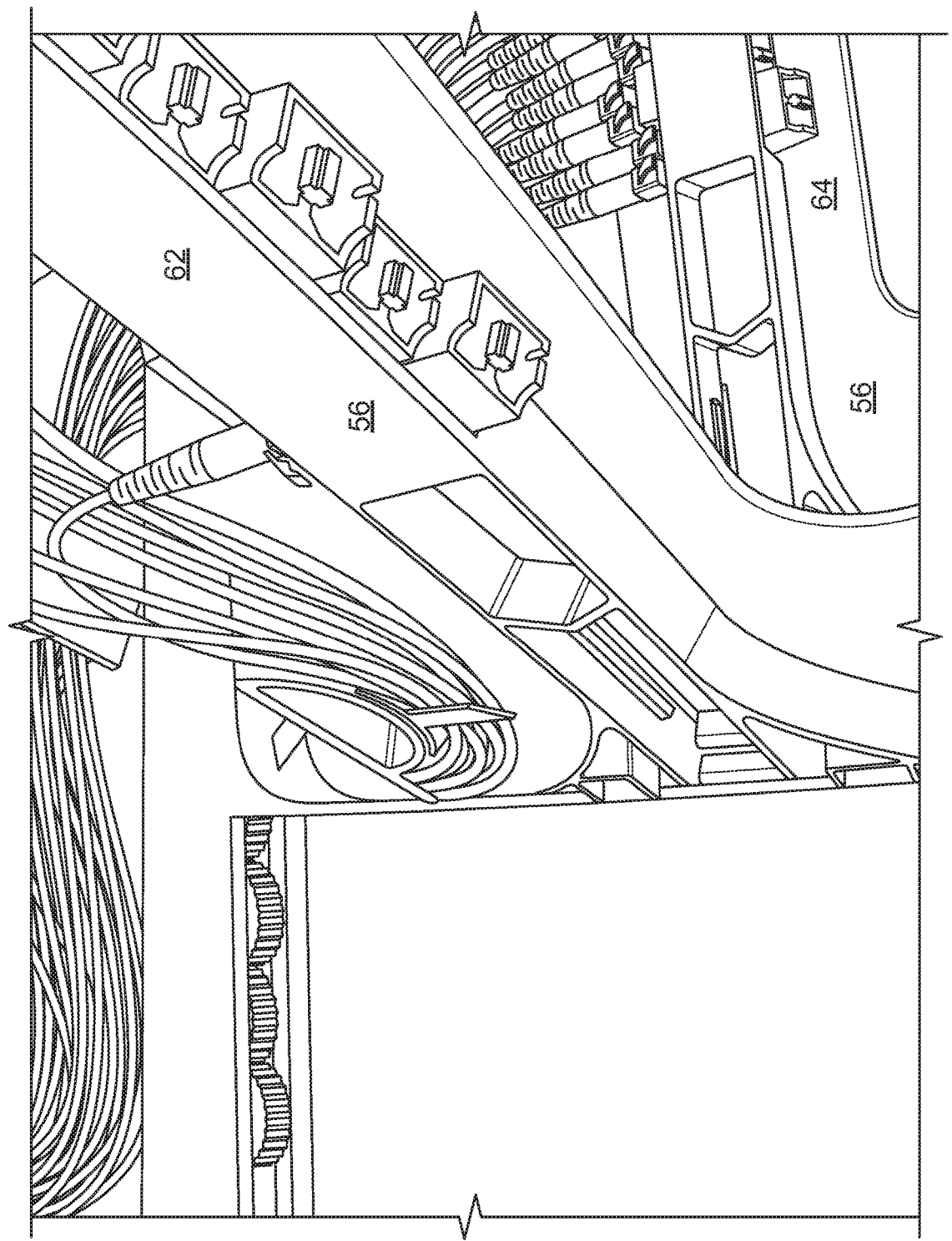
Figure 22:
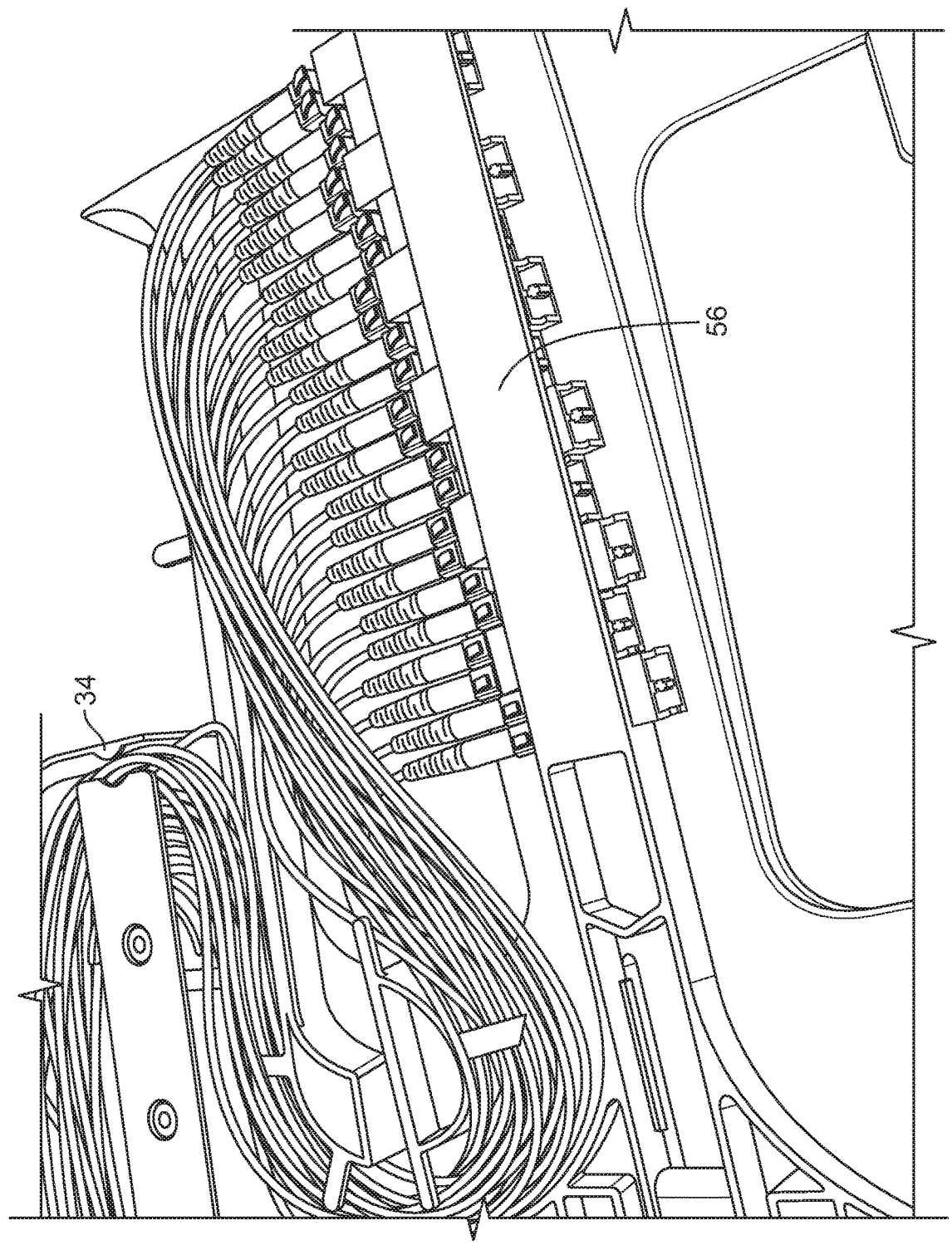
Figure 23:
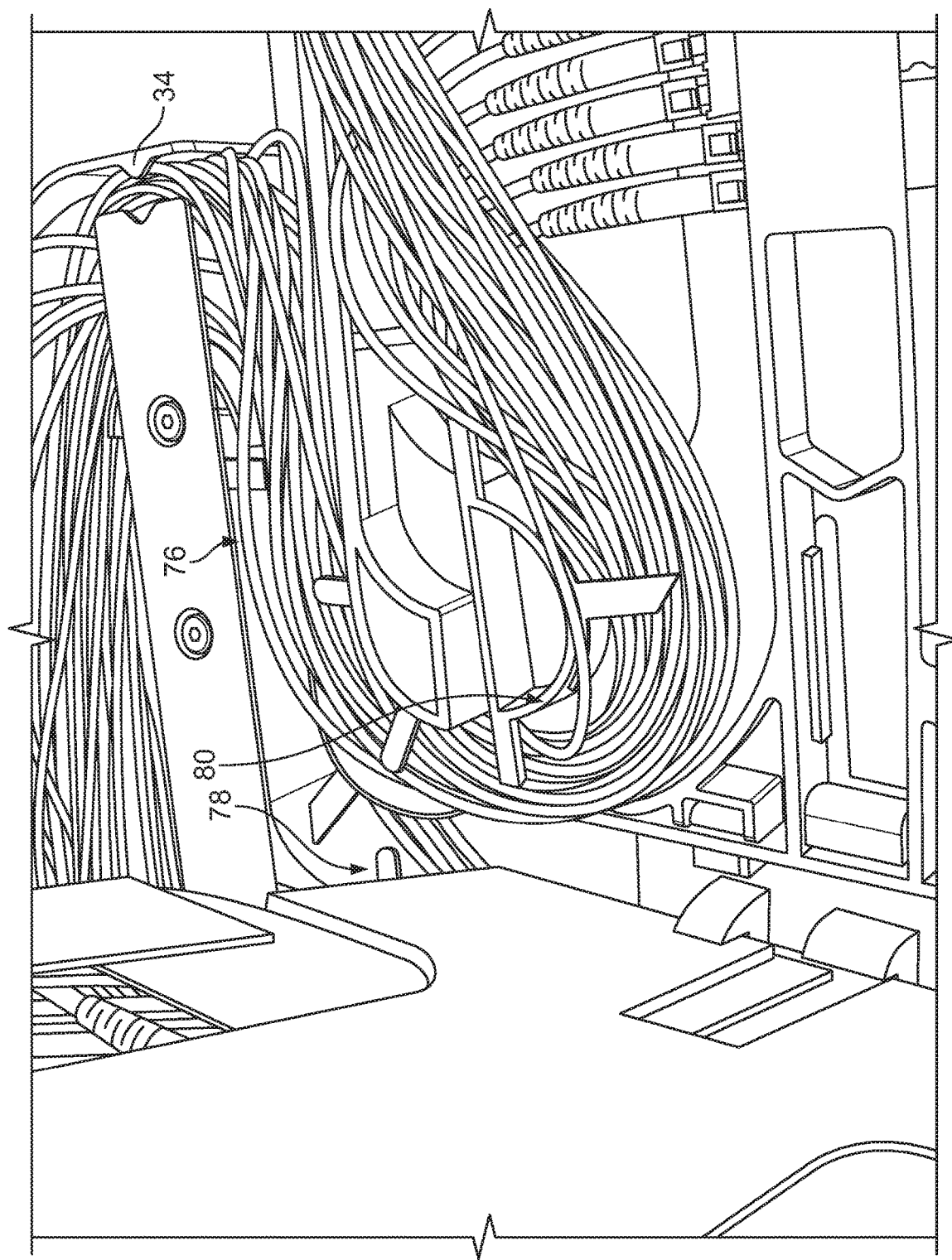
Figure 24:
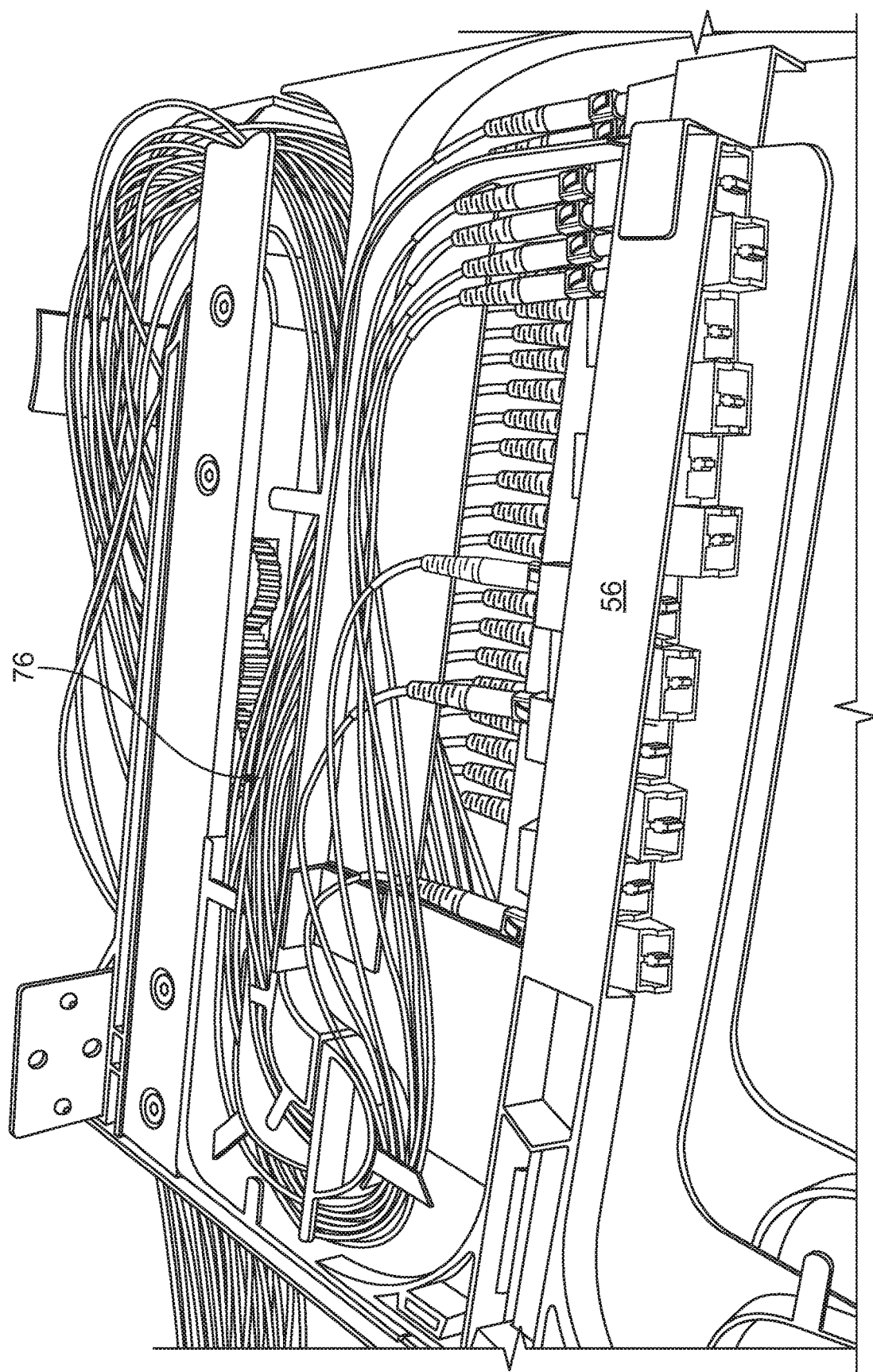
Figure 25:
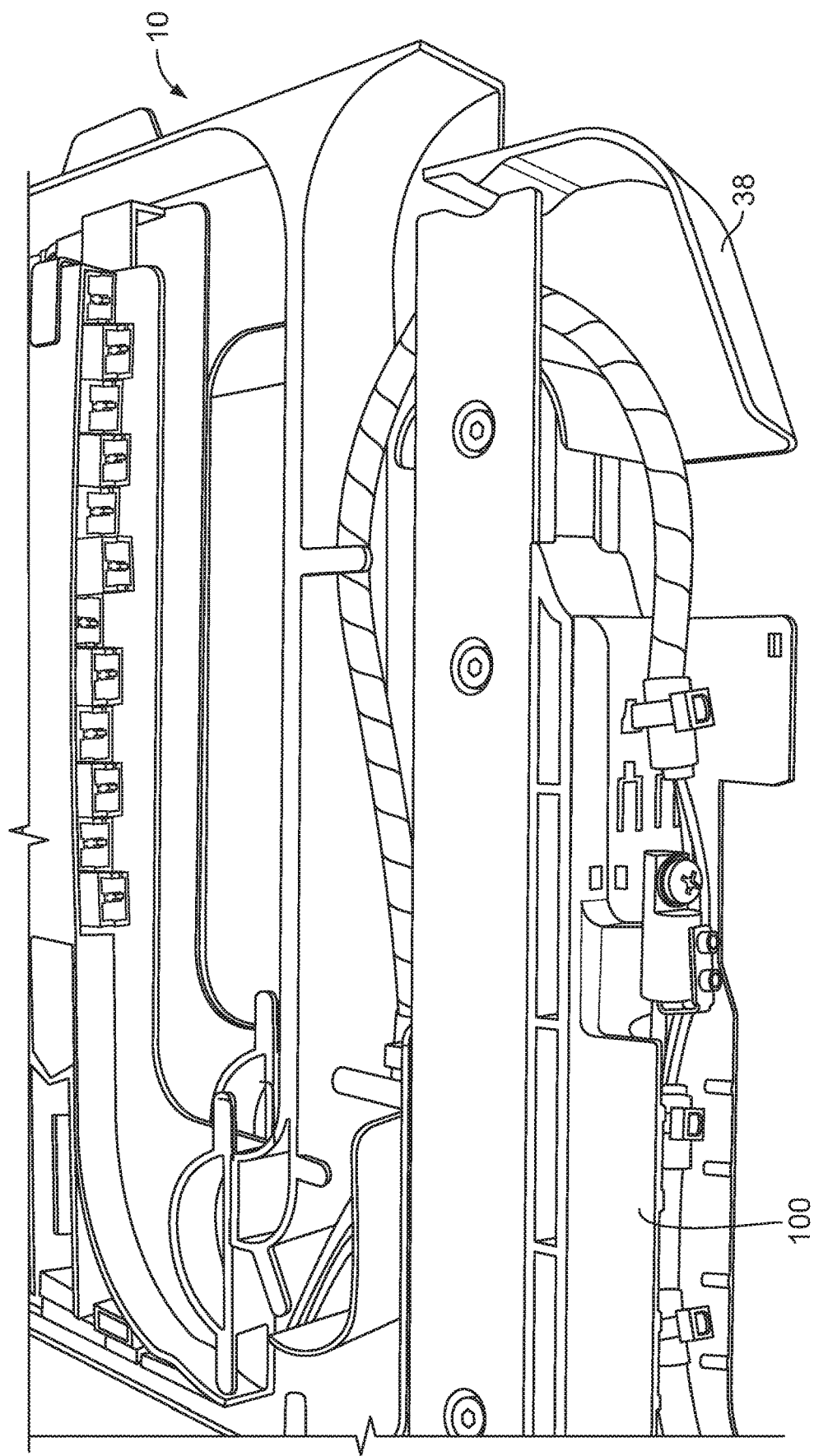
Figure 26:
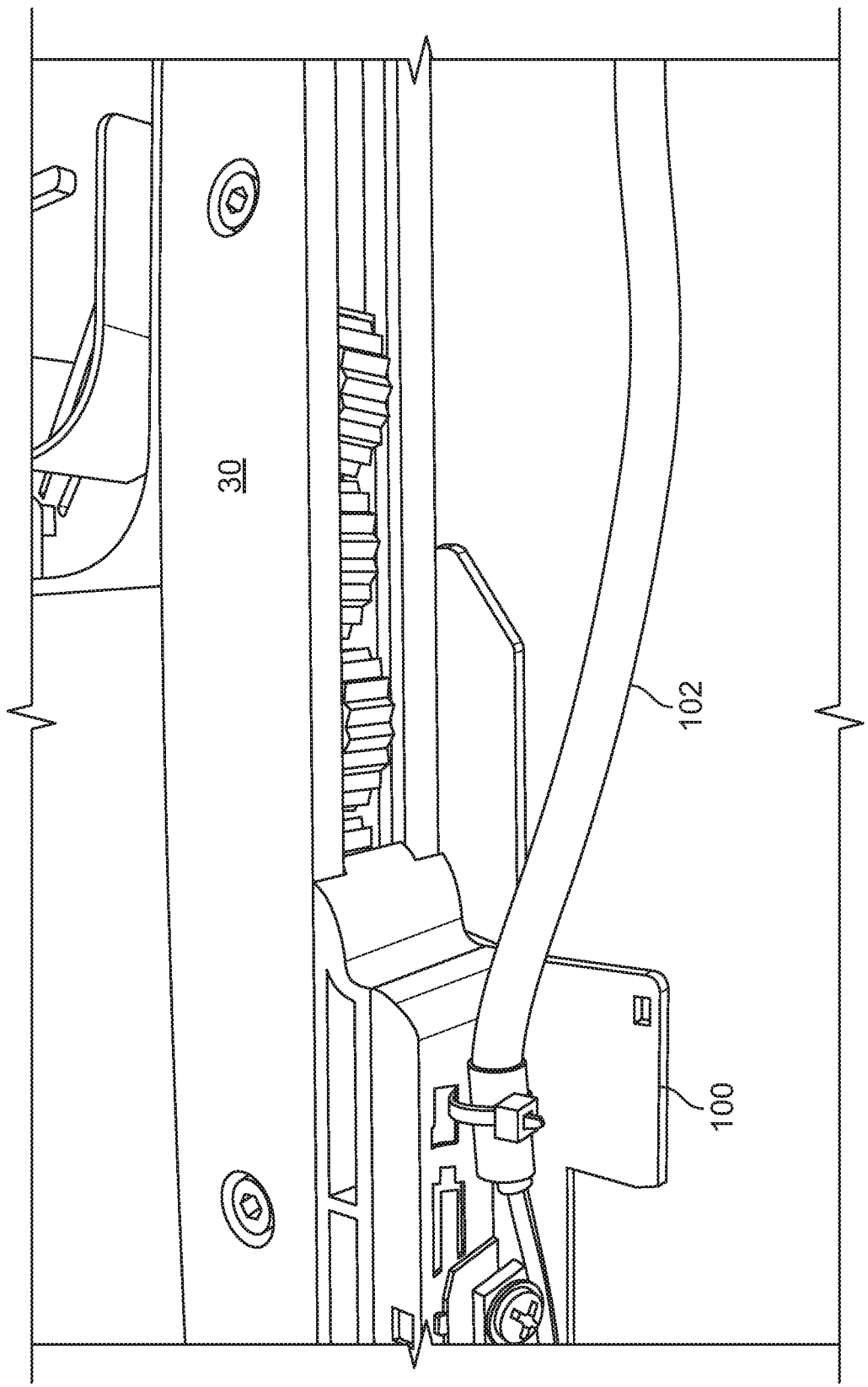
Figure 27:
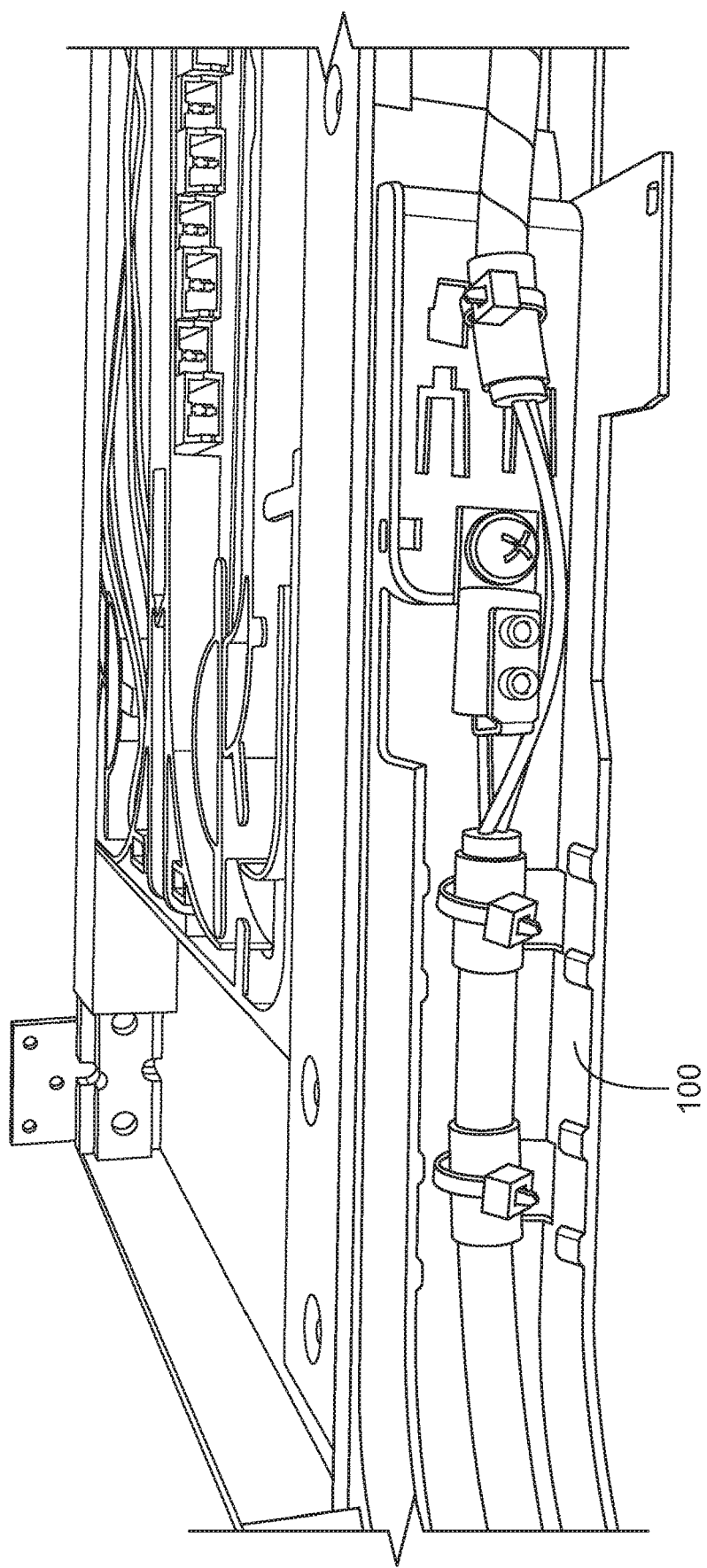
Figure 28:
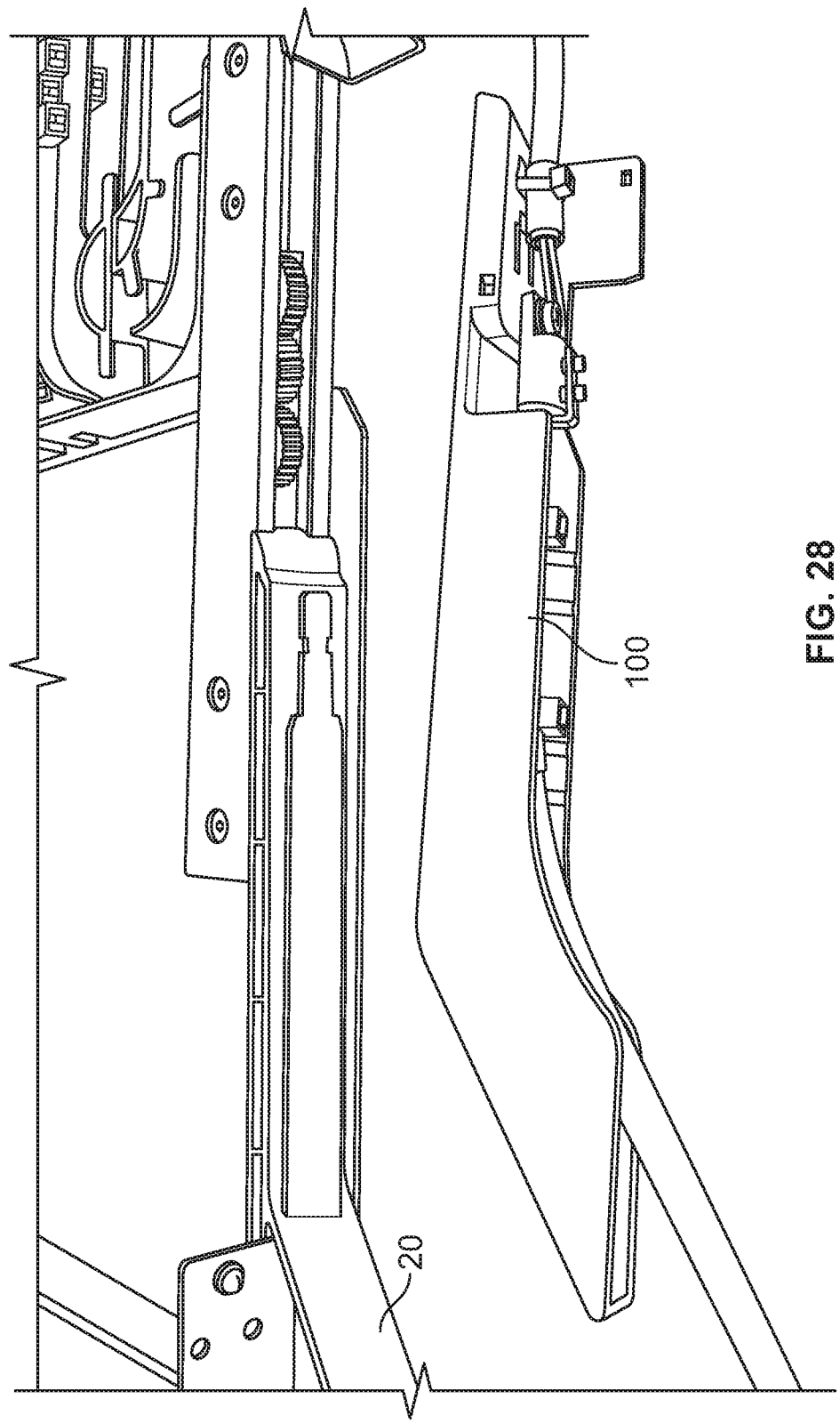
Figure 29:
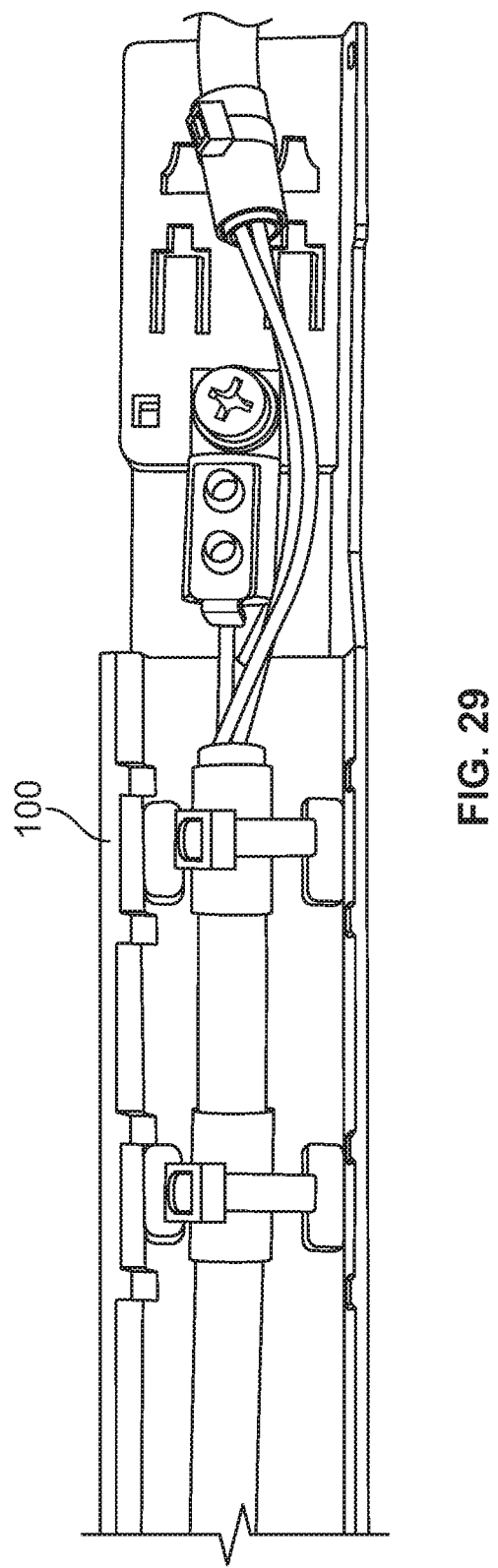
Figure 30:
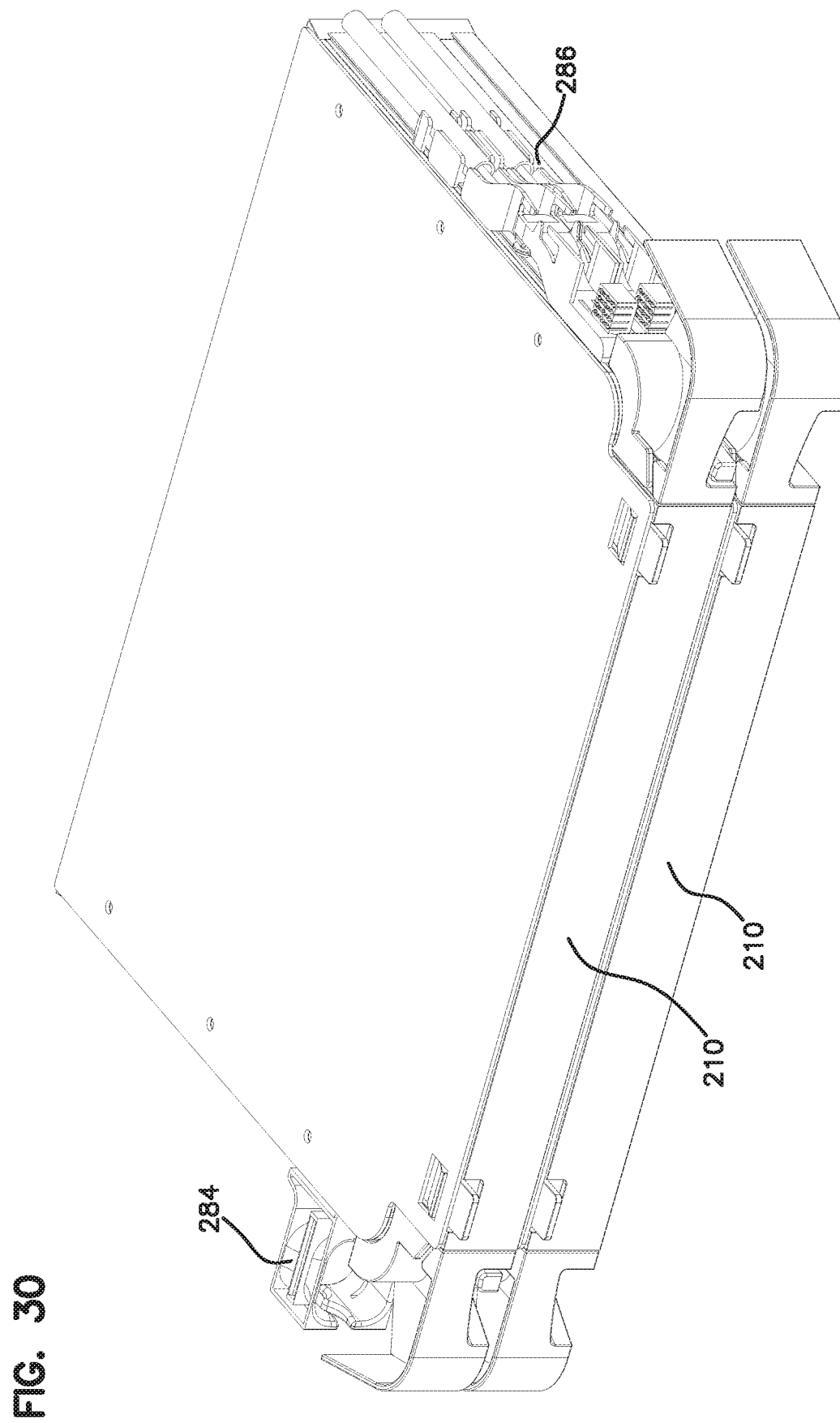
FIG. 30 shows an alternative embodiment of a block of two alternative elements.
Figure 31:
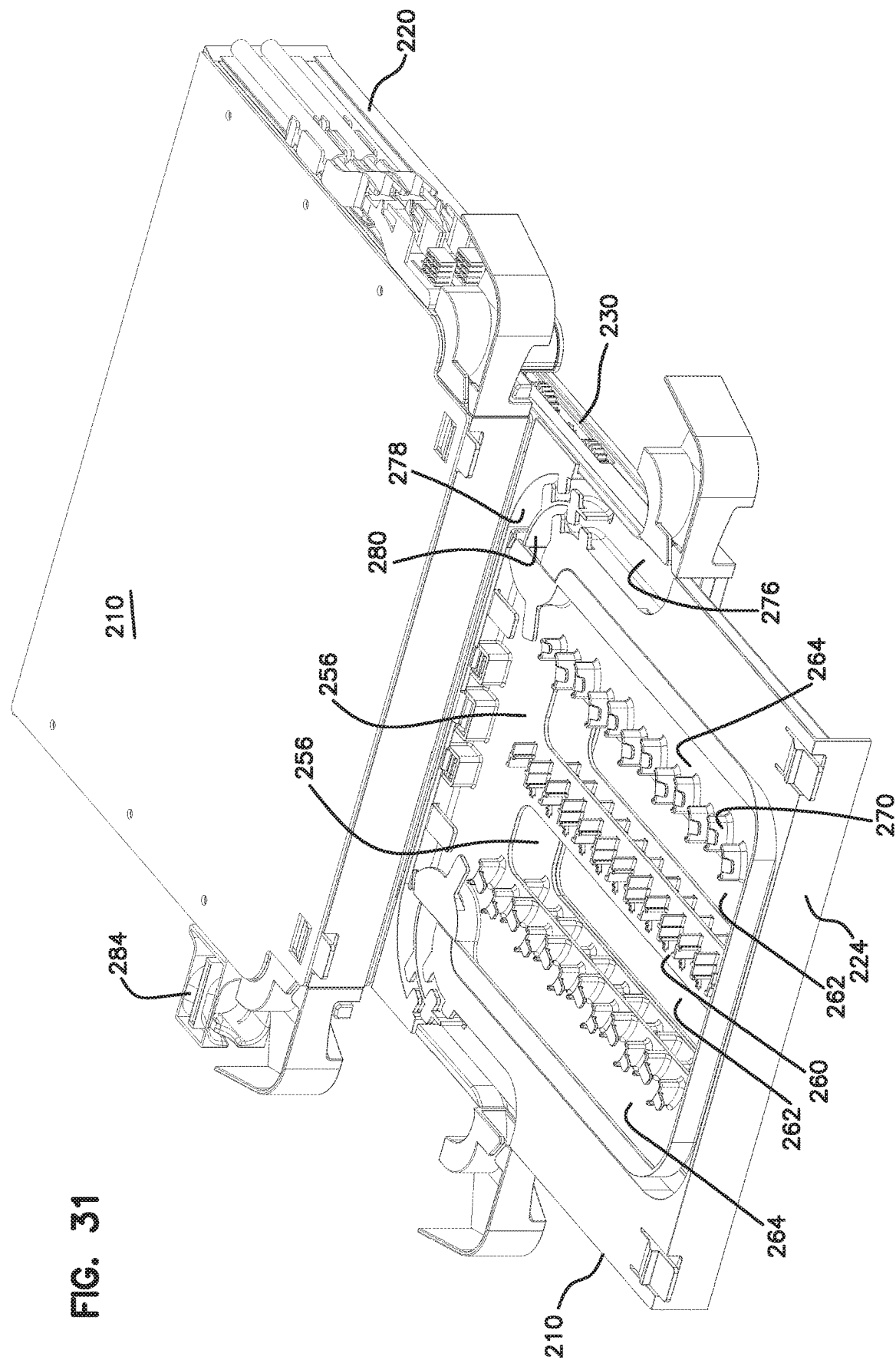
FIG. 31 shows a tray pulled forward from the chassis of one of the elements of the block of FIG. 30.
Figure 32:
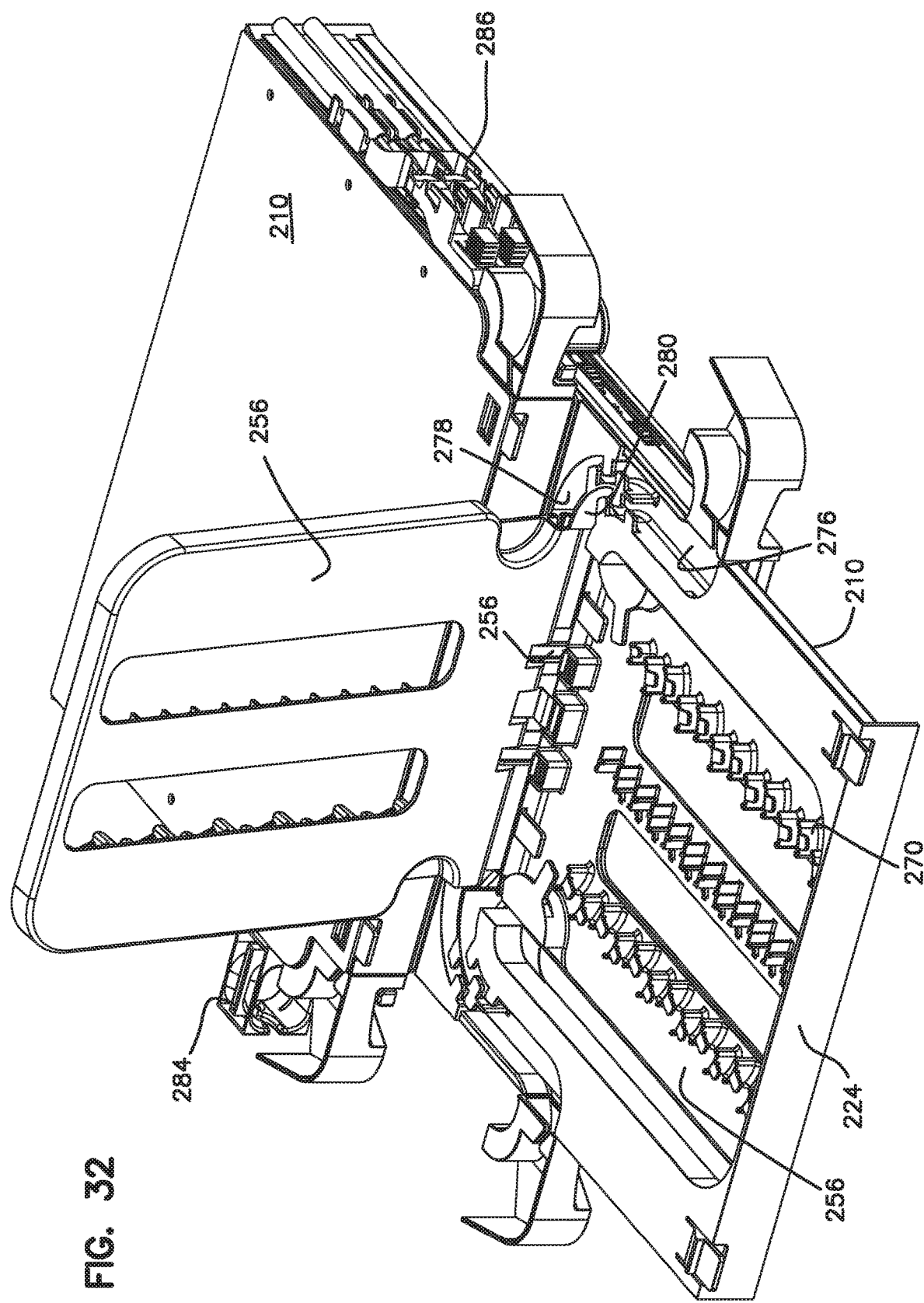
FIG. 32 shows the tray extended forward as in the view of FIG. 31, with one of the frame members pivoted upwardly.
Figure 33:
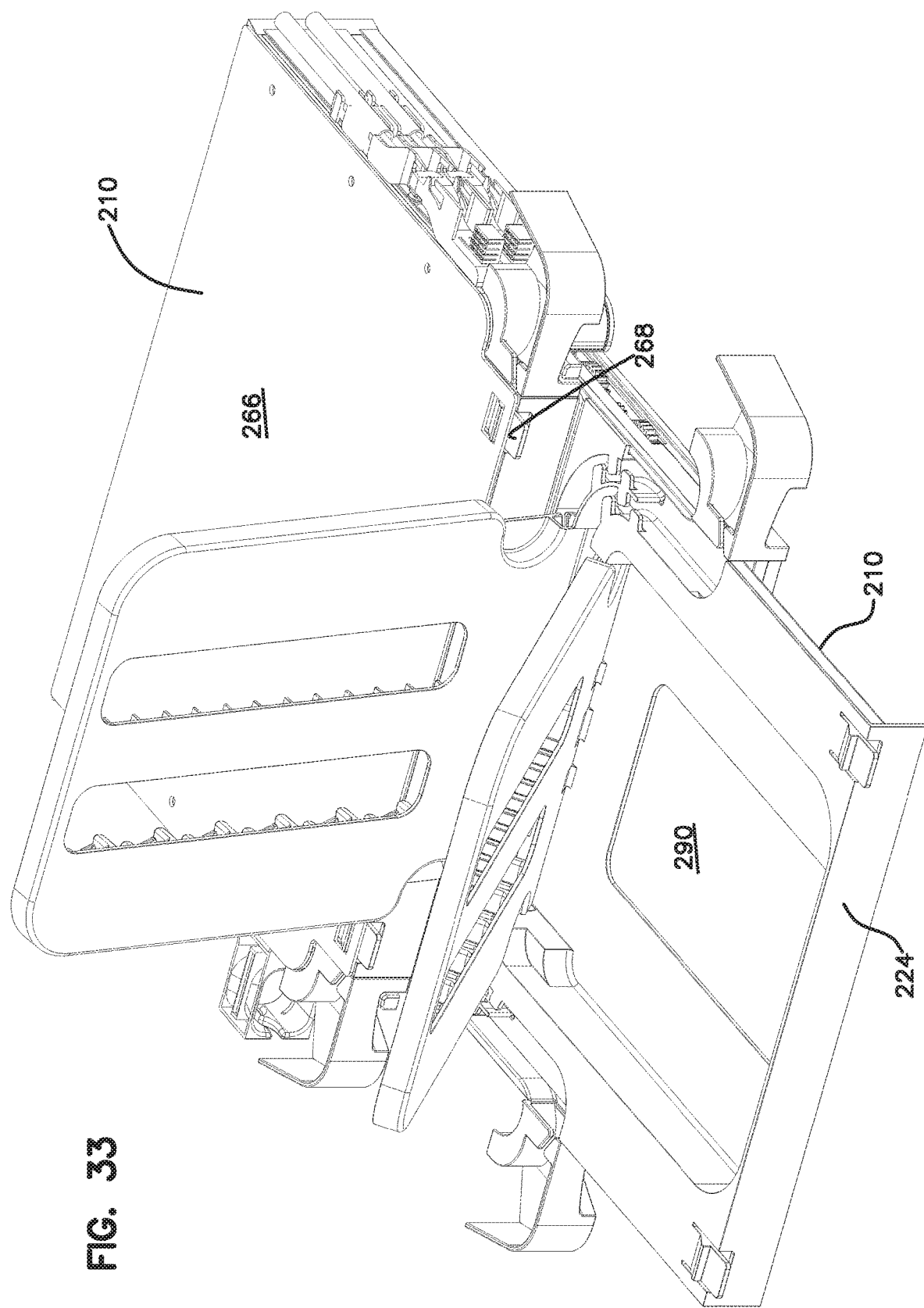
FIG. 33 is a view similar to the view of FIG. 32, with a second frame member pivoted upwardly.
Figure 34:
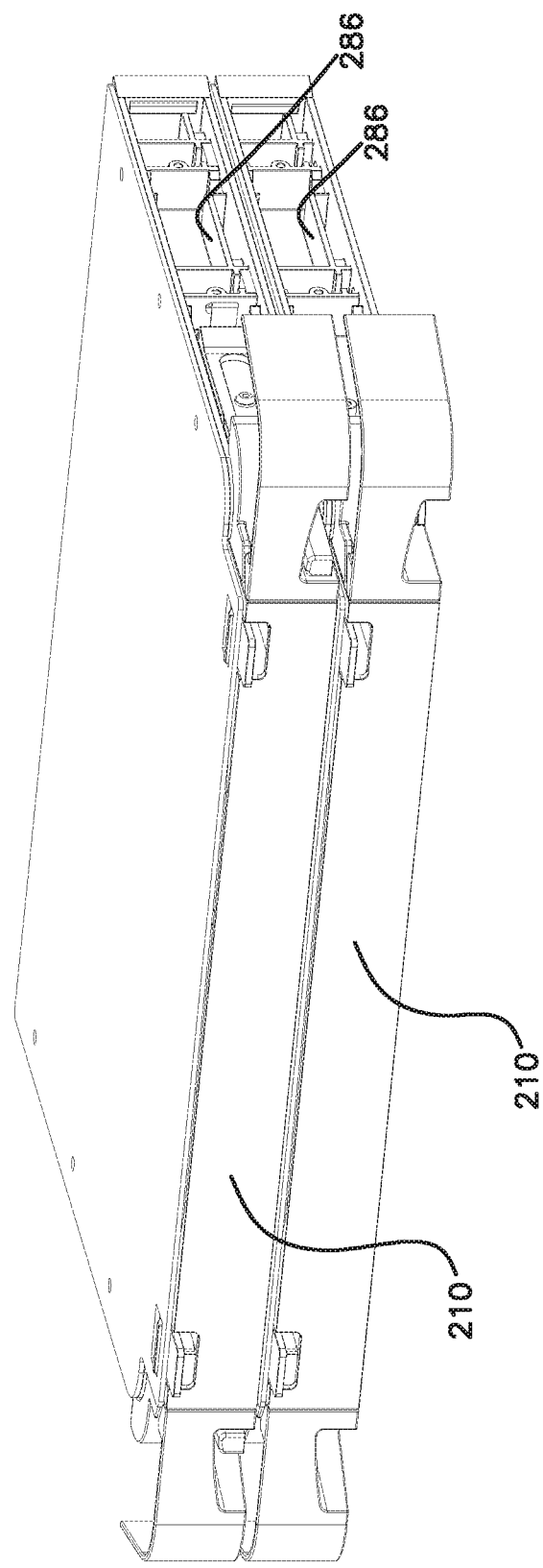
FIG. 34 shows a block including two elements.
Figure 35:
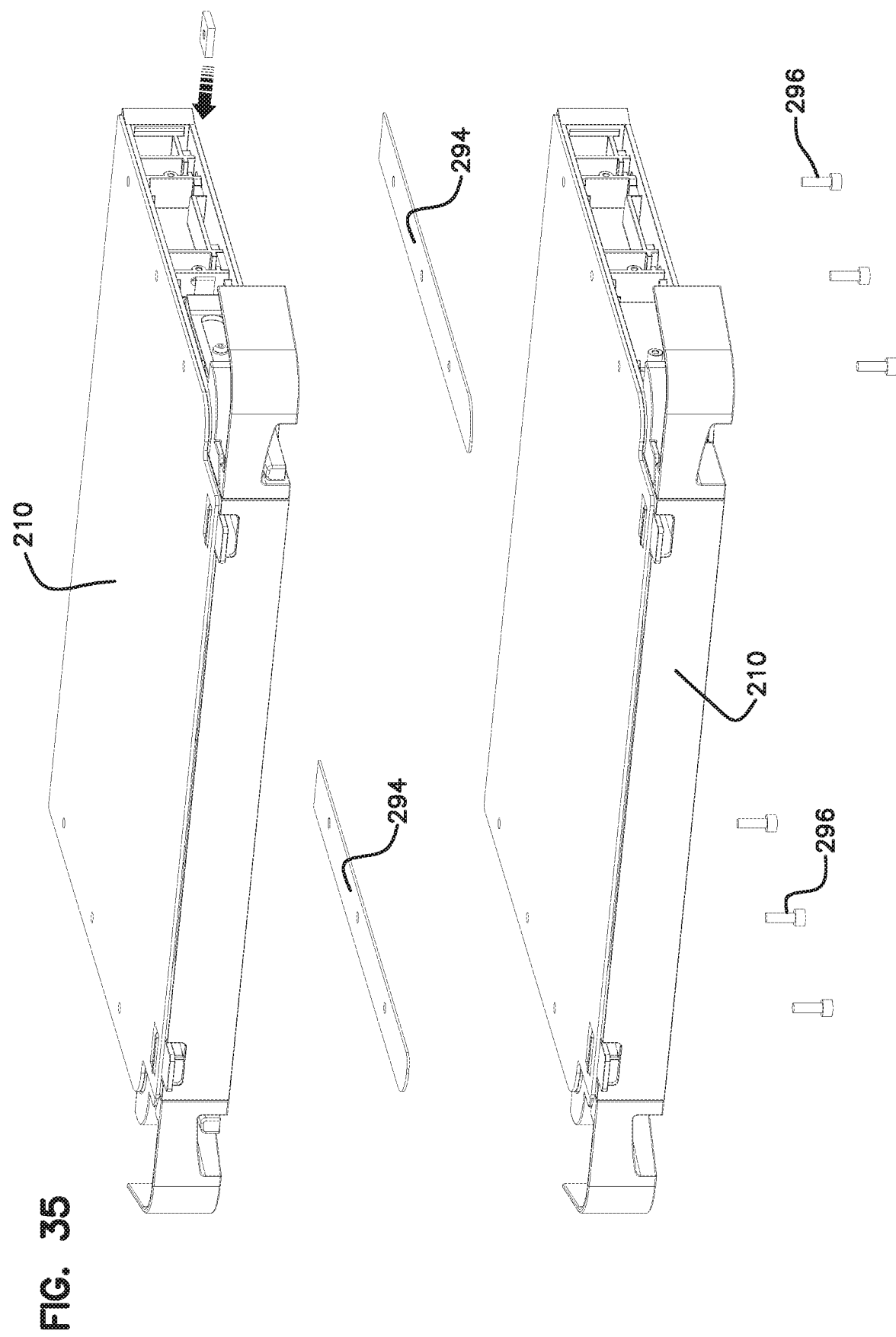
FIG. 35 shows an exploded view of the two elements of the block of FIG. 34.
Figure 36:
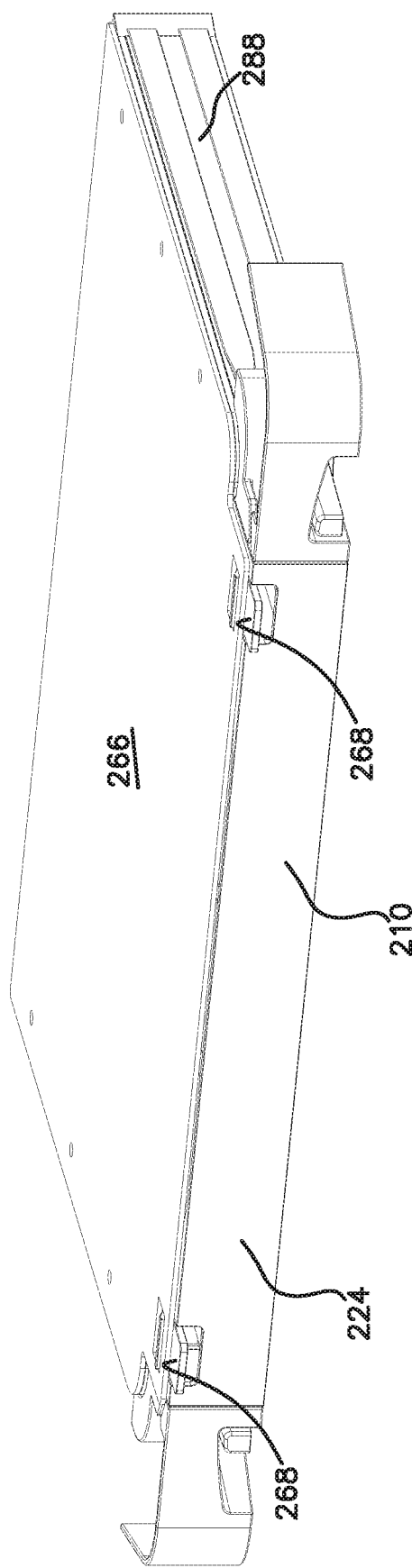
FIG. 36 shows a single element.
Figure 37:
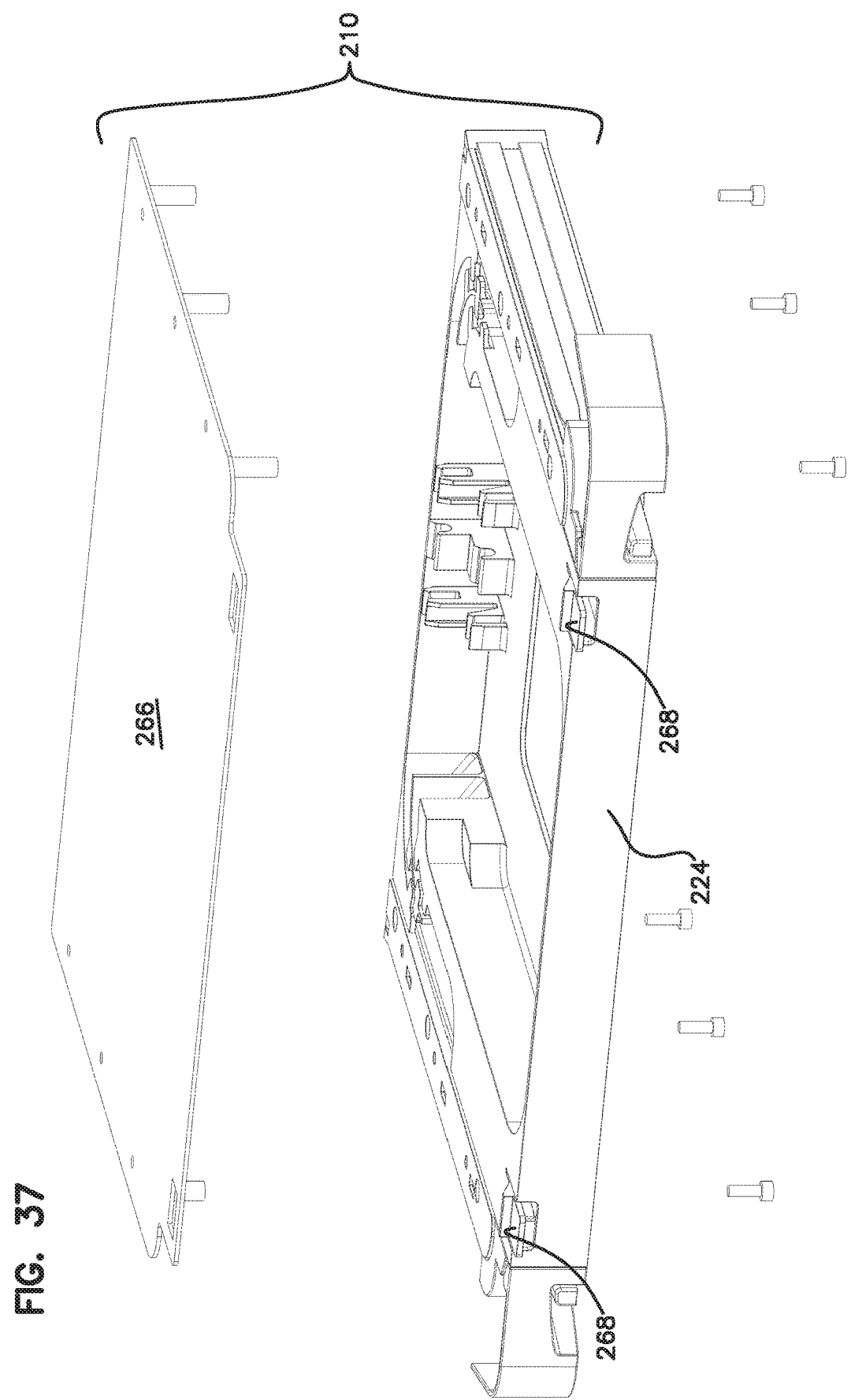
FIG. 37 shows an exploded view of the element of FIG. 36.
Figure 38:
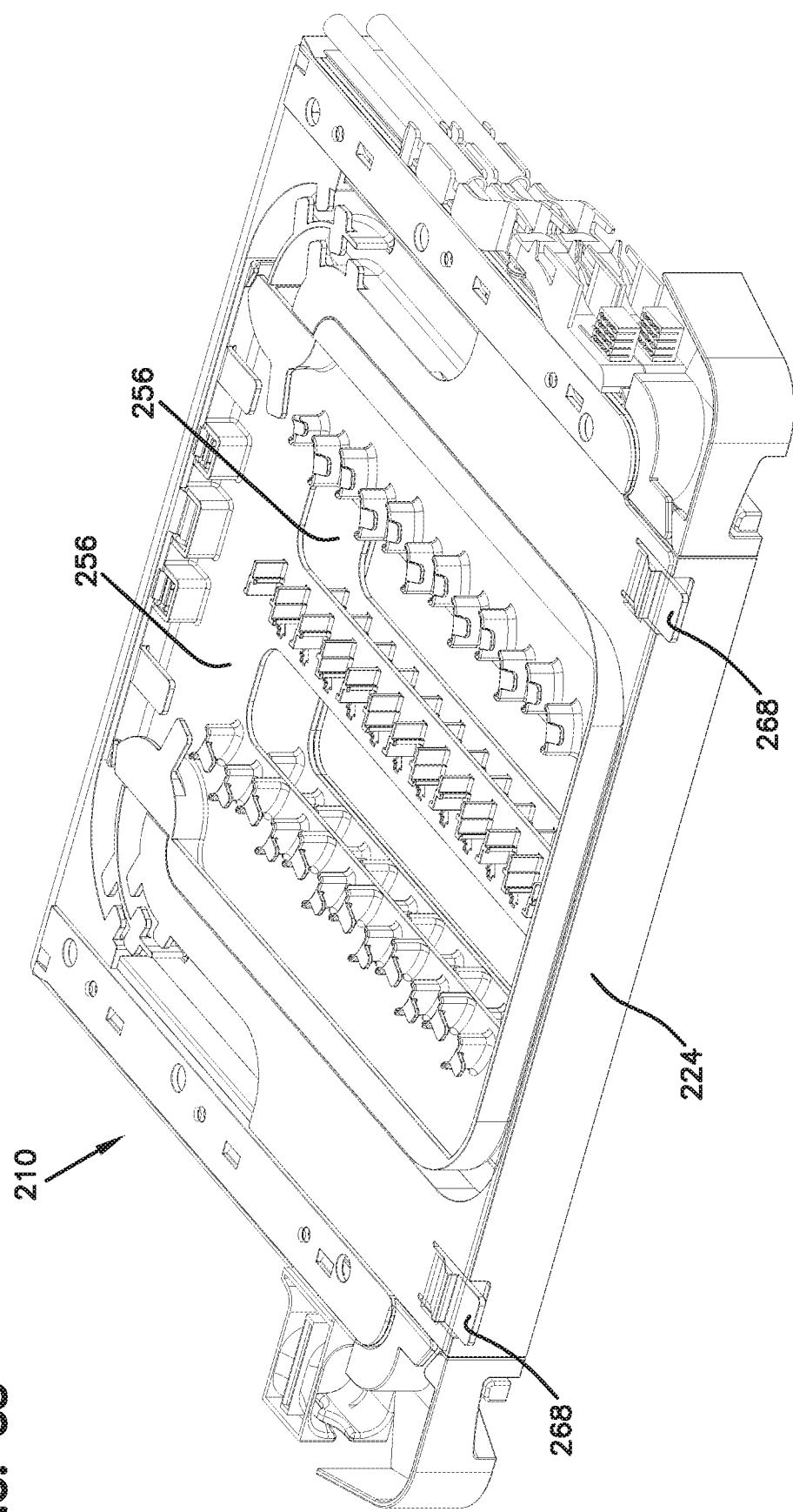
FIG. 38 shows the element of FIG. 37, without the top cover.
Figure 39:
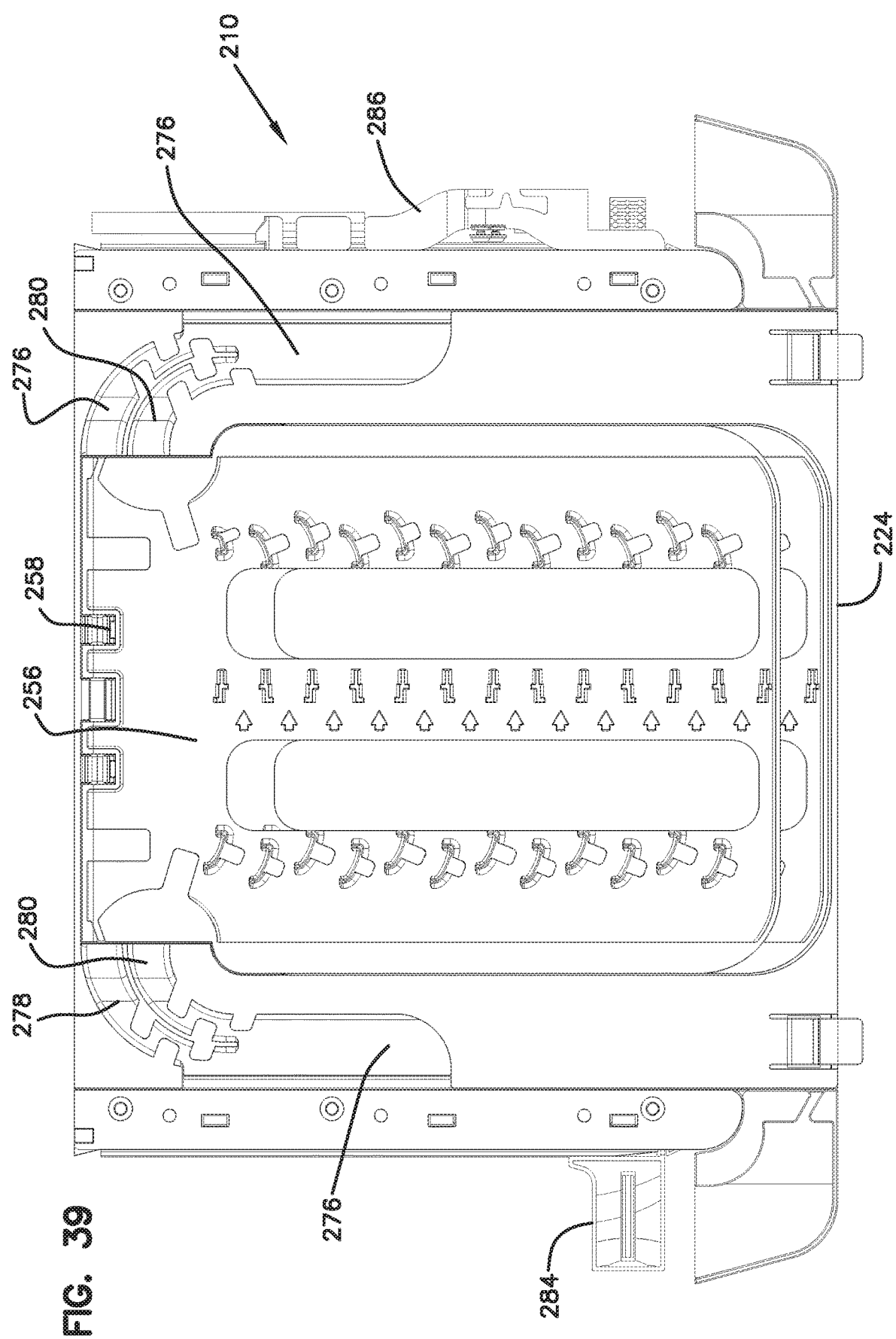
FIG. 39 is a top view of the element of FIG. 38.
Figure 40:
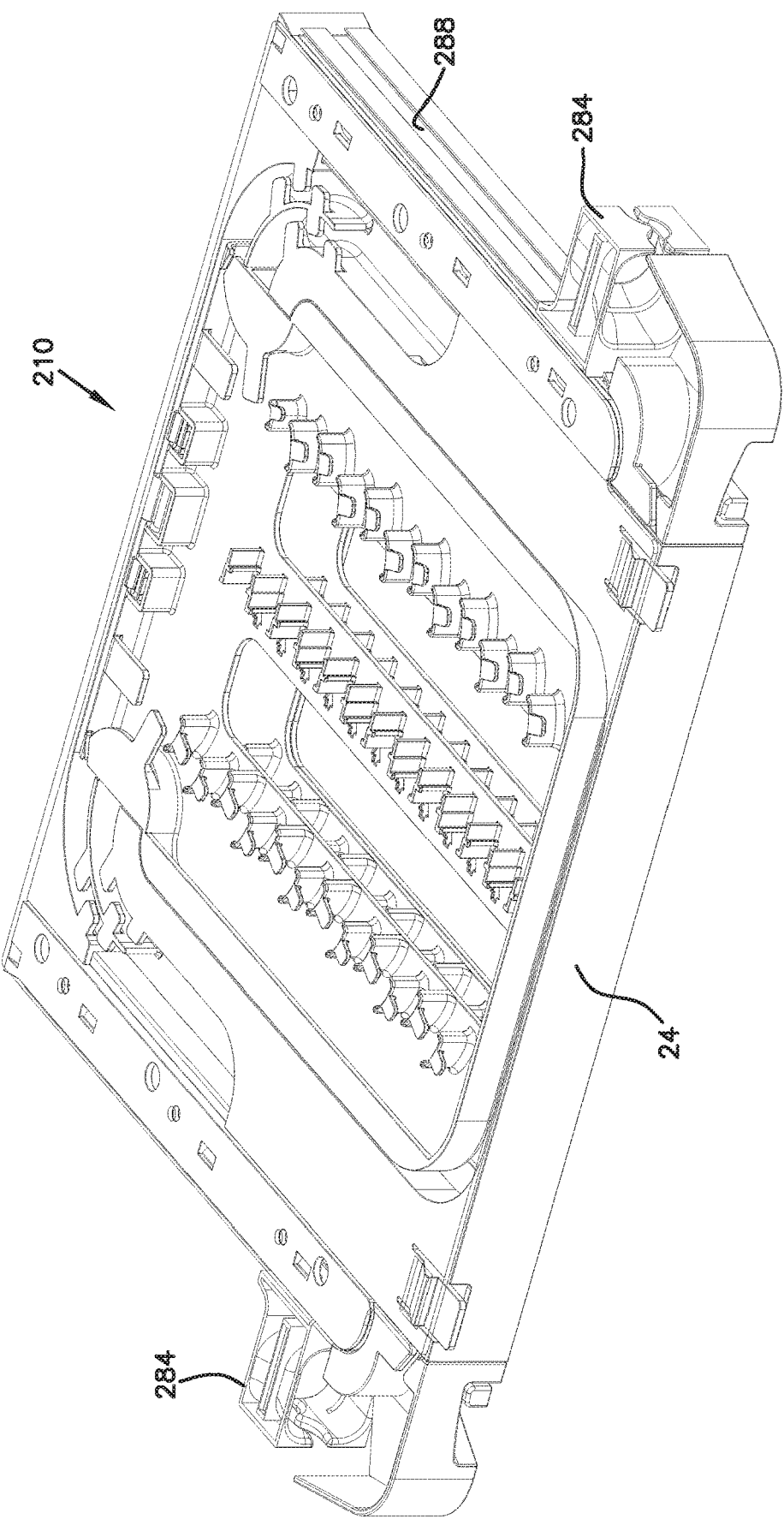
FIG. 40 is an alternative view of the element of FIG. 38, showing alternative devices at the cable entry points.
Figure 41:
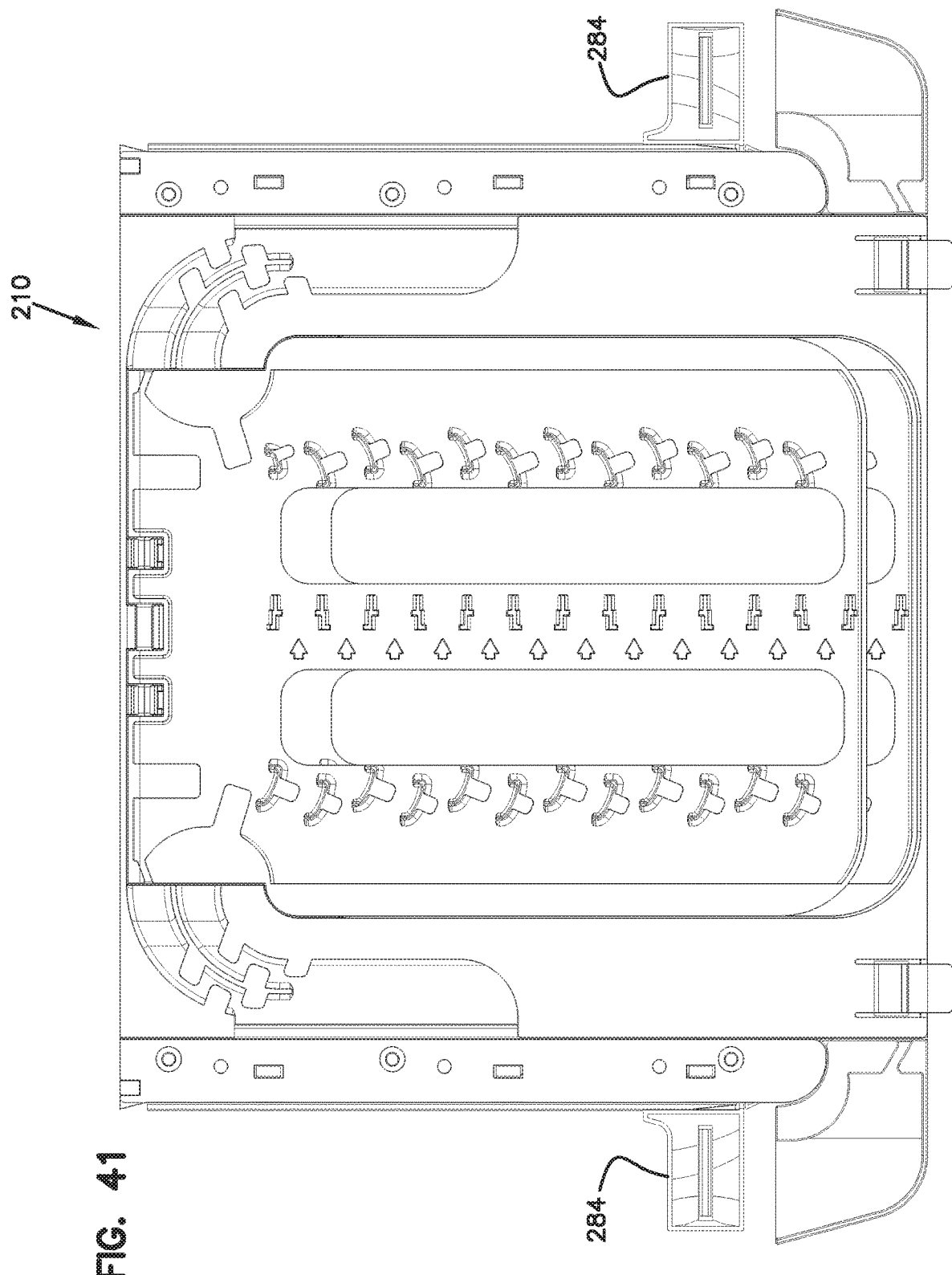
FIG. 41 is a top view of the element of FIG. 40.
Figure 42:
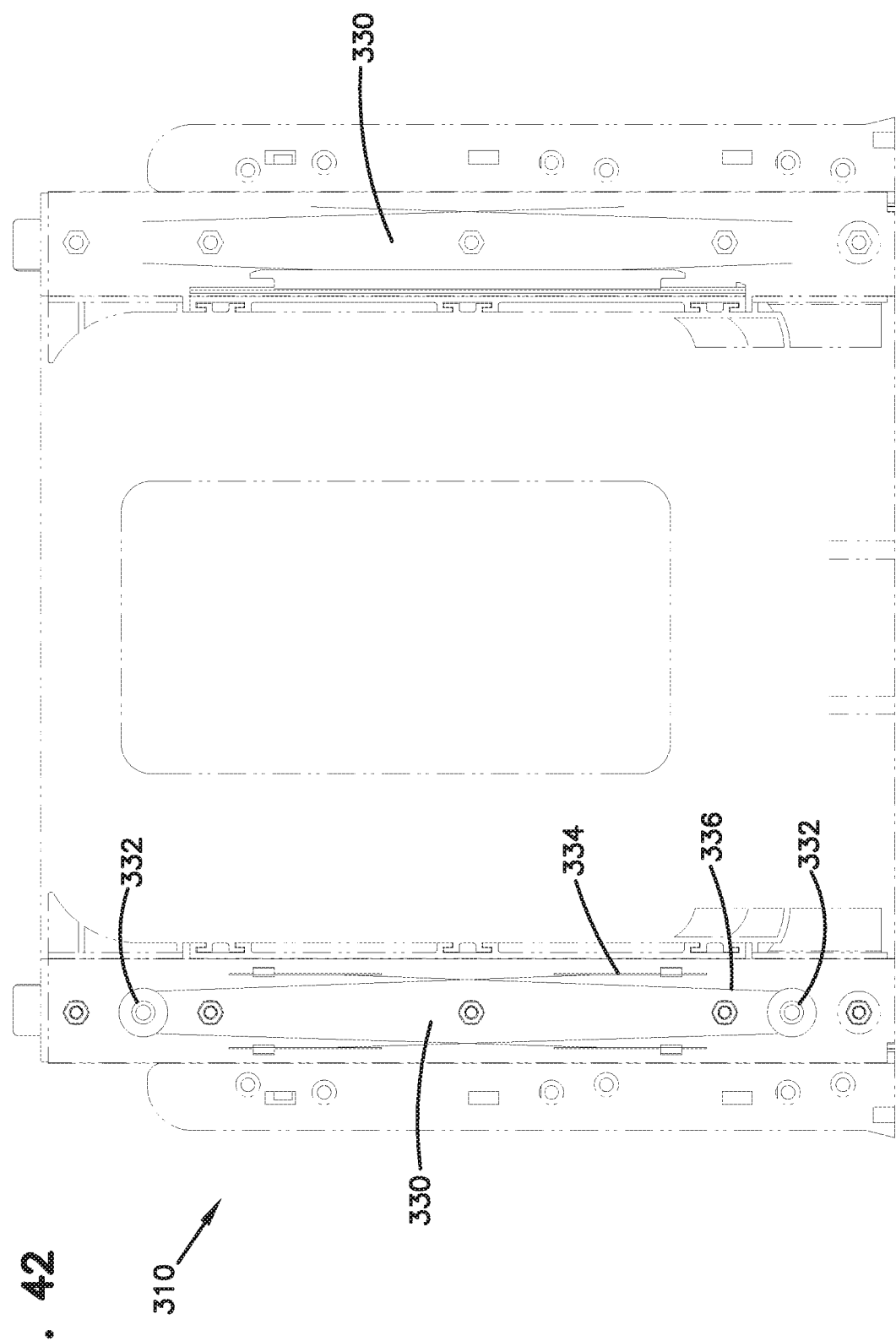
FIG. 42 shows an alternative embodiment of an element in a top view with an alternative synchronized movement feature.
Figure 43:
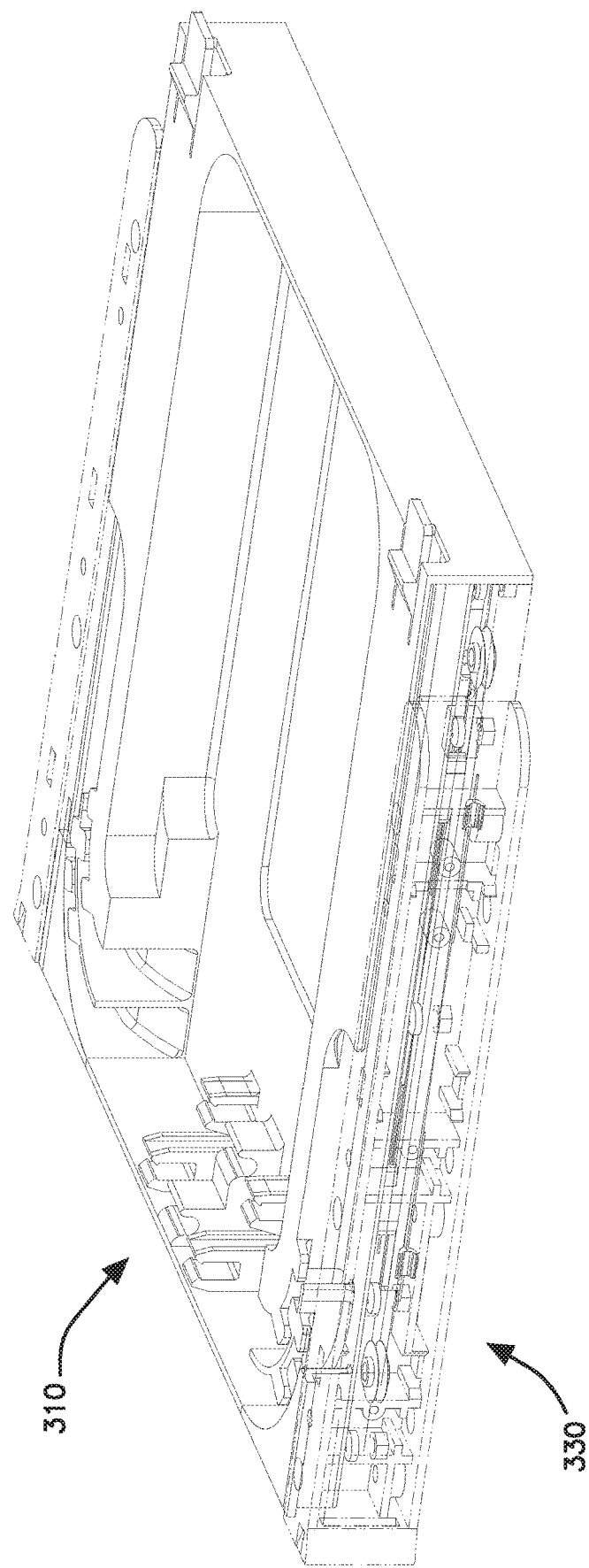
FIG. 43 is a perspective view of the element of FIG. 42.
Figure 44:
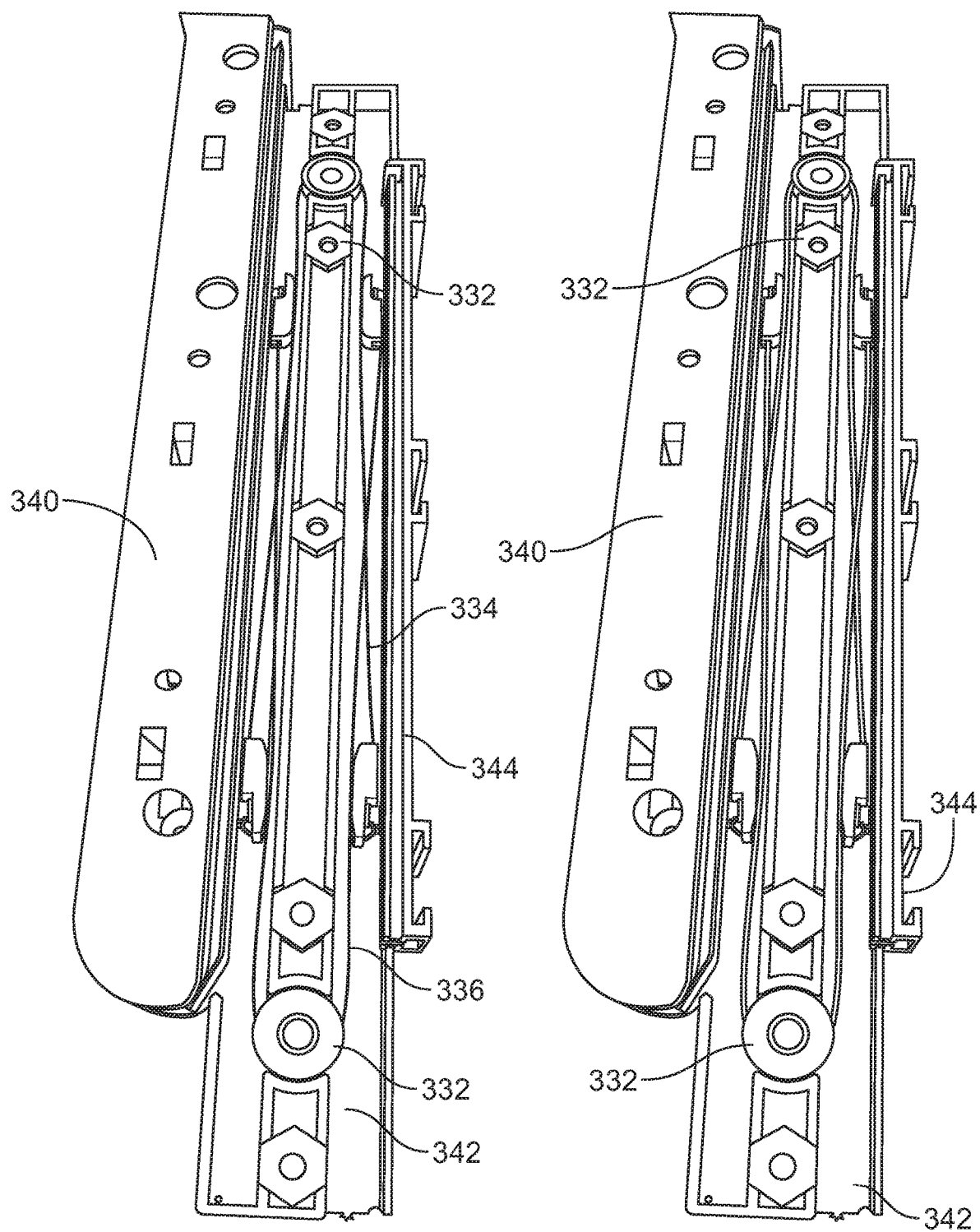
FIGS. 44 and 45 show movement of the various components of the synchronized movement feature of FIGS. 42 and 43.
Figure 45:
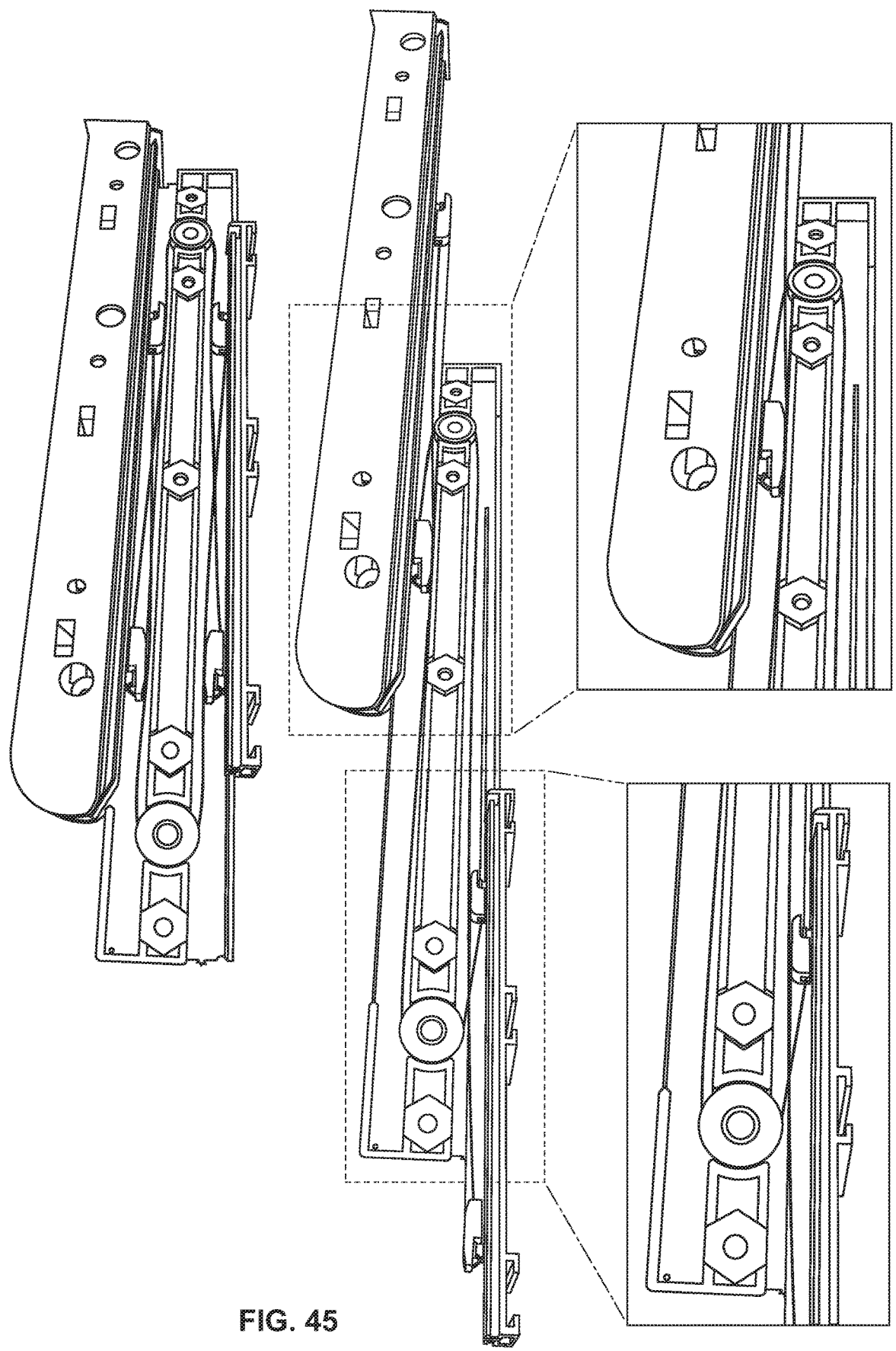

Referring now to FIGS. 1-16, various embodiments of an optical fiber distribution element 10, or element 10, are shown. The elements 10 can be individually mounted as desired to telecommunications equipment including racks, frames, or cabinets. The elements 10 can be mounted in groups or blocks 12 which forms a stacked arrangement. In one embodiment, a vertical stack of elements 10 populates an optical fiber distribution rack.

Each element 10 holds fiber terminations, or other fiber components including fiber splitters and/or fiber splices. In the case of fiber terminations, incoming cables are connected to outgoing cables through connectorized cable ends which are connected by adapters, as will be described below.

Each element includes a chassis 20 and a movable tray 24. Tray 24 is movable with a slide mechanism 30 including one or more gears 32 and a set of two toothed racks or linear members 34.

Slide mechanism 30 provides for synchronized movement for managing the cables extending to and from tray 24. Entry points 36 on either side of chassis 20 allow for fixation of the input and output cables associated with each element 10. The radius limiters 38 associated with each slide mechanism 30 move in synchronized movement relative to chassis 20 and tray 24 to maintain fiber slack, without causing fibers to be bent, pinched, or pulled.

Each tray 24 includes mounting structure 50 defining one or more of fiber terminations, fiber splitters, fiber splices, or other fiber components. As shown, mounting structure 50 holds adapters 52 which allow for interconnection of two connectorized ends of cables. Each tray 24 includes one or more frame members 56. In the example shown, two frame members 56 are provided. As illustrated, each frame member 56 is T-shaped. Also, each tray 24 includes two frame members 56 which are hingedly mounted at hinges 58. A top frame member 62 is positioned above a bottom frame member 64. The mounting structure 50 associated with each frame member 62, 64 includes one or more integrally formed adapter blocks 70. Adapter blocks 70 include a plurality of adapter ports for interconnecting to fiber optic connectors. A pathway 76 defines a generally S-shape from radius limiters 38 to adapter blocks 70. As shown, pathway 76 includes an upper level 78 and a lower level 80 in the interior. A portion 84 of pathway 76 is positioned adjacent to hinges 58 to avoid potentially damaging cable pull during pivoting movement of frame members 56. Flanges 86 and radius limiters 90 help maintain cables in pathways 76.

Tray 24 includes openings 96 to allow for technician access to the cable terminations at adapter blocks 70. In addition, the T-shapes of frame members 56 further facilitate technician access to the connectors.

Cables extending to and from element 10 can be affixed with a cable mount 100 as desired. Additional protection of the fiber breakouts can be handled with cable wraps 102. Radius limiters 106 can be additionally used to support and protect the cables.

Referring now to FIGS. 17-29, various examples of cable routings are illustrated for element 10.

If desired, more than one feeder cable can supply cabling to more than one element 10.

Referring now to FIGS. 30-41, various additional embodiments of elements 210 are shown. Element 210 includes a chassis 220 in a movable tray 224 mounted with a slide mechanism 230 which promotes synchronized movement of radius limiters 238. Each tray 224 includes two hingedly mounted frame members 256. Each frame member 256 has a middle portion 260 separated by openings 262 from side portions 264. Middle portion 260 can hold fiber terminations. Side portions 264 include radius limiters 270. Cover 266 goes over tray 224. Latches 268 latch tray 224 to cover 266 in the closed position.

A pathway 276 extends from either side from tray 224 to supply cables to each of trays 224. An upper level 278 and a lower level 280 supply the respective frame members 256 with cabling. A general S-shaped pathway 276 is defined wherein the pathway 276 passes close to hinges 258.

A dovetail 288 is used to hold cable mounts 286 and radius limiters 284.

An opening 290 in tray 224 allows for connector access by the technician. Similarly, openings 262 on each frame member 256 allow for technician access to the individual connectors.

To form a block 292 of plural elements 210, bars 294 and fasteners 296 are used. Bars 294 give a small spacing between each element 210.

Referring now to FIGS. 42-45, an alternative slide mechanism 330 is shown in alternative element 310. Slide mechanism 330 allows for movement of the trays and related radius limiters and synchronized movement similar to slide mechanism 30, 230. Alternative slide mechanism 330 includes two wheels 332 and two wires 334, 336. The wheels 332 are located on second part 342. The wires are looped in opposite directions and are connected to the first part 340 and the third part 344.

Figure 46:
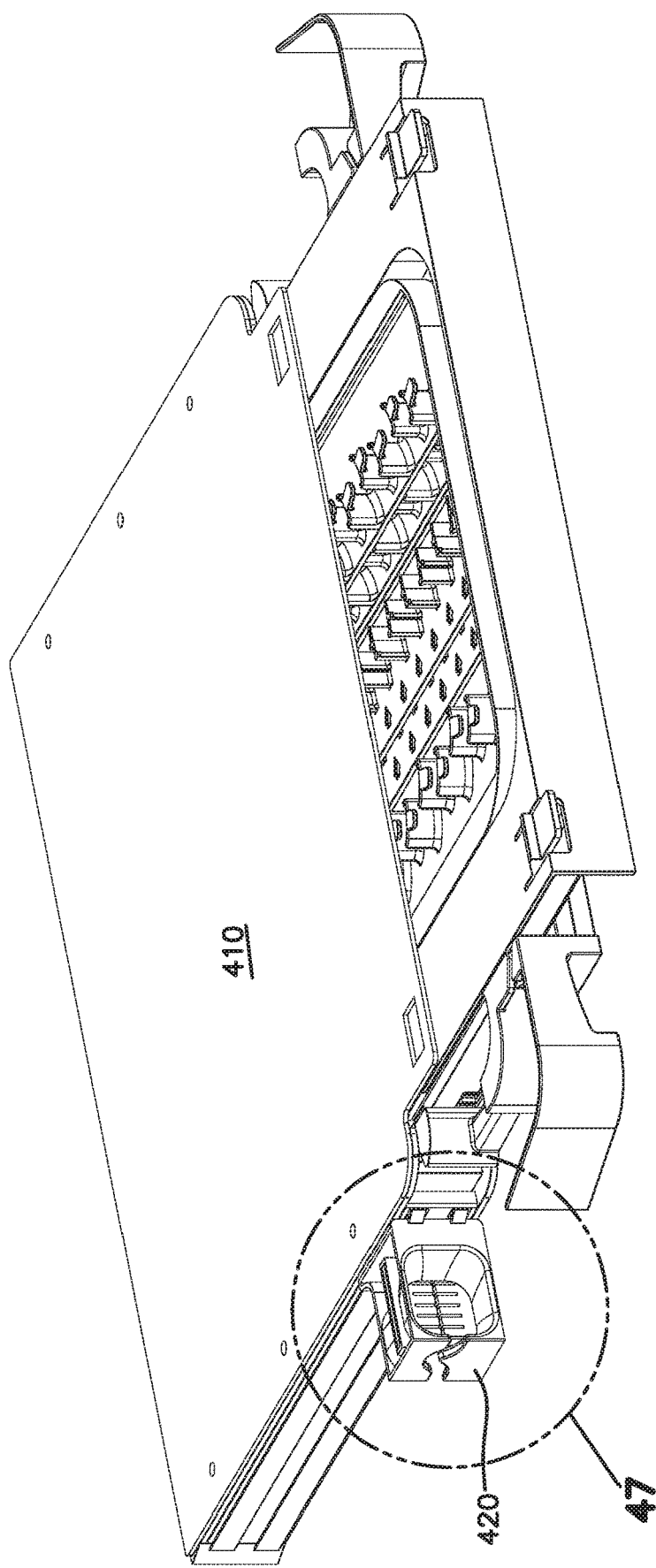
FIGS. 46 and 47 show an element with an alternative radius limiter at the cable entry and exit locations.
Figure 47:
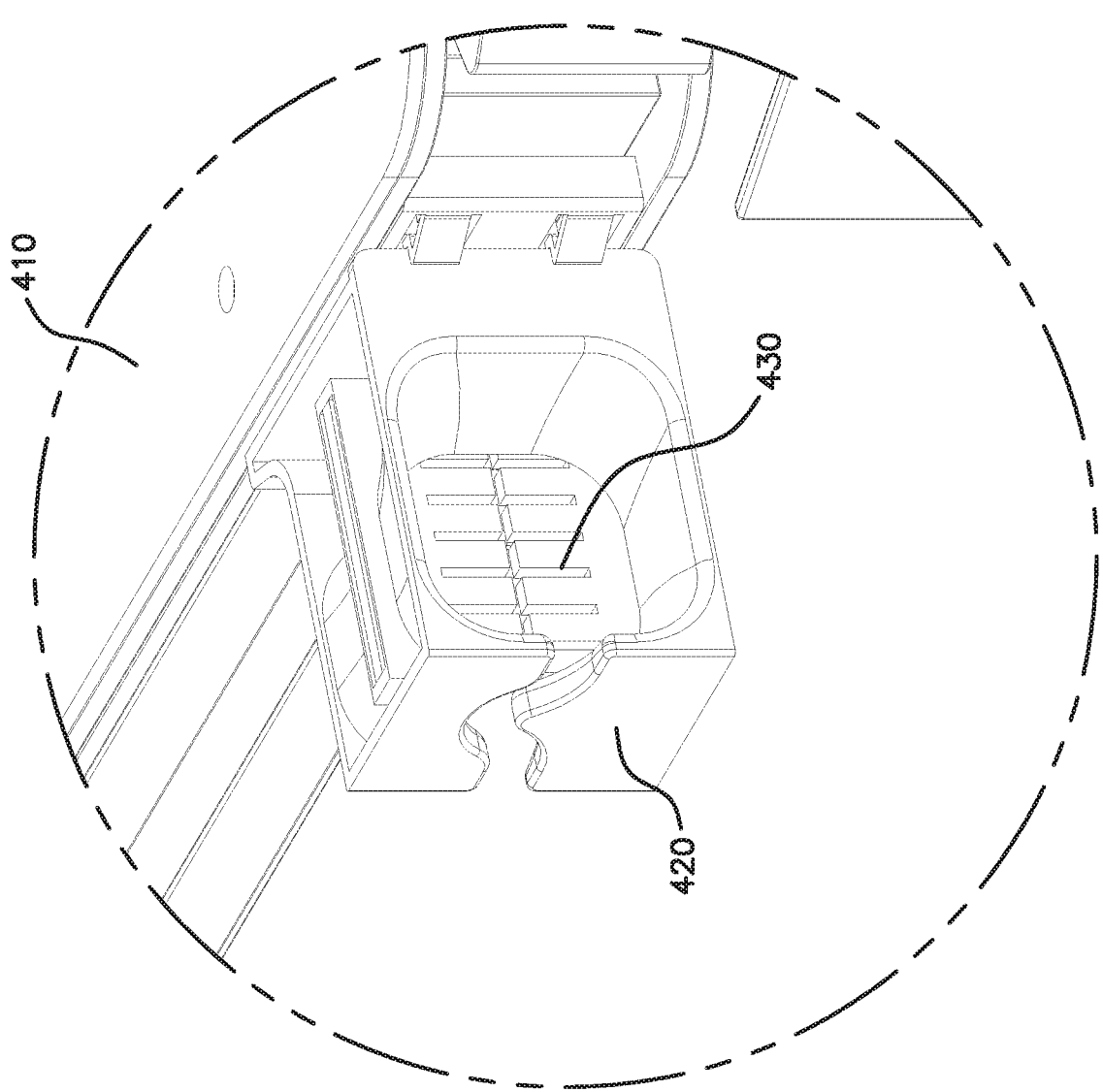

Referring now to FIGS. 46 and 47, an alternative radius limiter 420 is shown on alternative element 410. Radius limiter 420 includes friction members 430 which limit the amount of sliding movement of cables passing through radius limiter 420, to assist with cable management. Friction members 430 include flexible fingers which press lightly on the cables in radius limiter 420 to reduce or eliminate sliding movement of the cables in the radius limiter 420.

Figure 53:
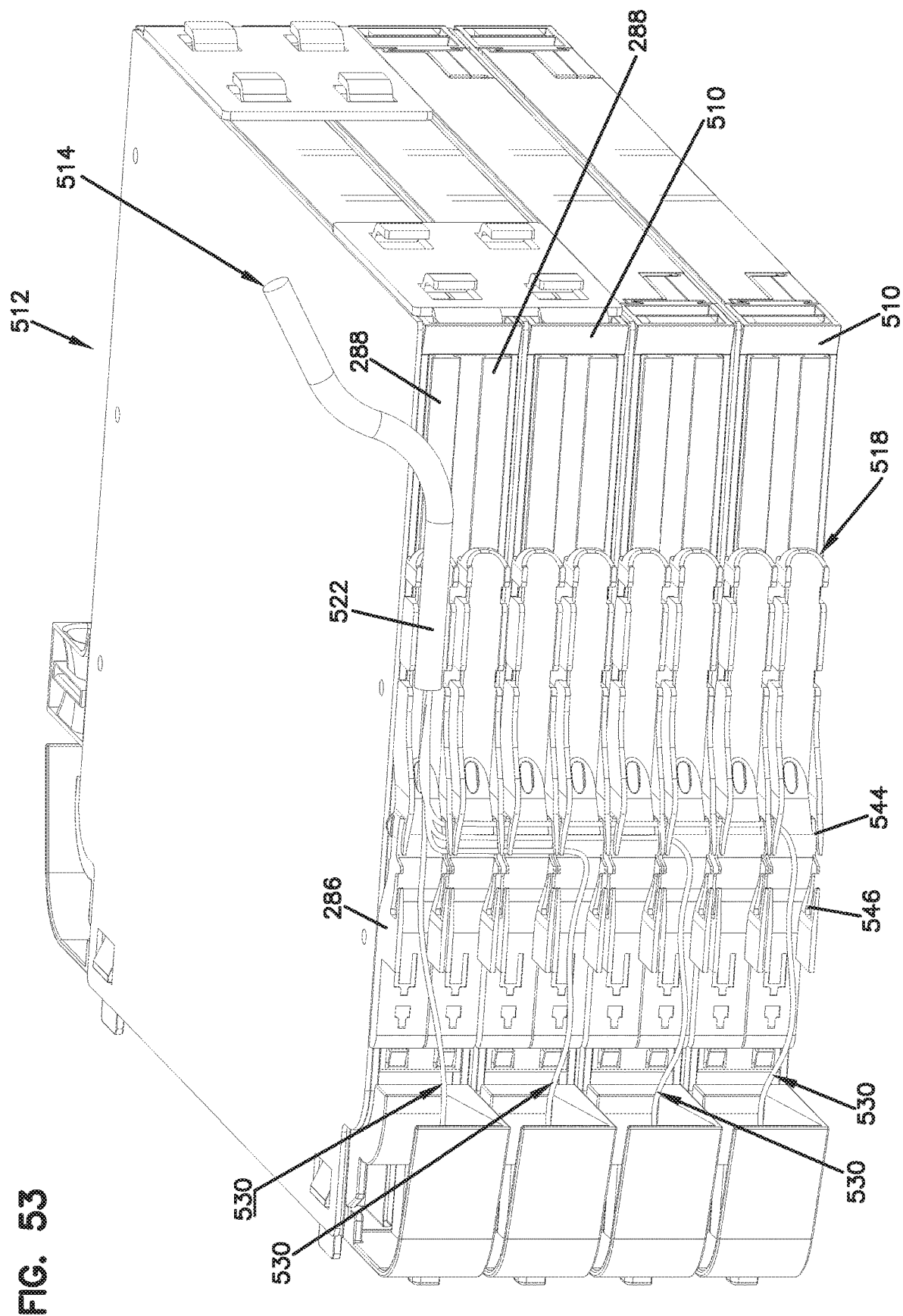
FIG. 53 shows a block formed from four of the elements of FIG. 52 in a stacked arrangement, each of the elements including a pair of the cable mounts of FIGS. 48-51.

Referring now to FIGS. 48-51, one of the cable mounts 286 that is shown as being mounted to the elements 210 in FIGS. 30-33 and 38-39 is shown in isolation. It should be noted that although the cable mount 286 has been shown as part of the optical fiber distribution element 210 of FIGS. 30-41, the optical fiber distribution element 210 is simply one example of a telecommunications system, fixture, or closure to which the cable mount 286 may be used with. The cable mount 286 includes features having inventive aspects in isolation and can be used on other types of optical fiber distribution elements. For example, FIG. 52 shows a pair of the cable mounts 286 attached to an optical fiber distribution element 510 that is different than elements 210 and 410 of FIGS. 30-47 but having features that are similar to those of elements 210 and 410. FIG. 53 shows a block 512 formed from four of the elements 510 of FIG. 52 in a stacked arrangement, each of the elements 510 including a pair of the cable mounts 286.

Referring now back to FIGS. 48-51, the cable mount 286 is configured for securing an incoming cable such as a distribution or feeder cable 514 to a side of an element such as element 510. Each cable mount 286 defines a front end 516 and a rear end 518. The cable mount 286 is configured to receive the incoming cable 514 through the rear end 518 for securing the cable 514. As will be discussed in further detail, the cable mount 286 defines a jacket channel 520 for housing the jacket 522 of the incoming cable 514, a strength member pocket 524 for receiving a strength member 526 of the incoming cable 514, and a fiber channel 528 for receiving the individual fiber-carrying loose tubes 530 protruding from an end of the jacket 522 of the cable 514. The jacket channel 520 and the fiber channel 528 are defined by upper and lower transverse walls 531 and a divider wall 535 of the cable mount 286. The strength member pocket 524 is defined on an opposite side of the divider wall 535. The strength member clamp 536 is inserted into the strength member pocket 524 through an opening 537 located in the divider wall 535.

According to the depicted embodiment, the cable mount 286 is configured to be mounted in a sliding fashion to the dovetail structures 288 of the elements such as elements 210, 410, and 510. As shown in FIGS. 50 and 51, each cable mount 286 defines dovetail shaped interlock features 532 that mate with the dovetail structures 288 of the elements. The cable mounts 286 are mounted to the dovetails 288 by sliding the cable mounts 286 rearwardly over the dovetails 288. The front end 516 of each cable mount 286 defines a positive stop 534 that abuts a front end of the dovetail 288 for limiting axial pull on the cable 514 once a strength member 526 of the cable 514 has been clamped using the cable mount 286. It should be noted that a dovetail sliding interlock is one example of a structure that may be used to mount the cable mount 286 to an element such as elements 210, 410, and 510 and that other types of interlocks (that limit axial pull on a secured cable) may be used.

As noted above, the cable mount 286 is configured for securing or clamping the strength member 526 of an incoming cable 514 to limit axial pull on the cable 514 to preserve the optical fibers. A strength member clamp 536 of the cable mount 286 is defined by a base 538 and a fixation plate 540 that is clamped thereto via clamp fasteners 542. The base 538 may also be referred to as a first clamp member and the fixation plate 540 may be referred to as a second clamp member of the strength member clamp 536.

Once the strength member 526 of an incoming cable 514 is inserted into the strength member pocket 524 through the opening 537, the strength member 526 may be clamped between the first and second clamp members 538, 540. The strength member pocket 524 and the strength member clamp 536 of the cable mount are defined by an inset portion 533 of the cable mount 286 such that the clamp 536 does not interfere with the slidable mounting of the cable mount 286 via the dovetail interlock features 532.

The cable mount 286 is designed such that the individual tubes 530 carrying the optical fibers are isolated from the strength member 526 of the cable 514. The fiber carrying tubes 530 are lead through the fiber channel 528 which is located on an opposite side of the divider wall 535 from the strength member pocket 524.

Still referring to FIGS. 48-51, each cable mount 286 also defines features for guiding the fiber tubes 530 that protrude from the incoming cable jacket 522. Each cable mount 286 includes upper and lower front fiber guides 544 and upper and lower rear cable guides 546. The cable guides 544, 546 are defined by notches 548 in the transverse walls 531 that allow the fiber carrying tubes 530 to frictionally fit therein and extend to different locations around the distribution block 512.

Referring now to FIG. 52, a pair of the cable mounts 286 are shown attached in a stacked arrangement to a single optical fiber distribution element 510. The fiber guides 544, 546 of the cable mount 286 are designed such that the upper guides of a cable mount 286 and the lower guides of an adjacent cable mount 286 align to form pathways for routing fiber carrying tubes 530 around the elements. FIG. 52 illustrates an example tube routing configuration using the fiber guides 544, 546 of the cable mounts 286. The notches 548 defined by the fiber guides 544, 546 allow the fiber carrying tubes 530 to extend from the fiber channel 528 of a given cable mount 286 to the fiber channel 528 of an adjacent upper or lower cable mount 286. The fiber channels 528 of the cable mounts 286 in combination with the notches 548 defined by the fiber guides 544, 546 allow the fiber carrying tubes 530 to extend straight upwardly, straight downwardly, diagonally upwardly, diagonally downwardly, or straight through after entering the fiber channels 528. FIG. 53 illustrates an example tube routing for four of the elements 510 of FIG. 52 stacked in a block formation, each element 510 including a pair of the cable mounts 286. FIG. 53 illustrates the various pathways the tubes 530 can take after exiting the cable jacket 522 using the cable mounts 286.

As shown in FIG. 49, each cable mount 286 may also include a radius limiter mount 550 adjacent the front end 516 for mounting a radius limiter 552. The radius limiter 552 may be similar to radius limiter 420 shown in FIGS. 46 and 47 and may include friction members 554 which limit the amount of sliding movement of tubes 530 passing through radius limiter 552, to assist with cable management. Friction members 554 may include flexible fingers which press lightly on the tubes 530 in the radius limiter 552 to reduce or eliminate sliding movement of the tubes 530 in the radius limiter 552. The radius limiter 552 shown in FIG. 49 can also be seen in FIGS. 30-33 and 38-39 of the disclosure.

Figure 54:
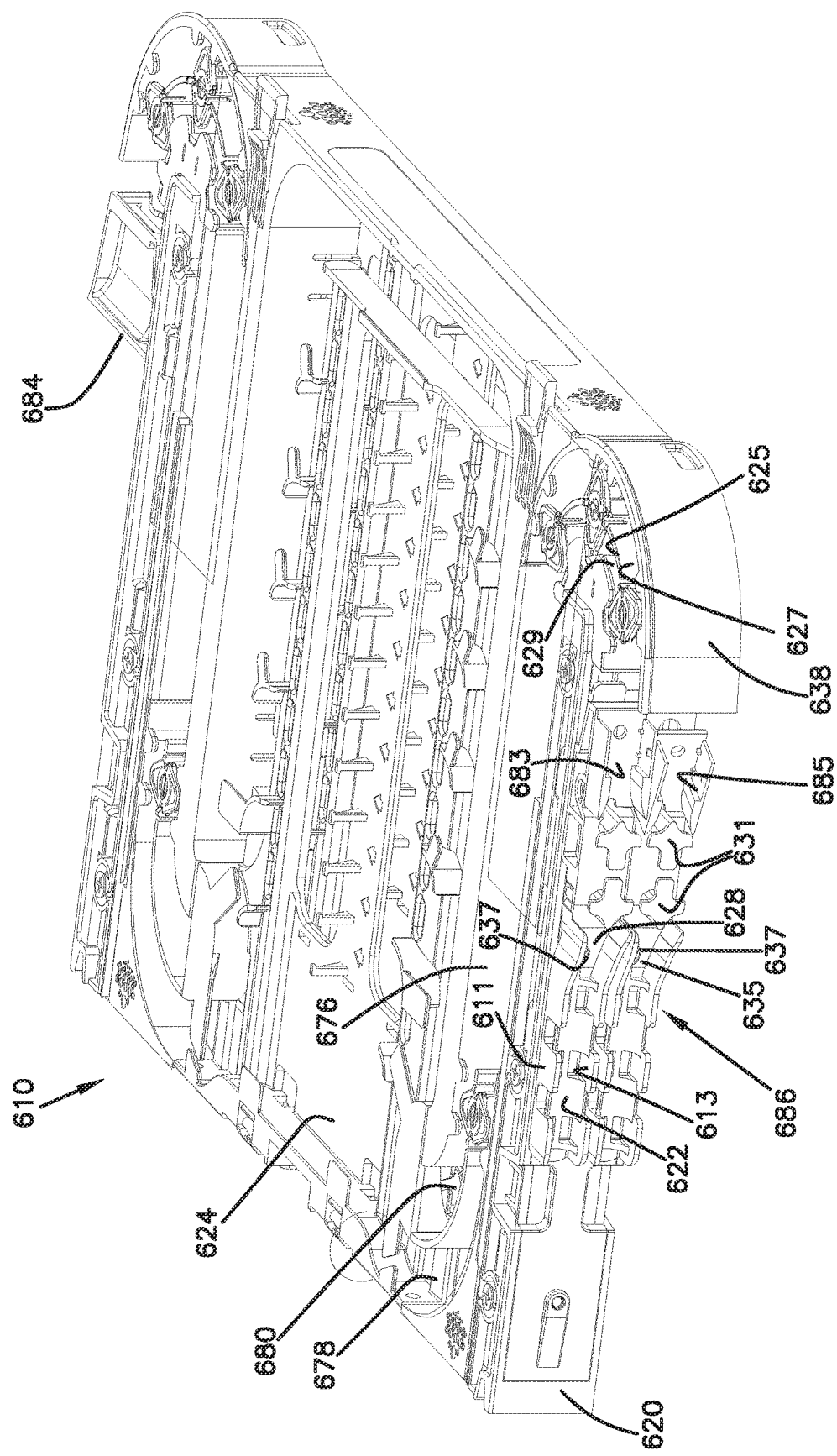
FIG. 54 illustrates a front, left, top perspective view of an alternative optical fiber distribution element including a cable mount with pivoting cable guide portions having features that are examples inventive aspects in accordance with the disclosure.
Figure 55:
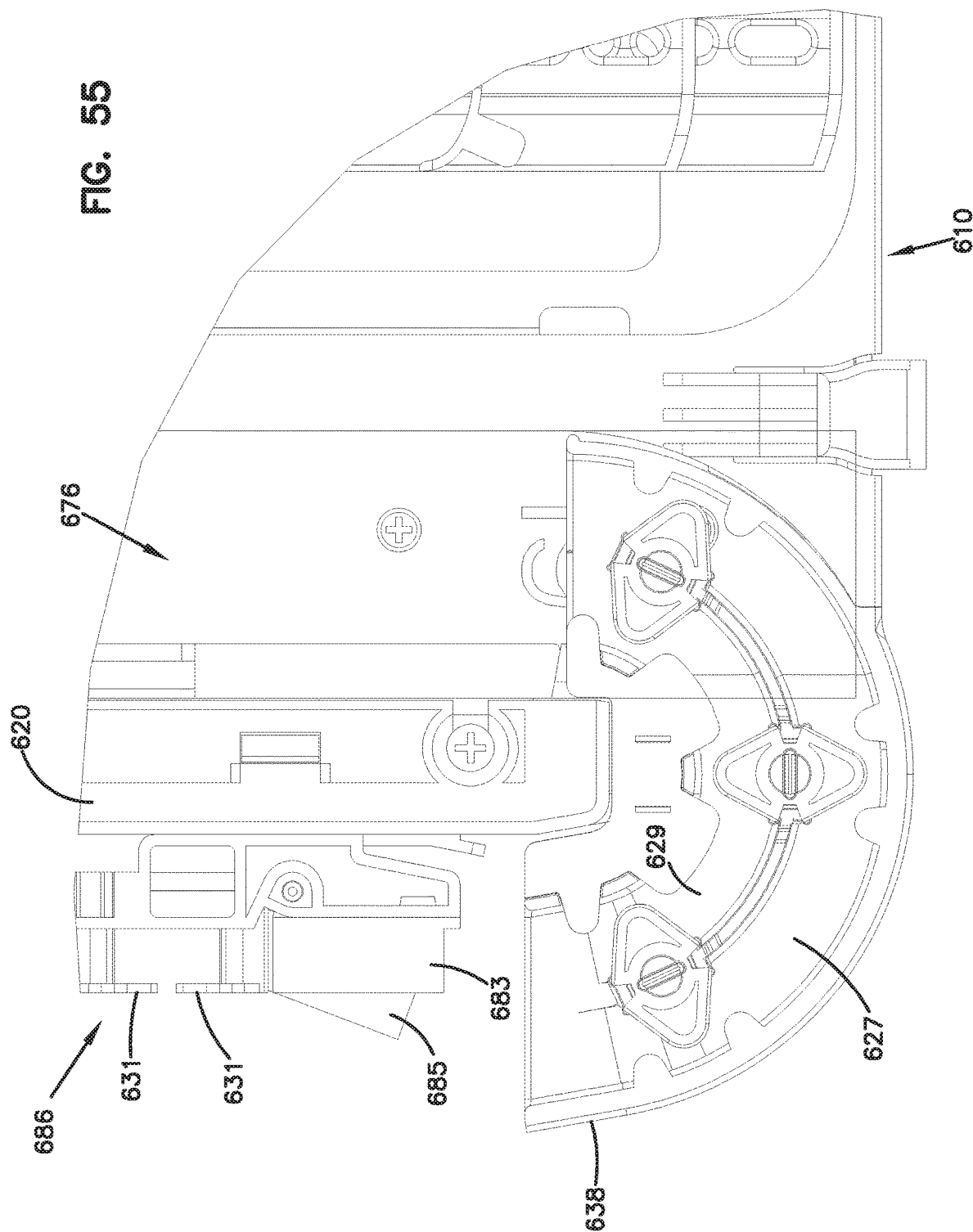
FIG. 55 is a top view illustrating a close-up of the pivoting cable guide portions of the cable mount of the element of FIG. 54.
Figure 56:
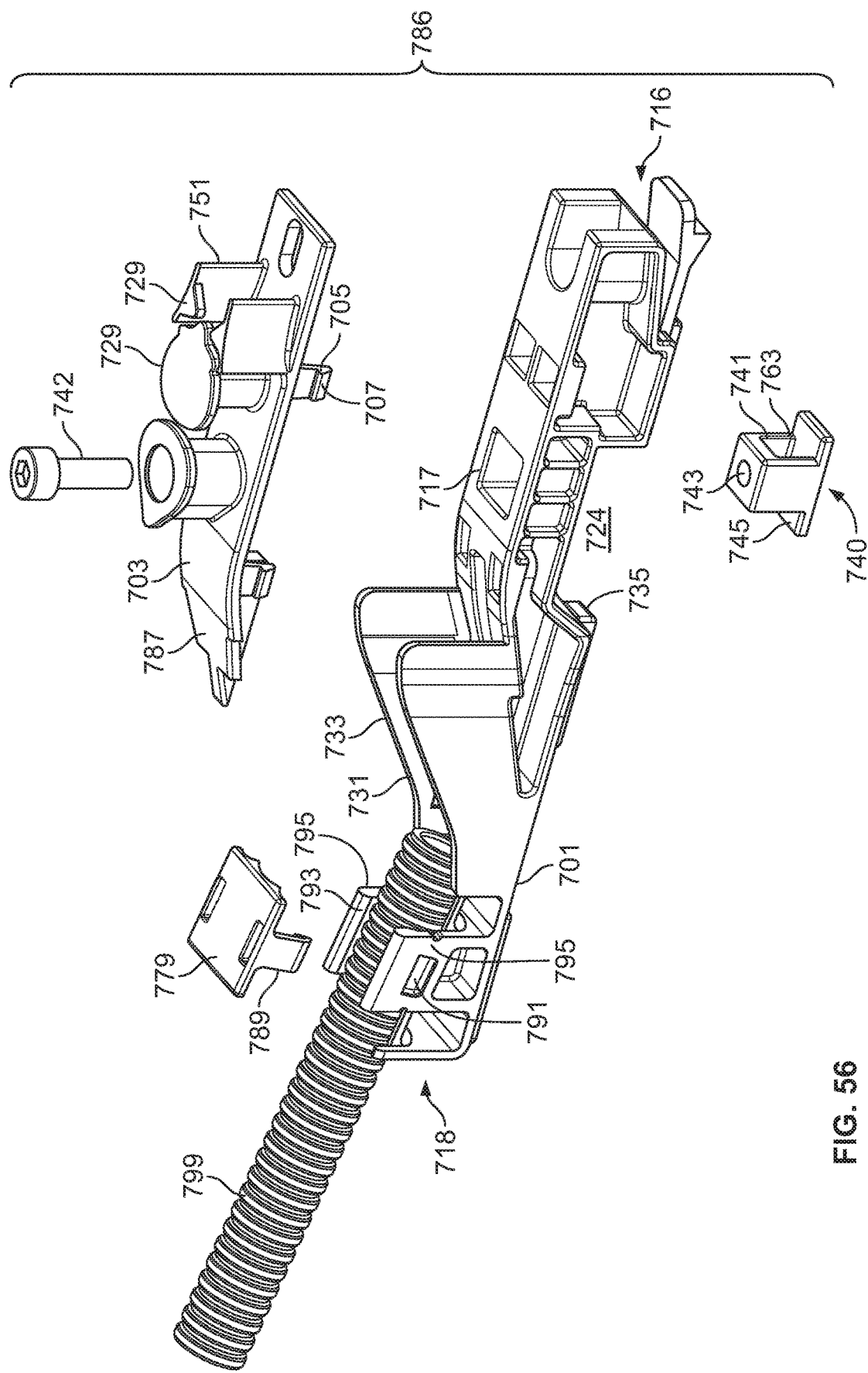
FIG. 56 is an exploded perspective view of another embodiment of a cable mount that is configured for fixing cables to telecommunications equipment such as the optical fiber distribution elements of FIGS. 30-41 or FIGS. 54-55, the cable mount shown with a portion of a jacket of a cable.
Figure 57:
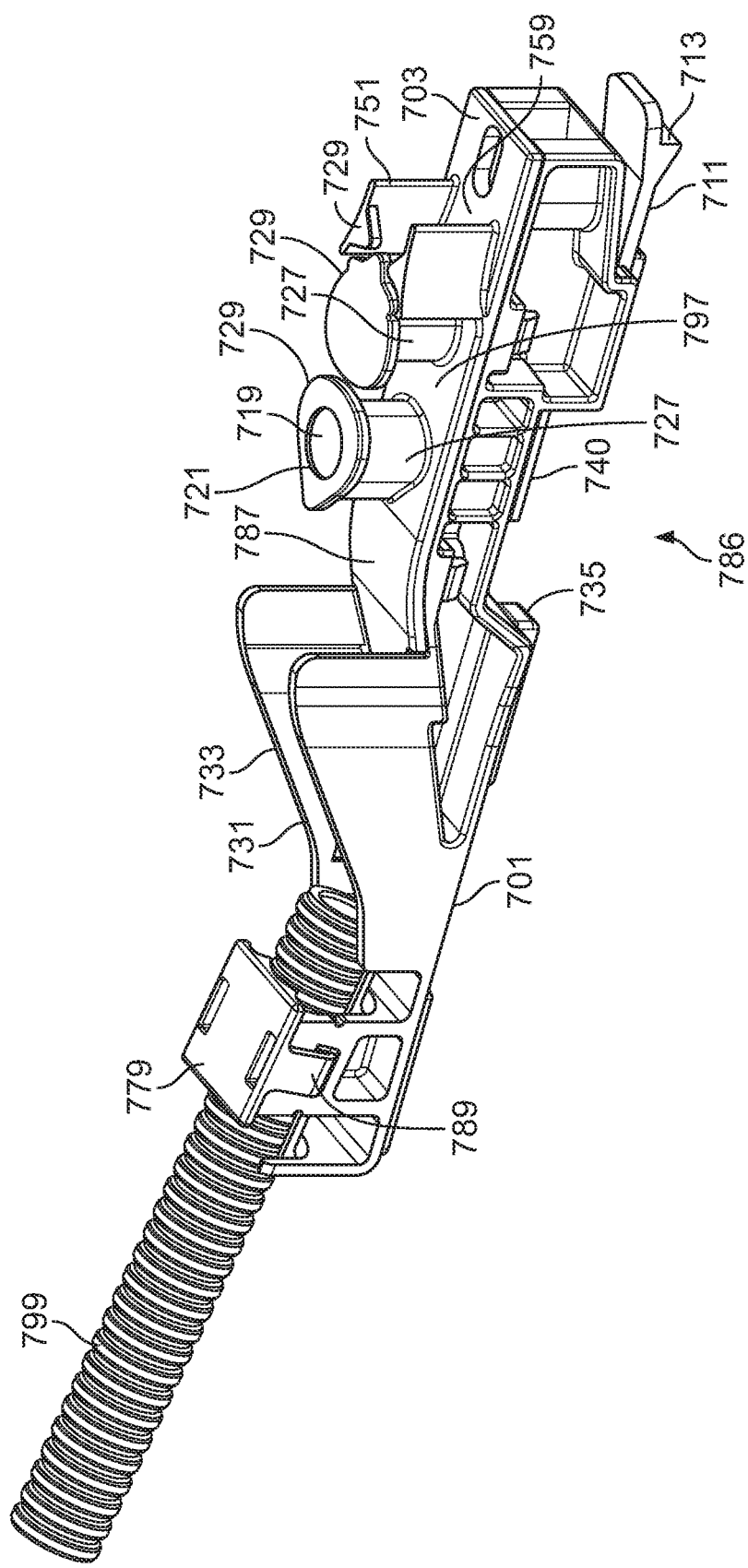
FIG. 57 illustrates the cable mount of FIG. 56 in a fully assembled configuration.
Figure 58:
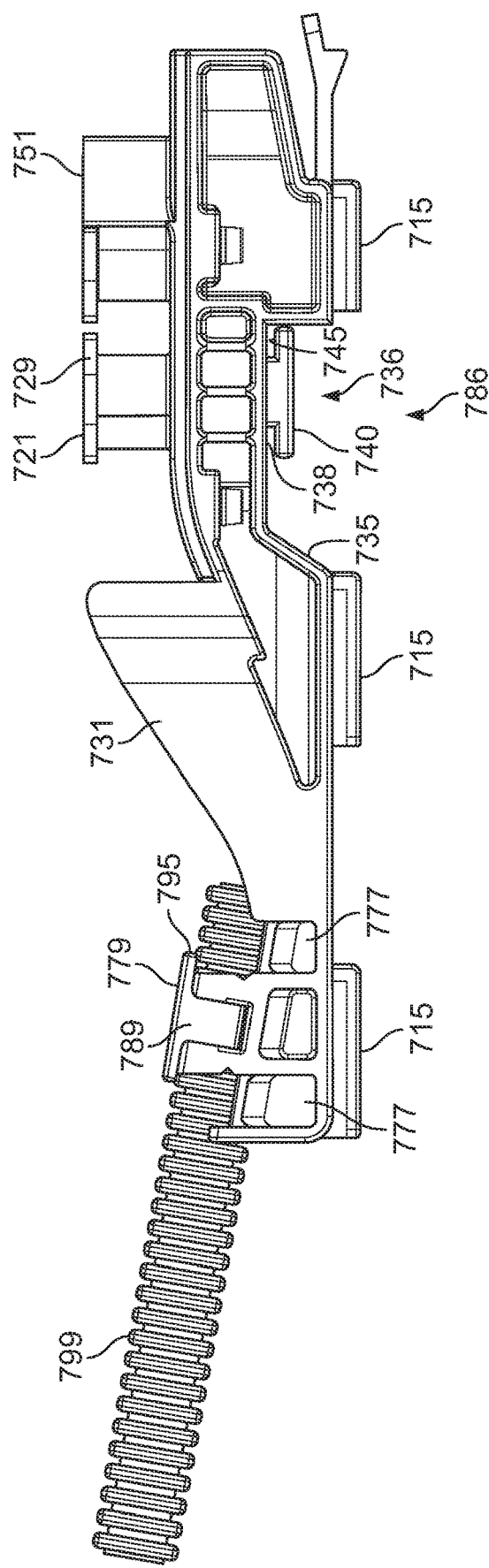
FIG. 58 is a top view of the cable mount of FIG. 57.
Figure 59:
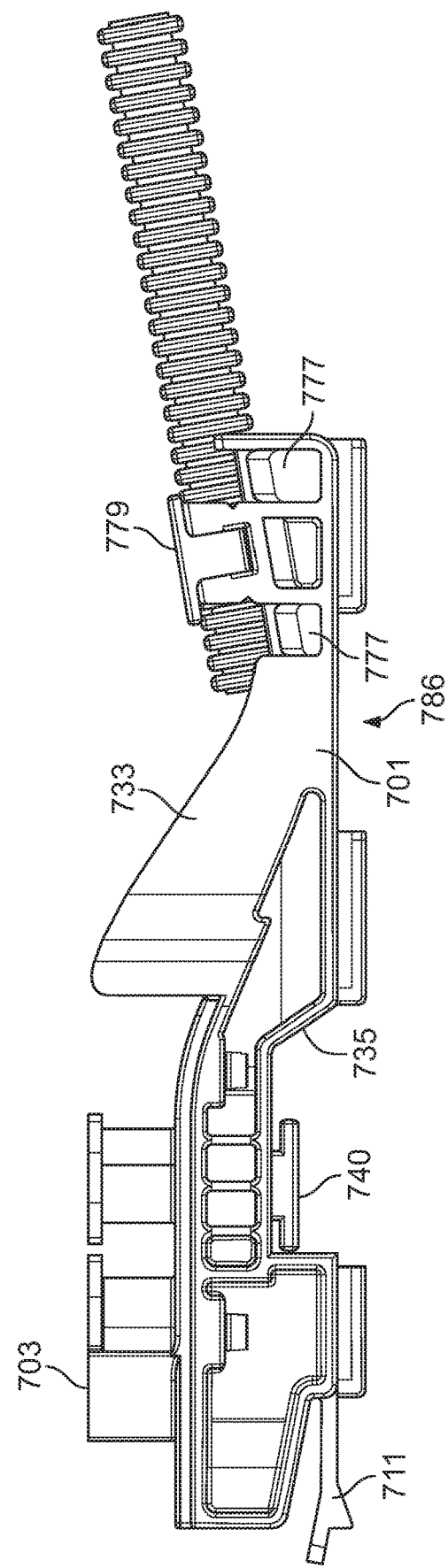
FIG. 59 is a bottom view of the cable mount of FIG. 57.
Figure 60:
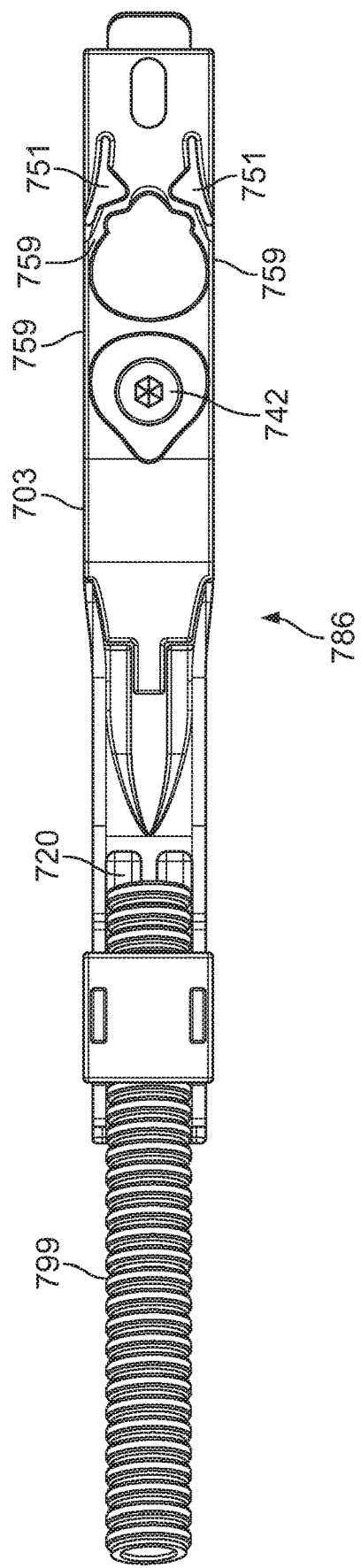
FIG. 60 is a right side view of the cable mount of FIG. 57.
Figure 61:
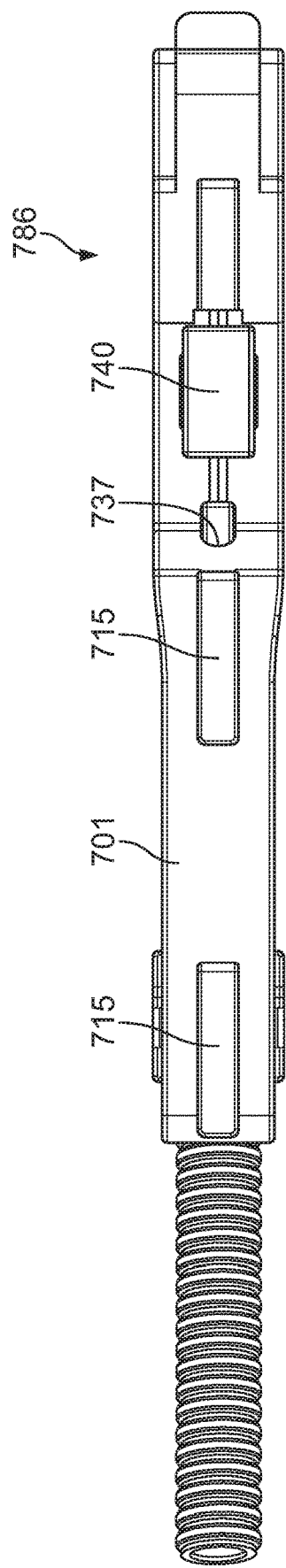
FIG. 61 is a left side view of the cable mount of FIG. 57.
Figure 62:
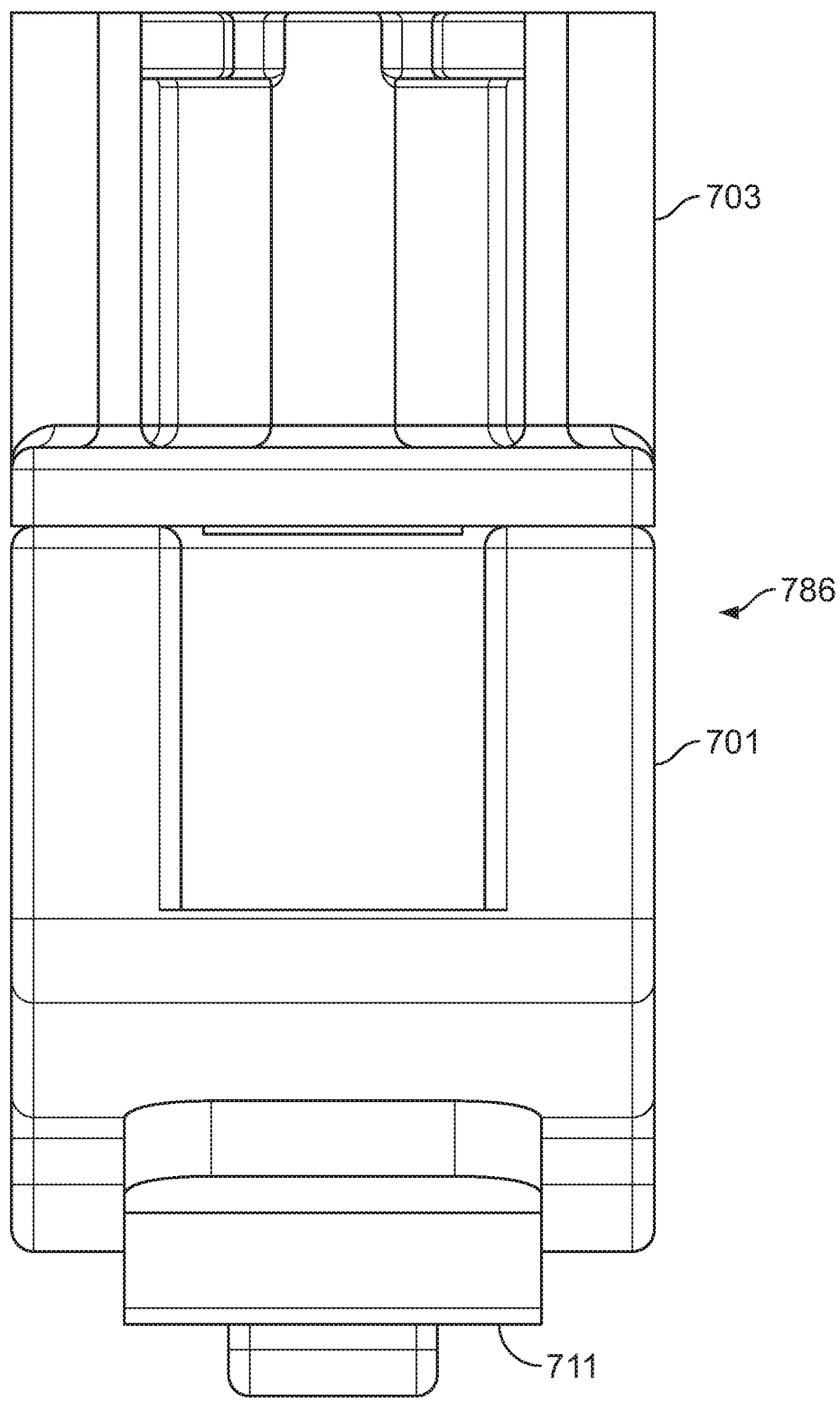
FIG. 62 is a front view of the cable mount of FIG. 57.
Figure 63:
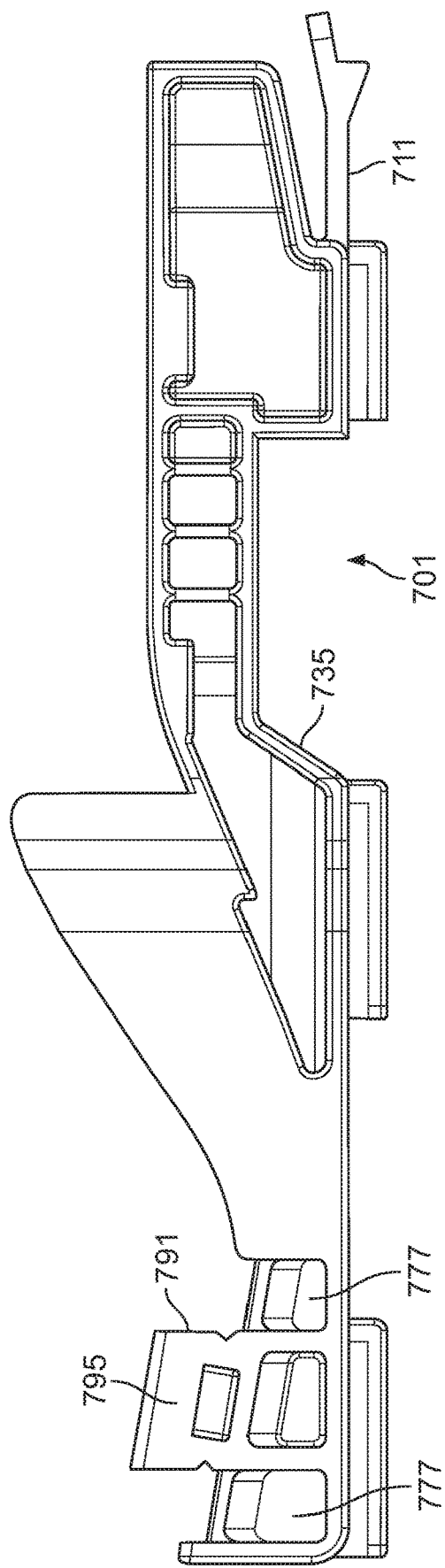
FIG. 63 is a top view of the base portion of the cable mount of FIG. 57.
Figure 64:
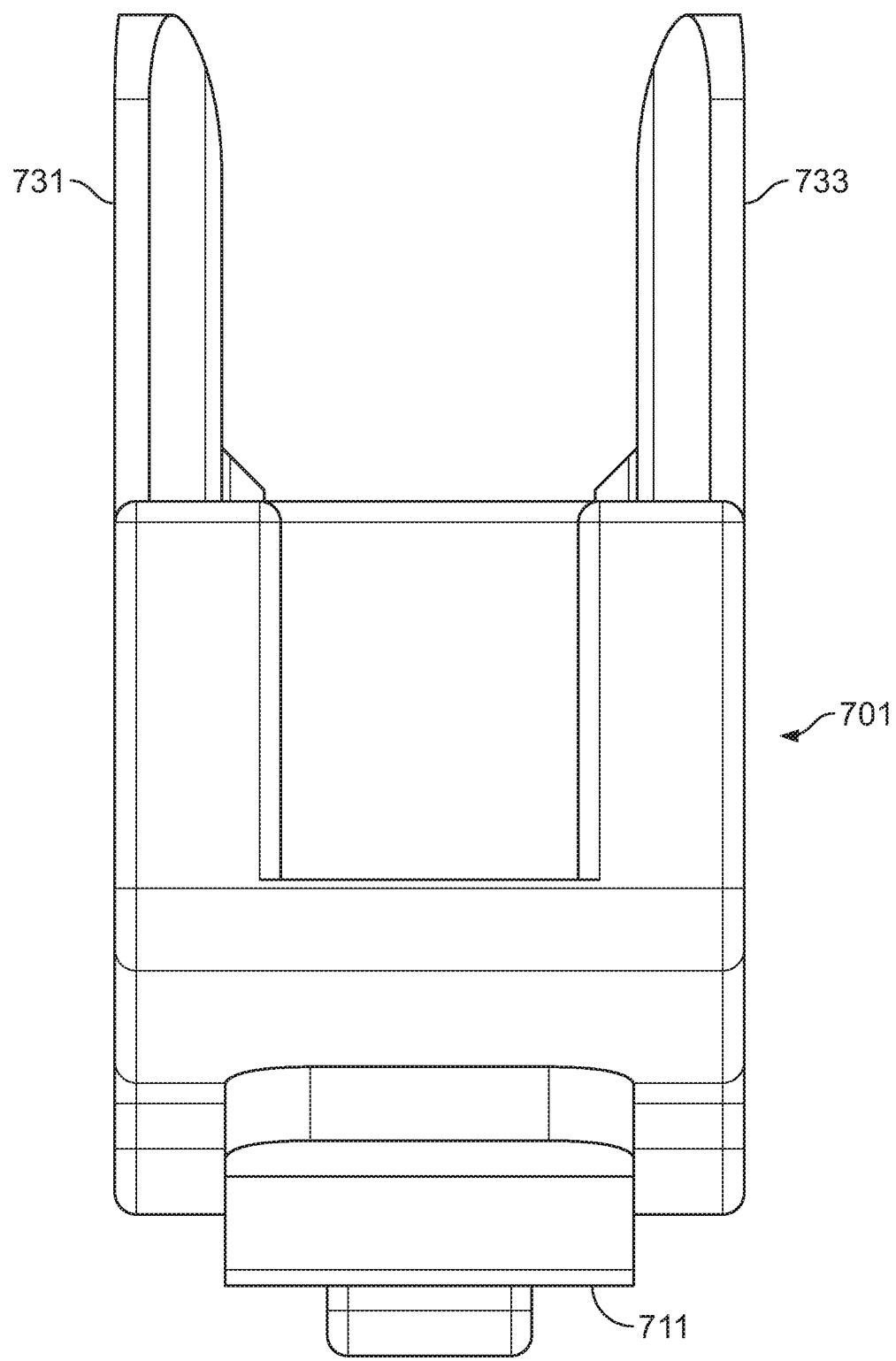
FIG. 64 is a front view of the base portion of FIG. 63.
Figure 65:
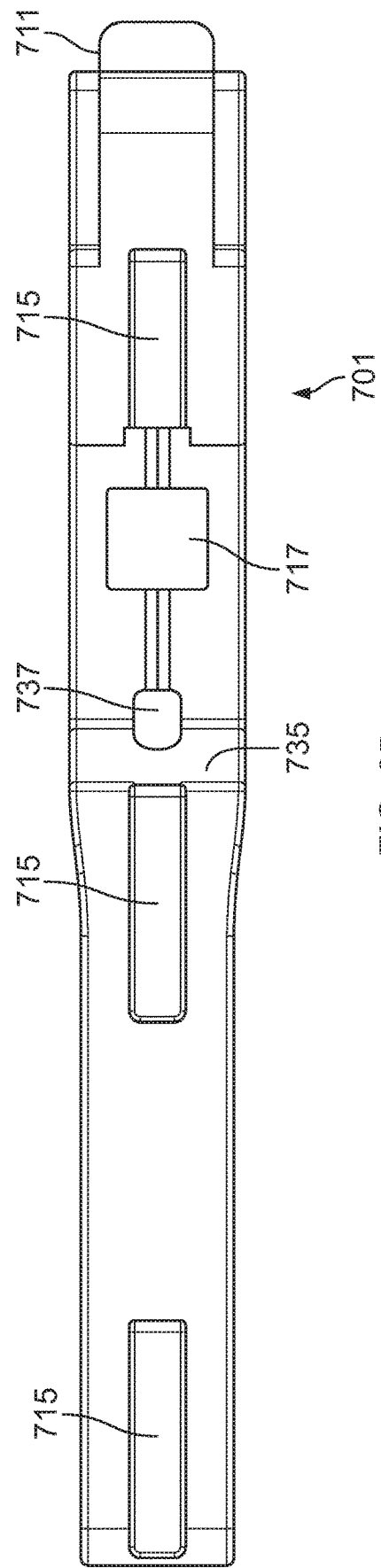
FIG. 65 is a left side view of the base portion of FIG. 63.

Referring now to FIGS. 54-55, an alternative embodiment of an optical fiber distribution element 610 is shown. The element 610 is shown from a front, left, top perspective view in FIG. 54. The left side of the element 610 is shown to include a cable mount 686 having features that are similar to those of the cable mount 286 illustrated in FIGS. 30-33, 38, 39, and 48-51. A cable mount such as cable mount 686, as discussed previously, is configured for securing an incoming cable such as a distribution of feeder cable to a side of the element 610. Even though the right side of the element 610 is shown in FIG. 54 with a different type of a cable guide 684 that is configured to lead cables to the tray 624, a structure similar to the cable mount 686 could also be used on the right side of the element 610.

The cable mount 686 defines a jacket channel 622 for housing the jacket of an incoming cable, a strength member pocket for receiving a strength member of the incoming cable, and a fiber channel 628 for receiving individual fiber-carrying loose tubes protruding from an end of a jacket of the cable. The jacket channel 622 is defined by upper and lower transverse walls 611, 613. The fiber channel 628 includes a pair of cable management structures 631 therein for guiding cables to different desired directions as the cables lead toward the entry point of the tray 624 of the element 610.

The strength member pocket is defined on an opposite side of a divider wall 635. The strength member is inserted into the strength member pocket through an opening 637 located in the divider wall 635 and is, thus, isolated from the fiber carrying tubes. The cable mount 686 is designed such that the individual tubes carrying the optical fibers are isolated from the strength member of a cable. The fiber carrying tubes are lead through the fiber channel 628 which is located on an opposite side of the divider wall 635 from the strength member pocket.

After being routed around the cable management structures 631, the cables enter and may be secured to an upper cable guide 683 and a lower cable guide 685. As shown, either or both of the cables guides 683, 685 are pivotally mounted to the chassis 620. The cable guides 683, 685 may be pivotable toward and away from the chassis 620 along a plane that is generally parallel to a plane defined by the sliding direction of the tray 624. The pivotability of the cable guides 683, 685 allows routing of the cables to outer and inner troughs 627, 629 of a radius limiter structure 638 that is mounted to the slide mechanism of the element 610. The cables may be secured to the guides 683, 685 by a variety of methods such as with cable ties, snap-fit elements, etc. Thus, when the cables are routed to the outer and inner troughs 627, 629 of the radius limiter 638, the guides 683, 685 may pivot with the movement of the cables secured thereto.

In the depicted example, the lower cable guide 685 has been shown as pivoted out to guide cables to the outer trough 627 of the radius limiter 638. The upper cable guide 683 is configured to lead cables toward the inner trough 629 of the radius limiter 638. The pivotability of the guides 683, 685 allows separation of the cables as they lead into the desired troughs of the radius limiter 638.

The radius limiter 638 includes a divider wall 625 extending from adjacent an outer end 623 to adjacent an inner end 621. According to one embodiment, the divider 625 does not extend all the way to the inner and outer ends 621, 623 of the U-shaped radius limiter 638. The divider wall 625 of the radius limiter 638 forms the two separate troughs 627, 629. The two troughs 627, 629 isolate and separate the cables (e.g., coming in and going out) of the element 610 into two distinct paths. According to one example cable routing configuration, the two troughs 627, 629 may guide the cables to the upper and lower levels 678, 680 defined toward the rear of the tray 624 while maintaining the S-shaped pathway 676 created within the element 610. The pivotable cable guides 683, 685 allow proper separation and routing of the cables when used with a radius limiter such as the limiter 638. Further details of a radius limiter such as the radius limiter 638 of the present application are discussed in U.S. Provisional Application Ser. No. 61/892,558 concurrently filed herewith, which application is incorporated herein by reference in its entirety.

Referring now to FIGS. 56-65, another embodiment of a cable mount 786 having features that are similar to those of the cable mount 286 illustrated in FIGS. 30-33, 38, 39, and 48-51 and the cable mount 686 illustrated in FIGS. 54-55 is shown. As specified with respect to the other embodiments of the cable mounts previously, even though the cable mount 786 is shown and described herein as being part of or being usable with an optical fiber distribution element such as element 210 of FIGS. 30-41 or element 610 of FIGS. 54-55, the optical fiber distribution elements 210 and 610 are simply two examples of telecommunications systems, fixtures, or closures which the cable mount 786 may be used with. The cable mount 786 includes features having inventive aspects in isolation and can be used on other types of optical fiber distribution elements.

Still referring to FIGS. 56-65, similar to cable mounts 286 and 686, the cable mount 786 is configured for securing an incoming cable such as a distribution or feeder cable 514 to a side of an element such as an element 510 or 610.

The cable mount 786 is defined by a base portion 701 and a fiber routing portion 703 that is configured to be mounted to the base portion 701 with a snap-fit interlock. The base portion 701 of the cable mount 786 is shown in isolation in FIGS. 63-65.

As shown in FIGS. 56-65, the fiber routing portion 703 defines flexible cantilever fingers 705 with ramped tabs 707 that are configured to be received within slots 709 on the base portion 701. When the fiber routing portion 703 is snap-fit with respect to the base portion 701, the two portions 701, 703 cooperatively form the cable mount 786.

Similar to the cable mounts 286 and 686 described above, the cable mount 786 includes features for securing or clamping the strength member 526 of an incoming cable 514 to limit axial pull on the cable 514 to preserve the optical fibers. A strength member clamp 736 of the cable mount 786 is defined by the interaction of a portion (i.e., a clamping surface 738) of the base portion 701 and a fixation plate 740 that is configured to be clamped against the base portion 701 via a fastener 742. The strength member clamp 736 will be described in further detail below. The portion of the base 701 that forms the clamping surface 738 for clamping the strength member may also be referred to as a first clamp member and the fixation plate 740 may also be referred to as a second clamp member of the strength member clamp 736.

Still referring to FIGS. 56-65, the cable mount 786, once assembled, defines a front end 716 and a rear end 718. The cable mount 786 is configured to receive an incoming cable through the rear end 718. Similar to cable mounts 286 and 686, the base portion 701 of the cable mount 786 defines a jacket channel 720 for housing the jacket of the incoming cable. A strength member pocket 724 is defined by the base portion for receiving a strength member 526 of the incoming cable 514. The fiber routing portion 703 of the cable mount 786 includes features for guiding individual fiber-carrying loose tubes 530 to different desired directions as the fibers extend toward the front end 716 of the cable mount 786.

The jacket channel 720 is defined by upper and lower transverse walls 731, 733. A divider wall 735 of the cable mount 286 separates the jacket channel 720 from the strength member pocket 724. The strength member pocket 724 is defined on an opposite side of the divider wall 735 from the jacket channel 720. The divider wall 735 defines an opening 737 through which the jacket channel 720 communicates with the strength member pocket 724. When a cable is received from the rear end 718 of the cable mount 786, the strength member 526 of the cable protruding from the jacket 799 of the cable is inserted into the strength member pocket 724 through the opening 737 before being clamped using the strength member clamp 736.

According to the depicted embodiment, the base portion 701 of the cable mount 786 is configured to be mounted to equipment such as elements 510 or 610 with a snap-fit interlock. As shown, the base portion defines a cantilever arm 711 with a ramped tab 713 adjacent the front end 716 of the cable mount 786 for interlocking with a notch that may be provided on a piece of telecommunications equipment. The base portion 701 of the cable mount 786 also defines catches 715 having dovetail profiles along the base portion 701 that are configured to slidably mate with intermating structures provided on the telecommunications equipment. In this manner, the cable mount 786 may be slidably attached to a piece of telecommunications equipment before being locked into a notch defined by the equipment with the cantilever arm 711. Similar dovetail intermating structures are shown, for example, in FIGS. 48-53 with respect to cable mount 286 and element 510. However, it should be noted that in the present embodiment of the cable mount 786, the catches 715 having the dovetail profiles are provided on the cable mount 786 rather than on the telecommunications equipment. And, accordingly, the structures that intermate with the dovetail catches 715 may be provided on the telecommunications equipment instead.

It should be noted that a snap-fit interlock utilizing dovetail profiles and a flexible cantilever lock is only one example of an attachment mechanism that may be used to mount the cable mount 786 to an element such as elements 210, 410, 510, and 610 and that other types of attachment mechanisms or methods (that limit axial pull on a secured cable) may be used.

As noted above, the cable mount 786 is configured for securing or clamping the strength member 526 of an incoming cable 514 to limit axial pull on the cable 514 to preserve the optical fibers. Once the strength member 526 of an incoming cable 514 is inserted into the strength member pocket 724 through the opening 737, the strength member 526 may be clamped between the clamping surface 738 defined by the base portion 701 and the fixation plate 740. A portion of the clamping surface 738 may define a groove 739 along the bottom side of the base portion 701 for proper positioning or alignment of the strength member 526.

The fixation plate 740 defines a fastener mount 741 that has a threaded opening 743 for receiving the fastener 742 when clamping the fixation plate 740 with respect to the base portion 701. The fastener mount 741 defines a throughhole 763 that extends along a longitudinal axis of the fixation plate (generally perpendicular to the threaded opening 743) that is for receiving the strength member 526 of the cable. When the fastener 742 is used to clamp the fixation plate 740 with respect to the base portion 701, at least a portion of the fastener may extend through the threaded opening 743 and into the throughhole. The throughhole 763 is preferably sized such that a strength member 526 can extend therethrough without interference from the fastener 742 that extends at least partially into the throughhole 763.

The fastener mount 741 of the fixation plate 740 extends from a top of the fixation plate 740 to a portion of the fixation plate 740 that defines a clamping surface 745. The clamping surface 745 of the fixation plate 740 is configured to abut against the clamping surface 738 defined by the base portion 701 in clamping the strength member 526 of the cable. As noted above, clamping the fixation plate 740 against the base portion 701 is accomplished by using the fastener 742, which is threadedly engaged with the fastener mount 741 and which draws the fixation plate 740 towards the base portion 701. The base portion 701 defines an opening 717 that is configured to accommodate and receive the fastener mount 741 as the fixation plate 740 is pulled up with respect to the base portion 701.

The fiber routing portion 703 of the cable mount 786 is configured to receive and guide the fiber carrying tubes 530 of a cable being mounted using the cable mount 786. Fiber carrying tubes 530 are lead up a ramp 787 defined by the fiber routing portion 703 after the strength member 536 of the cable has been separated therefrom and has been inserted into the strength member pocket 724. The divider wall 735 keeps the fiber carrying tubes 530 and the cable jacket separate from the strength member pocket 724 similar to the embodiments of the cable mount discussed previously. In this manner, when the cables are subjected to pulling forces, the fiber carrying components are isolated from the part of the cable mount that clamps the strength member.

Still referring to FIGS. 56-65, the fiber routing portion 703 of the cable mount 786 defines a fastener mount 719. The fastener mount 719 defines a pocket 721 for accommodating the head 723 of the fastener. The fastener mount 719 allows the fastener 742 to pass from the fiber routing portion 703 through the opening 717 of the base portion 701 into the fastener mount 741 of the fixation plate 740. As the fastener 742 is threadably turned with respect to the fiber routing portion 703, the fixation plate 740 is pulled toward the base portion 701 to clamp the strength member 526 between the clamping surfaces 738 and 745.

Still referring to FIGS. 56-65, as noted previously, the fiber routing portion 703 of the cable mount 786 includes features for guiding individual fiber-carrying loose tubes 530 to different desired directions as the fibers extend toward the front end 716 of the cable mount 786. The fiber routing portion 703 defines cable management structures in the form of spools 727 that are configured to guide the fiber carrying tubes 530 to different desired directions without violating minimum bend requirements.

As shown, the spools 727 may include flanges 729 for retaining the fibers within the fiber routing portion 703. The fiber routing portion 703 also defines bulkheads 751 adjacent the front end 716 of the cable mount 786. The bulkheads 751 cooperate with the spools 727 in leading the fibers directly forwardly as the fibers approach the front end 716 of the cable mount. The bulkheads 751 also define flanges 729 for retaining the fibers between the bulkheads 751. The bulkheads 751 and the spools 727 may also be cooperatively referred to as cable guides.

A plurality of fiber channels 759 are formed between the spools 727 and the bulkheads 751. The flanges 729 of the spools and the bulkheads 751 facilitate in keeping the fibers within desired fiber channels 759.

As shown, the fiber routing portion 703 may define a notch or an opening 797 between the spools 727 that allows the fiber carrying tubes 530 to fit therethrough and extend to different locations around a distribution element.

Similar to the embodiments shown in FIGS. 52 and 54, the cable mounts 786 may be used in a stacked arrangement where two or more cable mounts 786 may be stacked along a top to bottom direction.

The fiber routing portion 703, specifically, the spools 727, the notch 797 defined between the spools 727, and the bulkheads 751, are designed to allow the fibers to be routed to different locations around an element or to different elements. The fiber routing portion 703 is configured to allow the fiber carrying tubes 530 to extend straight upwardly, straight downwardly, diagonally upwardly, diagonally downwardly, or straight through after passing through the bulkheads 751.

In the embodiment of the cable mount 786 illustrated in FIGS. 56-65, the fiber routing portion 703 is provided as a separate structure than the base portion 701 of the cable mount 786 and is mounted to the base portion 701 with a snap-fit interlock. The two portions are provided as separate structures so that the base portion 701 can be used with fiber routing portions that may have a different configuration than the fiber routing portion 703 that is shown in FIGS. 56-65. The separability of the two portions 701 and 703 allows variability in the design of the fiber routing portion depending upon the type of cable used. For example, the number and the structure of the spools 727 and/or the bulkheads 751 can be varied depending upon the size and the number of the fibers of the clamped cable.

FIGS. 56-65 illustrate a portion of a cable jacket 799 that has been inserted into the jacket channel 720 between the upper and lower transverse walls 731, 733. As shown, adjacent the back of the cable mount 786, portions 795 of the walls 731, 733 define ramped tabs 793 that are configured to receive the cable jacket 799 with a snap-fit. Adjacent either side of the wall portions 795, the base portion 701 of the cable mount 786 also includes cable tie-wrap pockets 777 for allowing the cable jacket 799 to be fixed with cable ties.

At the exterior of the wall portions 795, there are also defined notches 791 for receiving cantilever fingers 789 of a cover structure 779. According to certain embodiments, for cables that may include soft strength members in the form of aramid fibers such as Kevlar, the soft strength members may be wrapped around the wall portions 795 and may be captured thereagainst with the cover structure 779.

Although in the foregoing description, terms such as "top," "bottom," "front," "back," "right," "left," "upper," and "lower" were used for ease of description and illustration, no restriction is intended by such use of the terms. The telecommunications devices such as the cable mounts described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

PARTS LIST 10 element
12 block
20 chassis
24 tray
30 slide mechanism
32 gears
34 rack
36 entry points
38 radius limiters
50 mounting structure
52 adapters
56 T-shaped frame member
58 hinge
62 top frame member
64 bottom frame member
70 adapter blocks
72 connectors
74 cables
76 pathway
78 upper level
80 lower level
84 portion
86 flanges
90 radius limiters
96 openings
100 cable mount
102 cable wrap
106 radius limiters
210 element
220 chassis
224 tray
230 slide mechanism
238 radius limiters
256 frame members
258 hinges
260 middle portion
262 openings
264 side portions
266 cover
268 latches
270 radius limiters
276 pathway
278 upper level
280 lower level
284 radius limiters
286 cable mounts
288 dovetail
290 opening
292 block
294 bar
296 fasteners
310 element
330 slide mechanism
332 wheels
334 wire
336 wire
340 first part
342 second part
344 third part
410 element
420 radius limiter
430 friction members
510 element
512 block
514 cable
516 front end of cable mount
518 rear end of cable mount
520 jacket channel
522 jacket
524 strength member pocket
526 strength member
528 fiber channel
530 tubes
531 upper and lower transverse walls
532 dovetail interlock feature
533 inset portion
534 positive stop
535 divider wall
536 strength member clamp
537 opening in divider wall
538 base/first clamp member
540 fixation plate/second clamp member
542 clamp fasteners
544 upper and lower front fiber guides
546 upper and lower rear fiber guides
548 notches
550 radius limiter mount
552 radius limiter
554 friction members
610 element
611 upper transverse wall
613 lower transverse wall
620 chassis
621 inner end of radius limiter
622 jacket channel
623 outer end of radius limiter
624 tray
625 divider wall of radius limiter
627 outer trough
628 fiber channel
629 inner trough
631 cable management structure
635 divider wall of cable mount
637 opening
638 radius limiter
676 pathway
678 upper level
680 lower level
683 upper cable guide 684 cable guide
685 lower cable guide
686 cable mount
701 base portion of cable mount
703 fiber routing portion of cable mount
705 cantilever finger
707 ramped tab
711 cantilever arm
713 ramped tab
715 catches
716 front end
717 opening
718 rear end
719 fastener mount of fiber routing portion
720 jacket channel
724 strength member pocket
727 spool
729 flange
731 upper transverse wall
733 lower transverse wall
735 divider wall
736 strength member clamp
737 opening
738 clamping surface
739 groove
740 fixation plate
741 fastener mount
742 fastener
743 threaded opening
745 clamping surface of fixation plate
751 bulkhead
759 fiber channel
763 throughhole
777 cable tie-wrap pocket
779 cover structure
786 cable mount
787 ramp
789 cantilever finger
791 notch
793 ramped tab
795 portions of upper and lower transverse walls
797 notch/opening
799 cable jacket

What is claimed is:

1. A cable mount configured for fixing a strength member of a fiber optic cable to a fixture, the cable mount comprising:
a cable channel for receiving a portion of the fiber optic cable, the cable mount further comprising a divider wall;
an opening provided on the divider wall for receiving a portion of the strength member of the fiber optic cable and directing the portion of the strength member to an opposite side of the divider wall from the cable channel, the opening provided on the divider wall being fully enclosed on all sides around its perimeter, wherein the divider wall is configured to keep the strength member of the fiber optic cable separate from an optical fiber of the fiber optic cable; and
a strength member clamp configured to fix the strength member of the fiber optic cable against the opposite side of the divider wall from the cable channel against axial pull relative to the cable mount, wherein the strength member clamp is defined at least in part by a fixation plate that is clamped to the cable mount with at least one clamp fastener.

2. A cable mount according to claim 1, further comprising a mounting structure for mounting the cable mount to the fixture.

3. A cable mount according to claim 2, wherein the mounting structure is configured to define a slidable interlock with the fixture.

4. A cable mount according to claim 3, wherein the slidable interlock is defined by dovetail structures.

5. A cable mount according to claim 3, wherein the strength member clamp is defined in an inset portion of the cable mount so as to not interfere with the slidable mounting of the cable mount to the fixture.

6. A cable mount according to claim 1, further comprising at least one cable management structure for managing and guiding the optical fiber extending from a jacket of the fiber optic cable from the cable channel.

7. A cable mount according to claim 6, wherein the at least one cable management structure is removably mounted to the cable mount via a snap-fit interlock.

8. A cable mount according to claim 1, wherein the cable channel defines a jacket channel adjacent a rear end of the cable mount and a fiber channel adjacent a front end of the cable mount, the jacket channel configured to receive a jacket of the fiber optic cable and the fiber channel configured to receive the optical fiber extending from the jacket of the fiber optic cable.

9. A cable mount according to claim 1, further comprising a pivotable cable guide portion, the pivotable cable guide portion configured to pivot relative to the fixture for selectively moving a portion of the fiber optic cable toward or away from the fixture.

* * * * *